(12) United States Patent
Pope et al.

(10) Patent No.: US 12,632,219 B2
(45) Date of Patent: May 19, 2026

(54) QUANTIZATION AND LOW PRECISION AI PROCESSOR

(71) Applicant: MatX Inc., Mountain View, CA (US)

(72) Inventors: Reiner A. Pope, Sunnyvale, CA (US);
Michial A. Gunter, San Francisco, CA (US); Akshay Mishra, San Francisco, CA (US); Mahdi Nazemi, San Francisco, CA (US)

(73) Assignee: MatX Inc., Mountain View, CA (US)

( * ) Notice: Subject to any disclaimer, the term of this patent is extended or adjusted under 35 U.S.C. 154(b) by 0 days.

(21) Appl. No.: 19/277,258

(22) Filed: Jul. 22, 2025

(65) Prior Publication Data

US 2026/0056710 A1 Feb. 26, 2026

Related U.S. Application Data

(60) Provisional application No. 63/685,208, filed on Aug. 20, 2024.

(51) Int. Cl.
*G06F 7/523* (2006.01)

(52) U.S. Cl.
CPC .................................... *G06F 7/523* (2013.01)

(58) Field of Classification Search
CPC .... G06F 15/8046; G06F 7/523; G06F 7/5443; G06N 3/04; G06N 3/044; G06N 3/0442; G06N 3/045–0475; G06N 3/0495; G06N 3/0499; G06N 3/063
See application file for complete search history.

(56) References Cited

U.S. PATENT DOCUMENTS

| | | | |
|---|---|---|---|
| 2020/0264876 A1* | 8/2020 | Lo ........................... | G06N 3/063 |
| 2022/0283778 A1* | 9/2022 | Choi ..................... | G06F 7/4876 |
| 2023/0376769 A1* | 11/2023 | Ghaffari ................. | G06F 7/483 |

FOREIGN PATENT DOCUMENTS

| | | | | |
|---|---|---|---|---|
| WO | WO-2024153325 A1 * | 7/2024 | ............. | G06N 3/084 |

OTHER PUBLICATIONS

H. T. Kung et al., One-Dimensional Systolic Arrays for Multidimensional Convolution and Resampling, VLSI for Pattern Recognition and Image Processing, Springer-Verlag, 1984 (Year: 1984).*

* cited by examiner

*Primary Examiner* — Emily E Larocque
(74) *Attorney, Agent, or Firm* — Fenwick & West LLP

(57) ABSTRACT

A system may include an integrated circuit for an artificial-intelligence-accelerating (AI-accelerating) processor. The system may retrieve a set of values in a first precision format, the set of values associated with a machine learning model. The system may quantize the set of values to generate a set of quantized values in a second precision format. The system may perform computations of the set of quantized values using a systolic array of AI-accelerating processor. In some embodiments, at least 90% of the multipliers in the systolic array are limited to 4-bit or lower input precision.

20 Claims, 21 Drawing Sheets

400

Input Layer
402

Hidden Layers
406

Output Layer
404

Broadcast 610

All Reduce 620

Reduce Scatter 630

All Gather 640

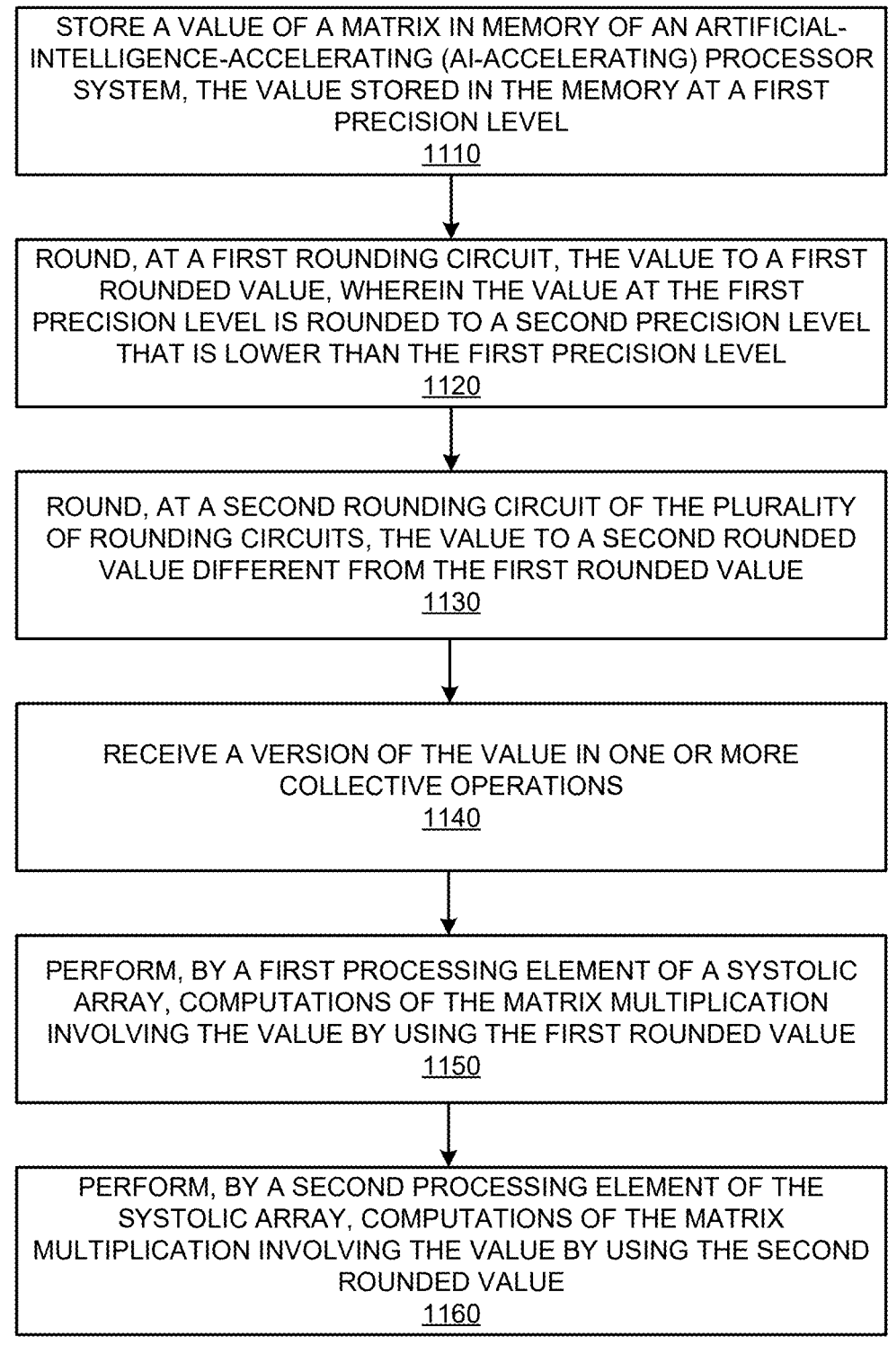

STORE A VALUE OF A MATRIX IN MEMORY OF AN ARTIFICIAL-INTELLIGENCE-ACCELERATING (AI-ACCELERATING) PROCESSOR SYSTEM, THE VALUE STORED IN THE MEMORY AT A FIRST PRECISION LEVEL
1110

ROUND, AT A FIRST ROUNDING CIRCUIT, THE VALUE TO A FIRST ROUNDED VALUE, WHEREIN THE VALUE AT THE FIRST PRECISION LEVEL IS ROUNDED TO A SECOND PRECISION LEVEL THAT IS LOWER THAN THE FIRST PRECISION LEVEL
1120

ROUND, AT A SECOND ROUNDING CIRCUIT OF THE PLURALITY OF ROUNDING CIRCUITS, THE VALUE TO A SECOND ROUNDED VALUE DIFFERENT FROM THE FIRST ROUNDED VALUE
1130

RECEIVE A VERSION OF THE VALUE IN ONE OR MORE COLLECTIVE OPERATIONS
1140

PERFORM, BY A FIRST PROCESSING ELEMENT OF A SYSTOLIC ARRAY, COMPUTATIONS OF THE MATRIX MULTIPLICATION INVOLVING THE VALUE BY USING THE FIRST ROUNDED VALUE
1150

PERFORM, BY A SECOND PROCESSING ELEMENT OF THE SYSTOLIC ARRAY, COMPUTATIONS OF THE MATRIX MULTIPLICATION INVOLVING THE VALUE BY USING THE SECOND ROUNDED VALUE
1160

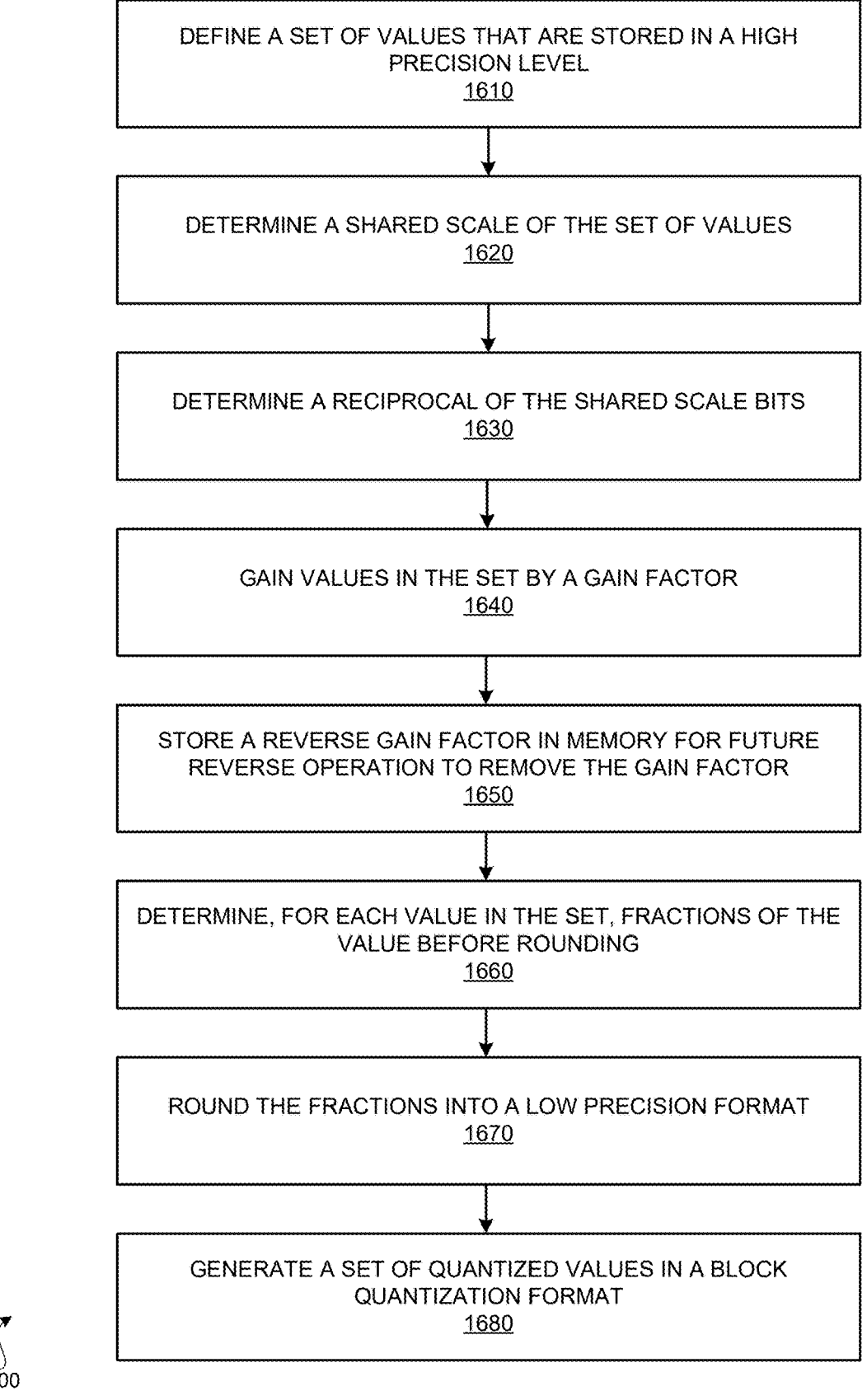

DEFINE A SET OF VALUES THAT ARE STORED IN A HIGH PRECISION LEVEL
1610

DETERMINE A SHARED SCALE OF THE SET OF VALUES
1620

DETERMINE A RECIPROCAL OF THE SHARED SCALE BITS
1630

GAIN VALUES IN THE SET BY A GAIN FACTOR
1640

STORE A REVERSE GAIN FACTOR IN MEMORY FOR FUTURE REVERSE OPERATION TO REMOVE THE GAIN FACTOR
1650

DETERMINE, FOR EACH VALUE IN THE SET, FRACTIONS OF THE VALUE BEFORE ROUNDING
1660

ROUND THE FRACTIONS INTO A LOW PRECISION FORMAT
1670

GENERATE A SET OF QUANTIZED VALUES IN A BLOCK QUANTIZATION FORMAT
1680

DIVIDE A LARGE DATASET INTO A PLURALITY OF SUBSETS
1710

QUANTIZE EACH SUBSET OF VALUES BY BLOCK QUANTIZATION
1720

PERFORM COMPUTATIONS OF VALUES IN EACH SUBSET IN A
LOW PRECISION LARGE SYSTOLIC ARRAY
1730

ACCUMULATE COMPUTATION RESULTS ACROSS MULTIPLE
SUBSETS THROUGH THE SYSTOLIC ARRAY
1740

CONVERT ACCUMULATED RESULTS BACK TO THE HIGH
PRECISION LEVEL
1750

1700

QUANTIZATION AND LOW PRECISION AI PROCESSOR

CROSS-REFERENCE TO RELATED APPLICATION

The present application claims priority to and benefit of U.S. Provisional Application No. 63/685,208, filed Aug. 20, 2024, which is incorporated by reference in its entirety.

FIELD

This disclosure relates to processor designs and specifically to designs of processors that accelerate machine learning operations.

BACKGROUND

The demands of artificial intelligence (AI) applications have underscored the need for specialized computational frameworks tailored to AI-centric tasks. Traditional processors, while adept at executing general-purpose computations, often face significant inefficiencies when confronted with the intricate algorithms and data-intensive workflows intrinsic to AI processing. The advent of AI processors, purposefully designed to expedite AI-related computations, addresses this pressing need for optimized performance and efficiency. These specialized chips integrate innovative architectural features and are tailored explicitly for the unique demands of AI workloads.

The accelerating complexity of AI algorithms, including deep learning, highlights the need for computational infrastructures capable of handling vast datasets and performing millions of calculations per second with minimal latency. Conventional processors, constrained by their architecture and instruction sets optimized for traditional computing tasks, falter in meeting these demands efficiently. By harnessing the power of AI processors, organizations can unlock transformative potentials in diverse sectors.

SUMMARY

Disclosed herein relates to an integrated circuit for an artificial-intelligence-accelerating (AI-accelerating) processor, the integrated circuit including: a systolic array for performing machine learning operations, wherein at least 90% of multipliers in the systolic array are limited to 4-bit or lower input precision.

In some embodiments, the disclosure described herein relate to a method for performing a machine learning operation using an integrated circuit, the method including: retrieving a set of values in a first precision format, the set of values associated with a machine learning model; quantizing the set of values to generate a set of quantized values in a second precision format; and performing computations of the set of quantized values using a systolic array of an artificial-intelligence-accelerating processor, wherein at least 90% of multipliers in the systolic array are limited to 4-bit or lower input precision.

In some embodiments, the disclosure described herein relate to a system including: memory for storing values of a machine learning model in a first precision format that is in FP16 or higher; and a systolic array for performing machine learning operations involving multiplying quantized values of the values of the machine learning model, wherein at least 90% of multipliers in the systolic array are limited to 4-bit or lower input precision.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure (FIG. 1A is a block diagram illustrating an example artificial intelligence (AI) accelerating processor, in accordance with some embodiments.

FIG. 6A is a conceptual diagram illustrating various examples of collective operations that may be performed by one or more AI-accelerating processors, in accordance with some embodiments.

FIG. 11 is a flowchart depicting an example process for operating an AI-accelerating processor system, in accordance with some embodiments.

FIG. 16 is a flowchart depicting an example process for operating a quantization process associated with an AI-accelerating processor system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The FIGURES (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Processor Architecture

Figure 1A:
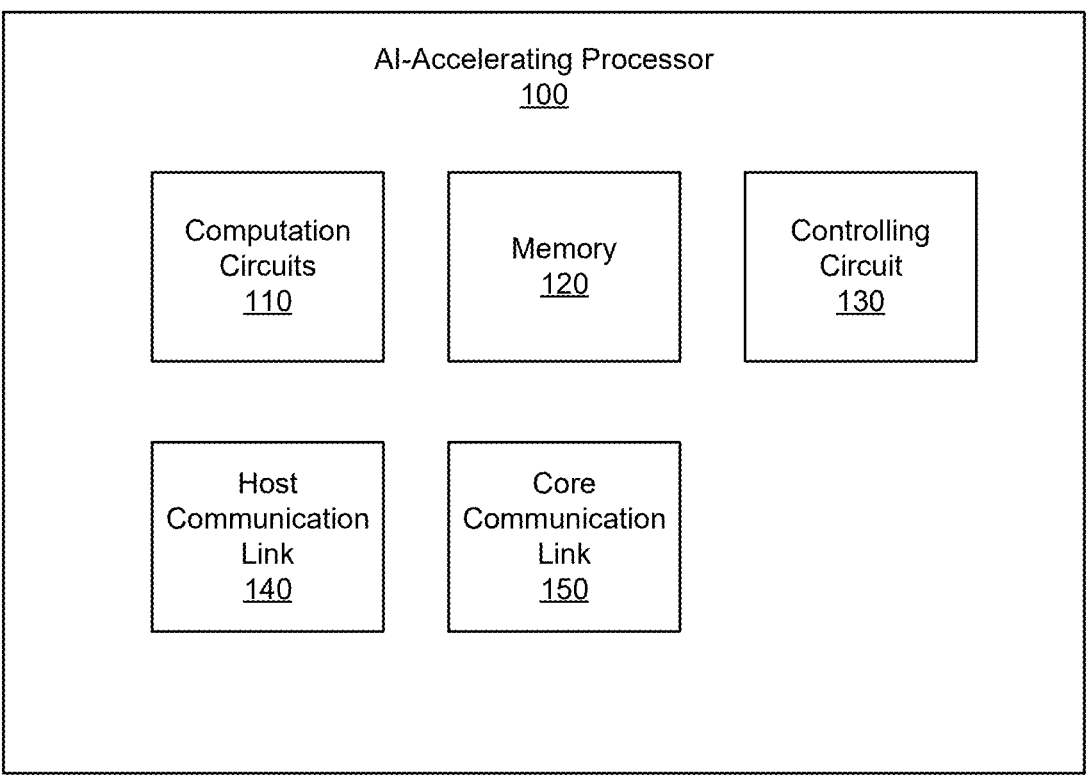
FIG. 1B is a block diagram illustrating an example layout of an AI-accelerating processor, in accordance with some embodiments.

FIG. 1A is a block diagram illustrating an example artificial intelligence (AI) accelerating processor 100, in accordance with some embodiments. An individual AI-accelerating processor 100 is an example of an AI-accelerating processor system. In some cases, multiple AI-accelerating processors 100 may cooperate to form a larger system, such as in the situation of a multi-core system, a system on a chip, or a server rack situation. Those systems are also examples of an AI-accelerating processor system. An AI-accelerating processor 100 is a processor that is designed to accelerate the execution of various AI models, including in training and making inferences. However, an AI-accelerating processor 100 may also be used to execute other types of computations and programs that are not related to AI, such as in image processing and video processing. In this disclosure, any AI models may be referred to as machine learning models.

In some embodiments, an AI-accelerating processor 100 may include computation circuits 110, memory 120, a controlling circuit 130, a host communication link 140, and a core communication link 150. In various embodiments, an AI-accelerating processor 100 may include additional, fewer, or different components that are not explicitly illustrated in FIG. 1A. While in this disclosure the components in the AI-accelerating processor 100 may at times be described in a singular form, the AI-accelerating processor 100 may include one or more of each of the components. For example, memory 120 may include several units or different memory domains. The core communication link 150 may include multiple communication units. Likewise, components that are described in a plural form may also be present as a single unit in some embodiments.

In some embodiments, computation circuits 110 include circuitry that performs computation operations. The computation operations may include various types of computations that are common in machine learning, such as matrix multiplications, multiply-accumulate operations, normalized exponential functions, and other computations, linear or non-linear. Some of the computation operations may take the form of parallel processing, such as in single instruction, multiple data (SIMD), or in multiple instruction, multiple data (MIMD). Computation circuits 110 may include a set of computation units, such as a grid of tiles that performs computations in a parallel fashion. The gird may take the form of a systolic array. A matrix may be divided into sub-matrices and the sub-matrices are distributed among the set of computation units for matrix multiplications. Examples of computation units in the computation circuits 110 may include systolic arrays, arithmetic logic units (ALUs), multiply-add (MAD) circuits, adders, vector processing units, and other specialized circuitry that is used for accelerating certain types of operations, such as softmax operations that are common in machine learning.

Memory 120 is a storage unit that may be used to store data that are used for computations of the computation circuits 110 and store results generated by the AI-accelerating processor 100, whether those results are initial, intermediate, or final. Data fetched via the host communication link 140 or the core communication link 150 may be stored in the memory 120. In some embodiments, an entirety or a portion of a machine learning model may be stored in the memory 120. For example, for a smaller machine learning model, the entirety of the model may be stored in the memory 120. In some embodiments, for a large model such as a large language model (LLM) or another transformer-based large model that has billions or even trillions of parameters, the model may be divided into subsets, and the subsets are distributed among memory 120 of a number of AI-accelerating processors 100 that operate cooperatively to perform the calculation. In some embodiments, other types of data, such as training data, learned parameter values, and inference results may also be stored in the memory 120.

In some embodiments, memory 120 may take the form of design high bandwidth memory (HBM), dynamic random access memory (DRAM), including various variations of DRAM, such as synchronous DRAM (SDRAM), double data rate (DDR) SDRAM, other types of DRAM. While DRAM is often considered off-chip memory, in some embodiments physical layouts, memory 120 may be physically located within the boundary of the AI-accelerating processor 100. In some embodiments, memory 120 may also take the form of caches of various levels. In some embodiments, an AI-accelerating processor 100 may include various types of memory. For example, the AI-accelerating processor 100 may include HBM that may be considered off-chip memory, various levels of caches in different components of the AI-accelerating processor 100, and registers that are in the circuitry.

In some embodiments, a controlling circuit 130 is an on-chip controller that manages the overall operation or part of the operation of the AI-accelerating processor 100. The controlling circuit 130 may provide instruction streams, manage register allocation, and determine instruction scheduling. The controlling circuit 130 may generate instructions that are broadcasted to various computation circuits 110, such as in a SIMD or MIMD fashion. In some embodiments, the controlling circuit 130 is not responsible for the entirety of the operation of the AI-accelerating processor 100. For example, the determination of various task-related decisions, such as scheduling, parallelism, load balancing, memory, and register allocation, may be distributed among the controlling circuit 130, a host central processing unit (CPU) (not shown in FIG. 1A), compiler instructions and higher level software instructions.

In some embodiments, the AI-accelerating processor 100 is designed to provide a high degree of flexibility to software engineers in making task decisions and parallelism decisions. In those embodiments, the controlling circuit 130 may handle a limited number of decisions, such as managing registers in the AI-accelerating processor 100 and scheduling certain computation instructions that are not specified by the software instructions. The rest of the instructions and decisions may be customizable by software engineers at the software code level. In other embodiments, the controlling circuit 130 may generate more task-related commands automatically.

In some embodiments, a host communication link 140 includes circuitry for the exchange of data between a host CPU (not shown in FIG. 1A) and the AI-accelerating processor 100. The host CPU may generate system-level instructions that are sent to a set of AI-accelerating processors 100. Each of the AI-accelerating processors 100 may receive those instructions and data from the host CPU via the host communication link 140. The host CPU may also perform long-range communications such as fetching training data from a Cloud data store and performing network communications within a data center network. In some embodiments, the host communication link 140 may take the form of a peripheral component interconnect express (PCIe) or another suitable serial bus.

In some embodiments, a core communication link 150 includes circuitry for the exchange of data among different AI-accelerating processors 100 in a multi-core system such as in a processor rack that includes a number of AI-accelerating processors 100 cooperatively performing calculations. The core communication link 150 is a processor interconnect link that enables chip-to-chip communication. In some embodiments, the core communication links 150 in a multi-core system allow a particular AI-accelerating processor 100 to communicate with another AI-accelerating processor 100 that is connected by the core communication link 150. In some embodiments, the core communication link 150 may take the form of a communication bus that allows any AI-accelerating processor 100 to communicate with any other AI-accelerating processors 100 in the multi-core system. For example, the core communication link 150 may take the form of a peripheral component interconnect express (PCIe) or another suitable serial bus. In some embodiments, the core communication link 150 may be a custom-designed link. In some embodiments, the core communication link 150 may also perform other communication functions such as routing, multiplexing, load balancing, and other flow control tasks.

Example Chip Component Layout

Figure 1B:
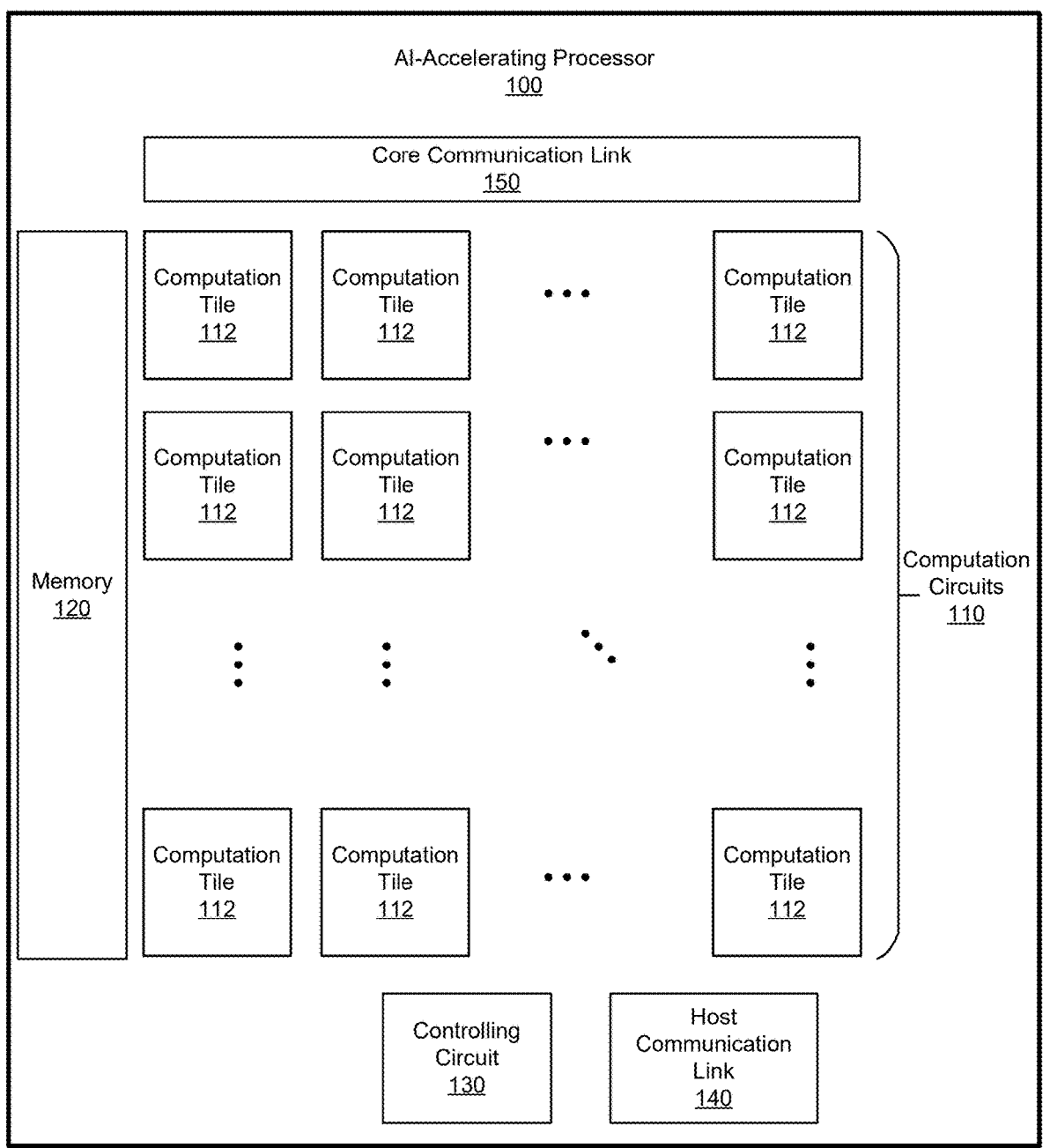

FIG. 1B is a block diagram illustrating an example layout of an AI-accelerating processor 100, in accordance with some embodiments. Similar to the example AI-accelerating processor 100 in FIG. 1A, the AI-accelerating processor 100 in FIG. 1B includes computation circuits 110, memory 120, a controlling circuit 130, a host communication link 140, and a core communication link 150. The computation circuits 110 may take the form of a grid of computation tiles 112 that cooperate to perform computations.

The components in the AI-accelerating processor 100 may be arranged in any suitable layout that increases the efficiency of data movement to reduce the chance of occurrence of memory-bound computations. For example, in some embodiments, the memory 120 may occupy one or more sides of the periphery of the grid of computation tiles 112 so that each computation tile 112 may fetch data from or store data in memory 120. Data stored in the memory 120 may be individually fetched (e.g., a subset of a matrix) to a particular computation tile 112 or broadcasted or scattered simultaneously to a number of computation tiles 112. The core communication link 150 may occupy another side (or one or more sides) of the periphery of the grid of computation tiles 112 so that the computation tiles 112 may communicate to other computation tiles 112 in other AI-accelerating processors 100 via the core communication link 150. The memory 120 and the core communication link 150 may be located on different sides that are orthogonal to each other. The controlling circuit 130 and the host communication link 140 may occupy relatively smaller silicon landscapes and may be located at any suitable location in the AI-accelerating processor 100.

In some embodiments, the computation circuits 110 include a number of computation tiles 112 that are arranged in rows and columns to form a grid. In this disclosure, various directional terms, such as rows and columns, are merely used to signify a first direction and a second direction that may or may not be orthogonal to each other. Those terms do not always imply particular orientations. For example, a row does not always imply a lateral direction and a column does not always imply a longitudinal direction. Each computation tile 112 may be a computation circuit 110 for performing computation. The formation of a grid allows the computation tiles 112 to work individually for a smaller dataset or in a combined fashion to handle a larger dataset. In some embodiments, the grid may form a systolic array and the grid may be referred to as a systolic array.

In some embodiments, depending on the mode of operation of the AI-accelerating processor 100, the grid of computation tiles 112 may be combined to form a large single computation unit in which individual computation tiles 112 may operate in lockstep with respect to each other. For example, each computation tile 112 may handle a particular data size per time step (e.g., 8×8, 16×16, 32×32 64×64, 128×128, 256×256 elements, etc.) while the combination of the grid of computation tiles 112 may be used to handle a much larger data size, such as (512×512, 1024×1024, 2048× 2048, 4096×4096 elements, etc.). By way of example, the grid of computation tiles 112 may handle matrix multiplication that involves large matrices of thousands of elements by thousands of elements. A large matrix may be divided into subsets and each subset is fetched to a particular computation tile 112. As such, the data values in the matrix may be distributed among the computation tiles 112 in the grid by splitting the matrix to match the geometry of the grid. For example, if the computation tiles 112 form a grid of 1024 by 1024 elements, an entirety of a matrix with 1024×1024 elements may be stored in the grid and processed.

In some embodiments, the grid of computation tiles 112 may form a systolic array of a very large set of processing elements, each of which includes circuitry that is configured to perform certain predefined operations, such as multiplication, addition, accumulation, etc. In some embodiments, each computation tile 112 may include one or more smaller systolic arrays with processing elements, such as 8×8, 16×16, 32×32, 64×64, 128×128, 256×256, 512×512, etc. processing elements. In turn, the grid may include a number of computation tiles 112 so that the grid of computation tiles 112 can be combined to form a large systolic array that may be in the magnitude of 512×512, 1024×1024, 2048×2048, 4096×4096, 8192×8192, etc. processing elements. For a given time step, each processing element may be used to perform the computation of a data value.

While the numerical examples provided here are in the multiples of binary values, the actual size of a systolic array in a computation tile and the combined size of the grid do not always need to follow any numerical patterns. Also, each systolic array does not need to be square and can be rectangular.

The silicon allocation on a large systolic array accelerates the computation of large matrix multiplication. The complexity of matrix multiplication is approximately $O(n^3)$ while the complexity of other operations such as memory fetch often grows at a pace of $O(n^2)$.

In some embodiments, instead of forming a single grid, the computation tiles 112 may also work in groups or individually to form various subunits of suitable sizes for the computation of datasets that are in various sizes. In some embodiments, the grouping or division of the computation tiles 112 may be controlled by the controlling circuit 130 or on the software level. In some embodiments, the controlling circuit 130 may generate instructions that are broadcasted to one or more computation tiles 112.

In some embodiments, computations, such as matrix multiplication, performed by the grid of computation tiles 112 may be carried out through a series of collective operations, such as broadcast, reduce, scatter, and gather. By way of example, in a matrix multiplication, a left matrix is multiplied by a right matrix. In some embodiments, the left matrix may be divided into subsets. The subsets may be distributed among the computation tiles 112 in the grid by splitting the left matrix to match the geometry of the grid. The multiplication may then be started using a series of collective operation instructions. For example, matrix multiplication can be broken down into a series of alternating reduce-scatter operations followed by all-gather operations. To perform the matrix multiplication, a right matrix may be divided as column vectors. Each computation tile 112 performs multiplications between the data values of the left matrix and the data values of the column vector of the right matrix. In turn, an all-gather operation is sent to the computation tiles 112 so that each multiplied values are gathered to the appropriate memory locations. After the all-gather operation, another round of reduce-scatter operation and all-gather operation may be performed.

While matrix multiplication is used as an example to illustrate the computation operations of the systolic array, the systolic arrays in the computation tiles 112 may be used to perform computations other than matrix multiplication. Also, each computation tile 112 may include other circuitry in addition to or alternative to systolic arrays. For example, the computation tiles 112 may include other computation circuits that are used for vector manipulation, softmax calculation, and other suitable circuits.

Example Computation Tile

Figure 2:
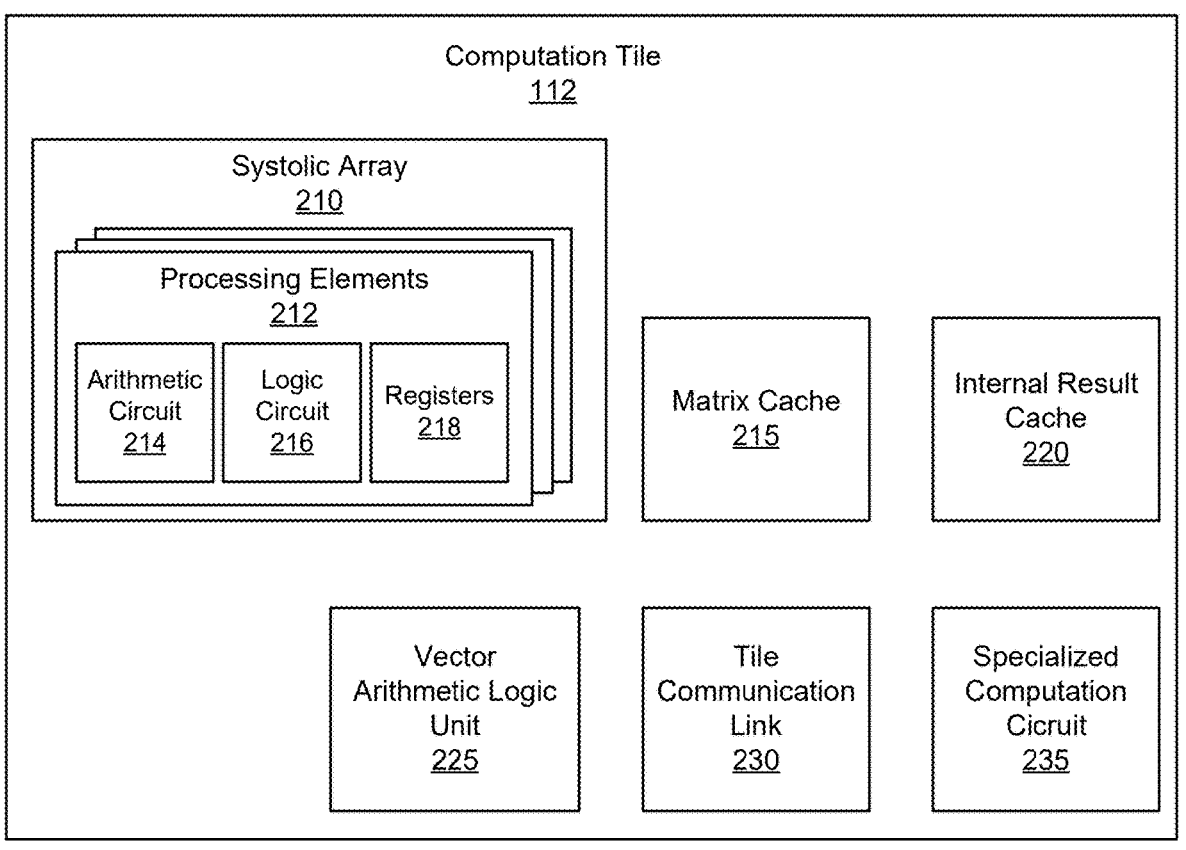
FIG. 2 is a block diagram illustrating components of an example computation tile, in accordance with some embodiments.

FIG. 2 is a block diagram illustrating components of an example computation tile 112, in accordance with some embodiments. In some embodiments, a computation tile 112 may include systolic arrays 210, a matrix cache 215, an internal result cache 220, a vector arithmetic logic unit (ALU) 225, a tile communication link 230, and a specialized computation circuit 235. In some embodiments, a computation tile 112 may include additional, fewer, or different components that are not explicitly illustrated in FIG. 2.

In some embodiments, a computation tile 112 includes one or more systolic arrays 210, each of which may include a number of processing elements 212. A processing element 212 is a circuit that is configured to perform various computations such as multiplication, addition, accumulation, division, bitwise operation, etc. Data flows through the systolic array in a synchronized manner, with each processing element 212 operating to compute a portion of a larger dataset (e.g., a larger matrix) concurrently. Inputs may be fed into a systolic array 210 from one side, processed as the data propagates through the array, and the results may be accumulated in one or more registers in the systolic array 210. Each processing element 212 in a systolic array 210 may be pipelined. A processing element 212 may include an arithmetic circuit 214, such as an arithmetic logic unit (ALU), to perform arithmetic operations, a logic circuit 216 for bit operations, and registers 218 for storing intermediate data values and partial results. A systolic array 210 may include additional data storage circuits (e.g., registers) to store values that are outputted by the processing elements 212, such as data values that are accumulated from outputs of a set of processing units 212. The additional data storage circuits may be the internal result cache 220.

In some embodiments, each processing element 212 in a systolic array 210 may be configured to perform the computation of a value in a dataset (e.g., a matrix). To reduce the size of a particular processing element 212 to allow an AI-accelerating processor 100 to include more processing elements 212, each processing element 212 may be configured to be limited in precision. In some embodiments, a processing element 212 has circuitry that limits the precision of the value being processed to 32 bits, such as in single-precision floating point 32, FP32, or a custom 32-bit format. In some embodiments, a processing element 212 has circuitry that limits the precision of the value being processed to 16 bits, such as in FP16 or a custom 16-bit format. In some embodiments, a processing element 212 has circuitry that limits the precision of the value being processed to be 8 bits, such as in FP8 or a custom 8-bit format. In some embodiments, a processing element 212 has circuitry that limits the precision of the value being processed to be 4 bits, such as in FP4 or a custom 4-bit format.

In some embodiments, a majority or all of the processing elements 212 in a systolic array 210 of a computation tile 112 have circuitry that is limited to a low-precision computation. For example, in some embodiments, a majority or all of the processing elements 212 in a systolic array 210 of a computation tile 112 are limited to processing 8-bit precision level. In some embodiments, a majority or all of the processing elements 212 in a systolic array 210 of a computation tile 112 are limited to processing at a 4-bit precision level. To reduce the size of a processing element 212, the arithmetic circuit 214, logic circuit 216, and registers 218 are limited to a low precision level. For example, the adder and multiplier circuits in the arithmetic circuit 214 may only include circuitry for 8-bit computation or circuitry for 4-bit computation. The registers 218 may also be limited to storing 4-bit values or 8-bit values. The reduction of precision level improves the computation speed and power consumption of an AI-accelerating processor 100.

In some embodiments, by limiting the precision level of circuitry in the computation tiles 112, such as limiting the components in the systolic array 210, the internal result cache 220, and specialized computation circuit 235, the area occupied by a computation tile 112 is significantly reduced compared to a conventional processor with a different architecture. As such, using a limited precision level to reduce the size of an individual processing unit 212 allows the AI-accelerating processor 100 to include a systolic array that has a much larger number of processing units 212 compared to a conventional processor. In some embodiments, as discussed in FIG. 1B, the grid of computation tiles 112, in total, may include more than 1000×1000 processing units 212. In some embodiments, the grid of computation tiles 112 may include more than 2000×2000 processing units 212. In some embodiments, the grid of computation tiles 112 may include more than 3000×3000 processing units 212. In some embodiments, the grid of computation tiles 112 may include more than 4000×4000 processing units 212. In some embodiments, the grid of computation tiles 112 may include more than 5000×5000 processing units 212. In some embodiments, the grid of computation tiles 112 may include more than 8000×8000 processing units 212. In some embodiments, the grid of computation tiles 112 may include more than 10,000×10,000 processing units 212.

While in some embodiments a processing unit 212 is limited in precision on the hardware level, an AI-accelerating processor 100 may continue to support higher precision computation by breaking down computations of a higher precision value. For example, in an embodiment where a processing element 212 is limited to 4 bits, a bit 8 computation may be performed by breaking down an 8-bit value into two sets of bits, most significant bits (MSB) and least significant bits (LSB). Multiplication may be performed through a series of computations between MSB and MSB, MSB and LSB, LSB and MSB, and LSB and LSB. Similar computations may be performed for any higher precision values with a lower precision processing element 212.

A computation tile 112 may also include a matrix cache 215, which is memory internal to the computation tiles 112 to store values of a matrix or a portion of a matrix sent to a computation tile 112. As discussed in FIG. 1B, a large matrix may be split and subsets of the matrix may be distributed among a set of computation tiles 112. A subset of the matrix may be sent to a particular computation tile 112 and the values in the subset may be stored in the matrix cache 215. Each value in the subset may be sent to an individual processing element 212 for computation and the results of a set of processing elements 212 may be returned to the cache for accumulation, such as the matrix cache 215 or internal result cache 220. Intermediate results of matrix computation may also be stored in the matrix cache 215 or internal result cache 220.

In some embodiments, a computation tile 112 may include different types of caches that are configured to efficiently store different types of data. For example, in addition to or alternative to the matrix cache 215, a computation tile 112 may include an internal result cache 220 that is used to store internal results and vectors that are fetched to the computation tile 112. For example, in matrix multiplication, a column vector of a right matrix may be broadcasted or scattered to a computation tile 112 and may be stored in the internal result cache 220. Since the dimension of a column vector, which is an array of numbers, is often different from the dimension of a subset of the matrix, the internal result cache 220 may be sized and dimensioned differently from the matrix cache 215 to increase the efficiency of the storage.

The internal result cache 220 may also be used to store other types of data such as intermediate values and other temporary vectors.

In some embodiments, in addition to the ALUs in the processing element 212, a computation tile 112 may also include another ALU circuit that is used for vector computation and manipulation, such as the vector ALU 225. The vector ALU 225 may be used for vector manipulation, such as vector multiplication, transpose, and comparison between two vectors, dot products, etc. The vectors may include a column vector of a matrix in matrix multiplication and other vectors that are involved in the computation.

In some embodiments, a computation tile 112 includes a tile communication link 230. A computation tile 112 may be part of a grid of computation tiles 112 as illustrated in FIG. 1B. Values from outputs of different computation tiles 112 may be collected (e.g., accumulated or gathered) on the chip level. The tile communication link 230 allows a computation tile 112 to communicate with one or more other computation tiles 112 in the grid. Computation tiles 112 may work with each other in different manners. For example, in one mode of operation of the grid, a set of computation tiles 112 may serve as units in parallel processing to process a large dataset's values that are distributed among the set of computation tiles 112. In another mode of operation, a computation tile 112 may serve as a computation unit downstream or upstream of another computation tile 112. The tile communication link 230 may be configured to transmit values between the computation tiles 112. A tile communication link 230 may take the form of direct wires between two or more computation tiles 112 or a communication component that is used for cross-tile communication.

In some embodiments, a computation tile 112 may also include a specialized computation circuit 235. A specialized computation circuit 235 may include computation-specific circuitry to accelerate the speed of computation of certain types of computations, such as specific linear or non-linear operations, bitwise operations, softmax operations, or other operations that may be typically inefficient to perform using the systolic array 210 or the vector ALU 225. In some embodiments, a specialized computation circuit 235 includes circuitry that is configured to perform softmax operations efficiently.

Computing Device Architecture

Figure 3A:
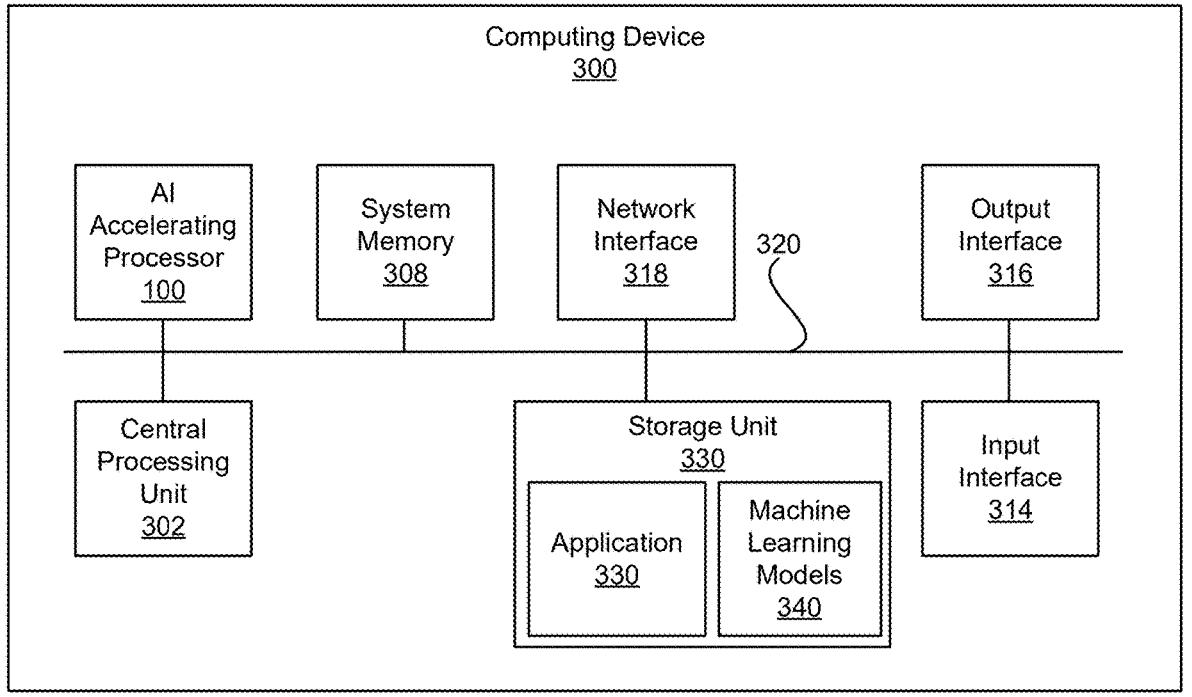
FIG. 3A is a block diagram of an example computing device in which an AI-accelerating processor may be installed, in accordance with some embodiments.

FIG. 3A is a block diagram of an example computing device 300 in which an AI-accelerating processor 100 may be installed, in accordance with some embodiments. A computing device 300 may be a server computer, a personal computer, a portable electronic device, a wearable electronic device (e.g., a smartwatch), an IoT device (e.g., a sensor), a smart/connected appliance (e.g., a refrigerator), a device in edge computing, a robot such as a general or specific purpose humanoid, a vehicle such as an electric vehicle or an autonomous vehicle, etc. The computing device 300 may include, among other components, a central processing unit (CPU) 302, an AI-accelerating processor 100, system memory 308, a storage unit 310, an input interface 314, an output interface 316, a network interface 318, and a bus 320 connecting these components. In various embodiments, computing device 300 may include additional, fewer, or different components.

CPU 302 may be a general-purpose processor using any appropriate architecture and may be referred to as a host processor. CPU 302 retrieves and executes computer code that includes instructions, when executed, that may cause CPU 302 or another processor, individually or in combination, to perform certain actions or processes that are described in this disclosure. Instructions may be stored in different forms, such as machine-readable instructions, programming instructions including source code, and other communication signals and orders. The term "instructions" may be used in a general sense and is not limited to machine-readable codes. CPU 302 may be used to compile the instructions and also determine which processors may be used to perform certain tasks based on the commands in the instructions. For example, certain machine learning computations may be more efficient to be processed using AI-accelerating processor 100 while other computations may be better to be processed using a general processor.

An AI-accelerating processor 100 may be a processor that is efficient at performing certain machine learning operations such as matrix multiplications, convolutions, dot products, etc. In various embodiments, an AI-accelerating processor 100 may have different hardware architectures. For example, in some embodiments, an AI-accelerating processor 100 may include any of the architecture or component features that are described in FIG. 1A through FIG. 2 or anywhere else in this disclosure. The AI-accelerating processor 100 may also serve as a graphics processing unit (GPU).

While in FIG. 3A, the processors CPU 302 and AI-accelerating processor 100 are illustrated as separated components, in various embodiments the structure of one processor may be embedded in another processor. For example, one or more examples of the circuitry of AI-accelerating processor 100 disclosed in different figures of this disclosure may be embedded in a CPU 302. The processors may also be included in a single system such as in a system-on-a-chip (SoC) implementation. In various embodiments, computing device 300 may also include additional processors, such as a GPU, for various specific purposes. In this disclosure, the various processors may be collectively referred to as "processors" or a "processor."

The system memory 308 includes circuitry for storing instructions for execution by a processor and for storing data processed by the processor. System memory 380 may take the form of any type of memory structure including, for example, high bandwidth memory (HBM), dynamic random access memory (DRAM), synchronous DRAM (SDRAM), double data rate (DDR, DDR2, DDR3, etc.), static RAM (SRAM), or a combination thereof. System memory 308 usually takes the form of volatile memory. In some embodiments, the system memory 308 may serve as memory for the CPUs 302. While an AI-accelerating processor 100 can have access to the system memory 308, the AI-accelerating processor 100 may include its own off-chip memory such as HBM in memory 120 illustrated in FIG. 1B.

Storage unit 310 may be a persistent storage for storing data and software applications in a non-volatile manner. Storage unit 310 may take the form of read-only memory (ROM), hard drive, flash memory, or another type of non-volatile memory device. Storage unit 310 stores the operating system of the computing device 300, various software applications 330, and machine learning models 340. The storage unit 310 may store computer code that includes instructions that, when executed, cause a processor to perform one or more processes described in this disclosure. In some embodiments, a machine learning model may be stored in the storage unit 310 or system memory 308.

Applications 330 may be any suitable software applications that operate on the computing device 300. An application 330 may be in communication with other devices via network interface 318. Applications 330 may be of different types. In one case, an application 330 may be a web application, such as an application that runs on JavaScript. In another case, an application 330 may be a mobile application. For example, the mobile application may run on Swift for iOS and other APPLE operating systems or on Java or another suitable language for ANDROID systems. In yet another case, an application 330 may be a software program that operates on a desktop operating system such as LINUX, MICROSOFT WINDOWS, MAC OS, or CHROME OS. In yet another case, an application 330 may be a built-in application in an IoT device. An application 330 may include a graphical user interface (GUI) that visually renders data and information. An application 330 may include tools for training machine learning models 340 and/or making inferences using a trained machine learning models 340.

Machine learning models 340 may include different types of algorithms for making inferences based on the training of the models. Examples of machine learning models 340 include regression models, random forest models, support vector machines (SVMs) such as kernel SVMs, artificial neural networks (ANNs) such as convolutional network networks (CNNs), recurrent network networks (RNNs), autoencoders, long short term memory (LSTM), reinforcement learning (RL) models, transformer models, large language models (LLMs), generative pre-trained transformers (GPT), other transformer based large models, and other generative models. In various embodiments, a machine learning model 340 may be in different forms. For example, a machine learning model 340 may be an independent model. A machine learning model 340 may also be part of a software application 330.

Input interface 314 receives data from external sources such as sensor data or action information. Output interface 316 is a component for providing the result of computations in various forms (e.g., text, data, image, or audio signals). Computing device 300 may include various types of input or output interfaces, such as displays, keyboards, cameras, microphones, speakers, antennas, fingerprint sensors, touch sensors, and other measurement sensors. Some input interface 314 may directly work with a machine learning model 340 to perform various functions. For example, a sensor may use a machine learning model 340 to infer interpretations of measurements. Output interface 316 may be in communication with humans, robotic agents, or other computing devices.

The network interface 318 enables the computing device 300 to communicate with other computing devices via a network. The networks may include, but are not limited to, Local Area Networks (LANs) (e.g., an Ethernet or corporate network) and Wide Area Networks (WANs). The network interface 318 allows the computing device 300 to generate outputs of a machine learning model 340 and provide the outputs to other remote devices. The computing device 300 may also receive data from remote devices to run a machine learning model 340. For example, the computing device 300 may receive training data from a Cloud server to perform training of the end user device 340 using the AI-accelerating processor 100. The network communication may be controlled by the CPU 302. In some embodiments, the computing device 300 may be part of a data center network. The network interface 318 allows the computing device 300 to perform communication in a data center network.

Figure 3B:
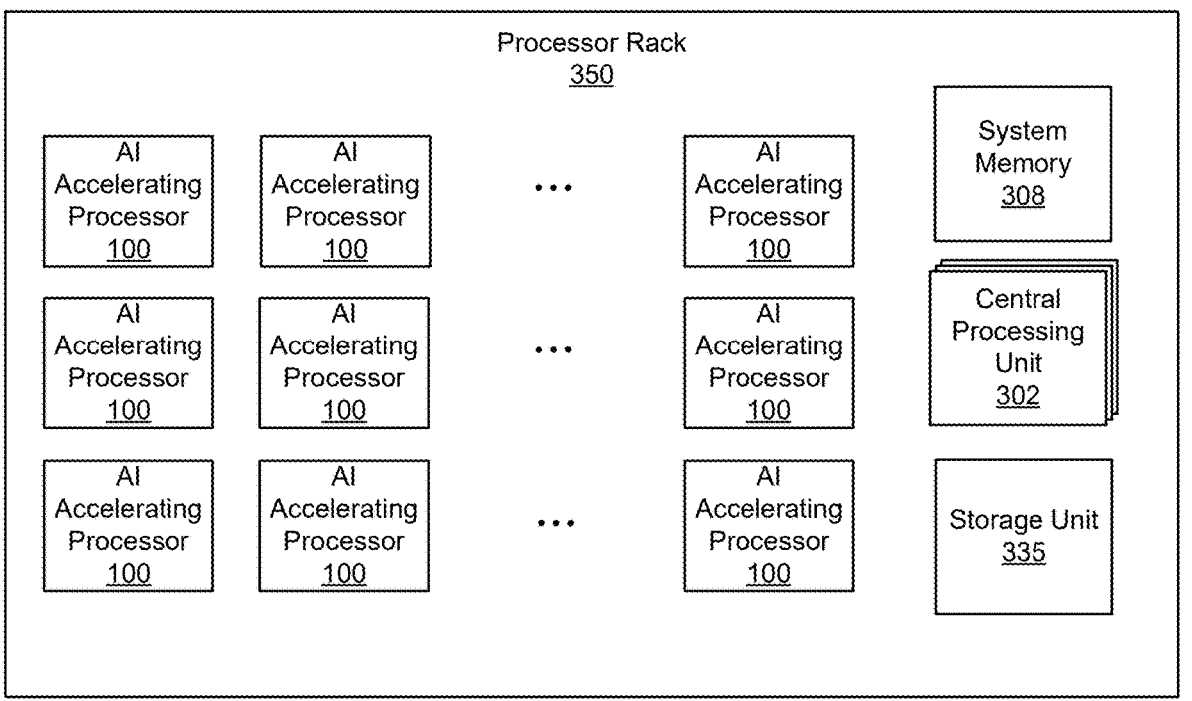
FIG. 3B is a block diagram of an example processor rack, in accordance with some embodiments.

FIG. 3B is a block diagram of an example of a processor system, such as a processor rack 350, in accordance with some embodiments. The processor rack 350 is an example of a computing device 300. A processor rack 350 may take the form of a rack of chips that include a large number of AI-accelerating processors 100 and additional host processors such as CPUs 302. In a typical arrangement, a processor rack 350 may include 64 AI-accelerating processors 100 and 8 CPUs 302, although the actual number of each type of processor may vary in different embodiments. A processor rack 350 may be implemented in a data center, as a server, or in any suitable setting. In some embodiments, a data center may include a stack of processor racks 350 to perform a large number of computations related to AI. A processor rack 350 may include system memory 308, data storage unit 335, and other components illustrated in FIG. 3A.

The AI-accelerating processors 100 in a processor rack 350 may cooperate to perform computations for a large machine learning model, such as an LLM that has billions or trillions of parameters. In some embodiments, a large machine learning model is divided into subparts, and each subpart is stored in the memory 120 of an AI-accelerating processor 100. In some embodiments, the entirety of a large machine learning model is distributively stored in the memory 120 of AI-accelerating processors 100 in one or more processor racks 350. Each AI-accelerating processor 100 performs computation with respect to a subpart of the large machine learning model and the set of AI-accelerating processors 100 cooperatively generate the overall result of the computation. The CPUs 302 may provide control commands and coordination among the AI-accelerating processors 100.

In some embodiments, to facilitate the communication between the AI-accelerating processors 100, an AI-accelerating processor 100 is connected to one or more other AI-accelerating processors 100 in a switchless manner. An AI-accelerating processor 100 may be connected to one or more other AI-accelerating processors 100 in the processor rack 350 or to every one of the AI-accelerating processors 100 in the processor rack 350. In some embodiments, the processor rack 350 may support a global all-reduce command that causes the processor rack 350 to accumulate the matrix multiplication results from a set of AI-accelerating processors 100. The accumulation and other cross-chip operations may be performed among any number of AI-accelerating processors 100 in the processor rack 350. The communication among the AI-accelerating processors 100 may be conducted via the core communication links 150.

Example Model Structure

Figure 4A:
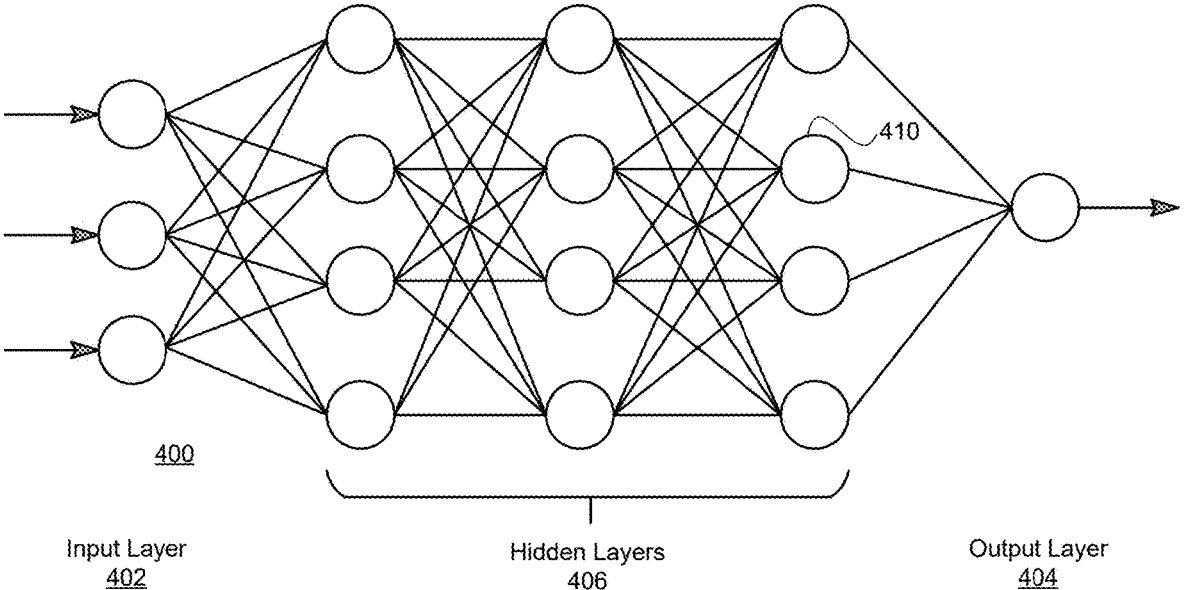
FIG. 4A is a conceptual diagram illustrating an example structure of a machine learning model, in accordance with some embodiments.

FIG. 4A is a conceptual diagram illustrating an example structure of a machine learning model 400, in accordance with some embodiments. The illustrated machine learning model 400 shows a generic structure of a neural network. The machine learning model 400 is an example of machine learning model 340 that can be stored in a computing device 300 or in one or more AI-accelerating processors 100.

Using a neural network as an example, a machine learning model 400 may include an input layer 402, an output layer 404, and one or more hidden layers 406. Input layer 402 is the first layer of machine learning model 400. Input layer 402 receives input data, such as image data, speech data, text, or an output data from an upstream component. Output layer 404 is the last layer of machine learning model 400. Output layer 404 may generate one or more outputs in the form of classifications or probabilities. Machine learning model 400 may include any number of hidden layers 406. Hidden layer 406 are intermediate layers in machine learning model 400 that perform various operations. Machine learning model 400 may include additional or fewer layers than the example shown in FIG. 4A. Each layer may include one or more nodes 410. The number of nodes in each layer in the machine learning model 400 shown in FIG. 4A is an example only. A node 410 may take a different structure and may be associated with certain weights and activation functions. For example, a node 410 in a transformer model may be an encoder, a decoder, etc. Examples of activation functions may include a step function, a sigmoid function, a hyperbolic tangent function (tanh), rectified linear unit functions (ReLU), softmax, etc. In various embodiments, the nodes 410 in machine learning model 400 may be fully connected or partially connected.

Each node 410 in machine learning model 400 may be associated with different operations. For example, in a simple form, machine learning model 400 may be a neural network whose nodes are each associated with a set of weight coefficients and an activation function. In some embodiments, a machine learning model 400 may be an example of a convolutional neural network (CNN). In this example, CNN, nodes 410 in one layer may be associated with convolution operations with kernels as weights that are adjustable in the training process. Nodes 410 in another layer may be associated with spatial pooling operations. In some embodiments, a machine learning model 400 may be a recurrent neural network (RNN) whose nodes may be associated with more complicated structures such as loops and gates. In some embodiments, a machine learning model 400 may be a transformer model whose nodes may be associated with decoder structure and attention mechanisms. Further detail of a transformer model is discussed in FIG. 4B.

In various embodiments, a wide variety of machine learning techniques may be used in training machine learning model 400. Machine learning model 400 may be associated with an objective function (also commonly referred to as a loss function), which generates a metric value that describes the objective goal of the training process. The training may intend to reduce the error rate of the model in generating predictions. In such a case, the objective function may monitor the error rate of machine learning model 400.

Each of the functions in a machine learning model 400 may be associated with different weights (e.g., coefficients, kernels, activation function coefficients) that are adjustable during training. Training of machine learning model 400 may include forward propagation and backpropagation. In forward propagation, machine learning model 400 performs the computation in the forward direction based on the outputs of a preceding layer. The operation of a node 410 may be defined by one or more functions, such as linear operations and non-linear operations. After an input is provided to machine learning model 400 and passes through machine learning model 400 in the forward direction, the results may be compared to the training labels or other values in the training set to determine the neural network's performance. The forward propagation may be repeated for other samples in the training sets to compute the overall value of the objective function in a particular training round.

Gradients may be computed among the nodes 410 in the machine learning model. In turn, machine learning model 400 performs backpropagation by using gradient descent such as stochastic gradient descent (SGD) to adjust the coefficients in various functions to improve the value of the objective function. In some embodiments, one or more AI-accelerating processors 100 may be used to determine the average gradients, which may be determined using operations such as all reduce.

Multiple rounds of forward propagation and backpropagation may be performed. Training may be completed when the objective function has become sufficiently stable (e.g., machine learning model 400 has converged) or after a predetermined number of rounds for a particular set of training samples. The trained machine learning model 400 can be used for making inferences or another suitable task for which the model is trained.

In some embodiments, one or more AI-accelerating processors 100 are used to accelerate any of the computations involved in training the machine learning model 400 and making inferences by the machine learning model 400. Data and functions (e.g., input data, kernels, functions, layers outputs, gradient data) in machine learning may be saved and represented by one or more matrices. Common operations related to training and inference of a machine learning model 400 may include matrix multiplication, matrix transpose, matrix elementwise operation, convolution, application of an activation function, determination of gradients, statistics, and aggregation of values in matrices (e.g., average, variance, standard deviation), matrix rank and size manipulation, etc. An AI-accelerating processor 100 may be designed to accelerate one or more types of computations that are commonly encountered in training and/or inference of a machine learning model 400.

While the term matrix is commonly used in this disclosure, the datasets in a machine learning model 400 are not limited to a particular number of dimensions. Various techniques and architectures described in this disclosure may be applied to tensors that have different dimensions. The term matrices in this disclosure may include high dimensional tensors and are not limited to two dimensional tensors.

In some embodiments, an AI-accelerating processor 100 may provide different degrees of acceleration in the training of a machine learning model 400 and in accelerating the inference of the machine learning model 400. For example, in some machine learning models, such as a transformer-based LLM, training the model requires a higher level of precision than making inferences. In some embodiments, making inferences may be performed using low-precision computations once a machine-learning model is trained. As discussed in FIG. 2, the processing elements 212 of a systolic array 210 may be configured to perform low-precision arithmetic computations, such as computations that are limited to 8-bit precision or 4-bit precision. The AI-accelerating processor 100 in those configurations can drastically improve the computation speed and power consumption of a pre-trained LLM to make inferences. In some embodiments, an AI-accelerating processor 100 may also be used for training.

Example Transformer Model Structure

Figure 4B:
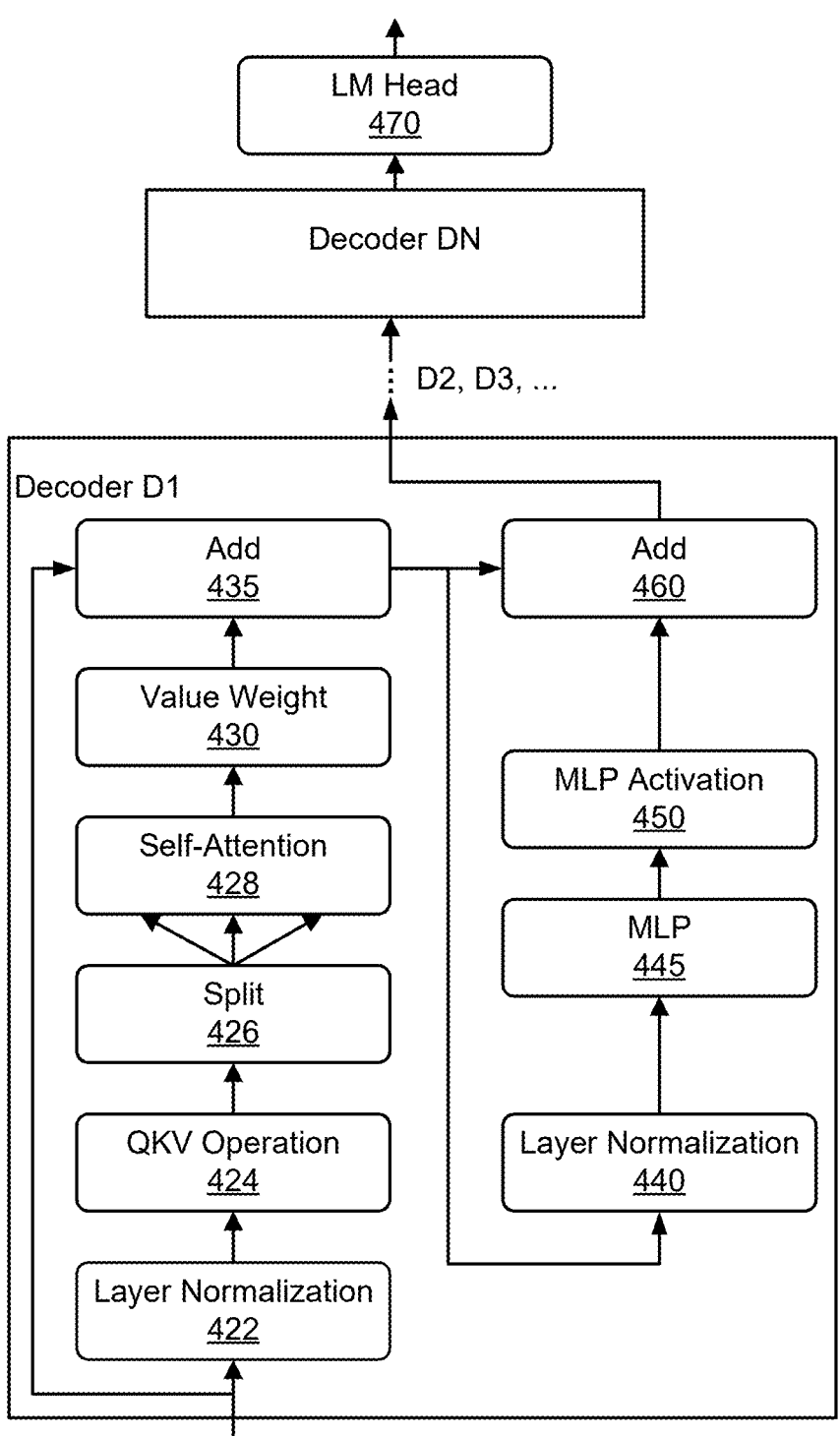
FIG. 4B is a conceptual diagram of functional blocks of a transformer-based neural network model, in accordance with some embodiments.

FIG. 4B is a conceptual diagram of functional blocks of a transformer-based neural network model 420, in accordance with some embodiments. For simplicity, the transformer-based neural network model 420 is referred to as a transformer model 420. The transformer model 420 is an example of a machine learning model 400. An actual transformer model 420 may be a large language model that involves numerous nodes, such as a large number of decoders. The structure illustrated in FIG. 4B is part of a decoder for generating token attention. In a language processing task, the input may take the form of a sequence of words (e.g., a prompt) that may be encoded to a sequence of input tokens. Each token represents a respective word in a latent space. Based on the input tokens, the transformer model 420 may repeatedly generate a sequence of output tokens in an autoregressive manner.

In some embodiments, a transformer model 420 includes a set of N decoders, D1, D2, . . . , and DN. A decoder receives a set of input representations and generates a set of output representations. For example, the first decoder D1 generates a set of output representations. Each subsequent decoder may receive the set of output representations of a previous decoder and generate another set of output representations. For example, the second decoder D2 placed after the first decoder D1 may receive the set of output representations generated by the first decoder D1, and generate another set of output representations. This process is repeated until the set of output representations for the final decoder are generated.

The transformer model 420 may include an LM head block 470 that receives the set of output representations from the final decoder DN and generates an output token as the output for the current iteration.

As shown in FIG. 4B, a decoder in the transformer model 420 includes a first layer normalization block 422, a query-key-value (QKV) operation block 424, a split block 426, a self-attention block 428, a value weight block 430, a first add block 435, a second layer normalization block 440, a multilayer perceptron (MLP) block 445, an MLP activation block 450, and a second add block 460. In some embodiments, the computations in one or more blocks in the decoder are accelerated by one or more AI-accelerating processors 100. While the operations in the first decoder D1 are described as an example, the remaining decoders in the set may include similar operations as the first decoder D1.

FIG. 4B illustrates a flow for attention mechanism of a transformer model 420. The transformer model 420 receives an input sequence of words. Each word may be converted into a token that takes the form of an embedding vector. The sequence of words may be represented as a matrix of embedding vectors with each embedding vector being arranged in a row of the matrix. The layer normalization block 422 receives an input dataset (e.g., the matrix of embedding vectors) and normalizes the data values to generate a normalized dataset (e.g., a normalized matrix).

The QKV operation block 424 receives the normalized input dataset and performs three separate projections to respectively generate a query matrix, a key matrix, and a value matrix. Specifically, the QKV operation may apply a QKV weight matrix, which is a trained set of parameters of the transformer model 420, to the normalized dataset. The trained set of parameters may be stored in memory of the AI-accelerating processor 100, such as in memory 120 and/or cached in matrix cache 215. The operation may include a matrix multiplication between a weight matrix and the normalized input dataset. The matrix multiplication can be accelerated using one or more AI-accelerating processors 100.

The split block 426 may split the output of the QKV operation block 424 into a query matrix, a key matrix, and a value matrix. The self-attention block 428 receives the query matrix, the key matrix, and the value matrix as the inputs and generates an attention matrix. The generation of an attention matrix includes multiplying the query matrix and a transposed version of the key matrix. Such matrix multiplication may be accelerated by one or more AI-accelerating processors 100. In generating attention scores, a softmax operation to each row of the attention matrix may be applied. For example, conceptually, the attention score may be represented by an equation attention=softmax (Q*K/Scale). One or more AI-accelerating processors 100 may be used to accelerate the computation of attention matrix and scores and the application of softmax functions.

The value weight block 430 receives data related to the attention score and generates an attention dataset. The output for each token is a weighted combination of value vectors with the weights given the attention scores determined in the self-attention block 428. The outputs of the value weight block 430 may be computed by a matrix multiplication between the value matrix and the attention matrix after softmax is applied. The matrix multiplication may likewise be accelerated by one or more AI-accelerating processors 100. The add block 435 concatenates results from various layers. The results of the attention sublayer, including results from the add block 435, may be further normalized using the second layer normalization block 440.

A decoder may include one or more multi-layer perceptron (MLP) blocks 445 that include additional neural network layers, which may take the form of feed-forward fully connected layers, such as in a structure similar to the one illustrated in FIG. 4A. One or more MLP blocks 445 may include an MLP activation block 450. In some embodiments, an MLP activation block 450, which typically includes a non-linear activation function, may be nestled between two linear MLP blocks 445. The MLP blocks 445 along with the MLP activation block 450 may be used to introduce non-linearity, perform feature extraction, reduce dimensionality and select tokens for next decoder. In some embodiments, the activation function used in the MLP activation block 450 may be any suitable activation function such as a sigmoid function, a hyperbolic tangent function (tanh), a rectified linear unit function (ReLU), or a Gaussian Error Linear Unit function (GeLU). Outputs of the MLP blocks may be further concatenated in the add block 460.

The output of a first decoder D1 is passed to a subsequent decoder. This process is repeated until the set of output data from the final decoder DN are generated. While each decoder may involve similar operations as the first decoder D1, the trained set of parameter values that are associated with the operations may be different from decoder to the decoder. The LM head block 470 receives output from the final decoder DN to determine an output token. Additional softmax operation may be performed at LM head block 470 to determine the final attention scores.

In this disclosure, various operations that are described in FIGS. 4A and 4B, such as matrix multiplications, vector dot products, softmax operations, and other linear or non-linear operations, may be referred to generally as machine learning operations or machine learning computations. The various operations that are described in FIG. 4B in association with the transformer model 420 may also be referred to as transformer operations or transformer computation. Those machine learning operations, including transformer operations, may be accelerated by one or more AI-accelerating processors 100 using the architecture and techniques described in this disclosure.

While in this disclosure the computations of AI-accelerating processors 100 are described as accelerating machine learning operations and transformer operations, in various embodiments an AI-accelerating processor 100 may also be used in accelerating other computations such as matrix multiplications that are not in a machine learning setting.

Example Software Compiling Process

Figure 5:
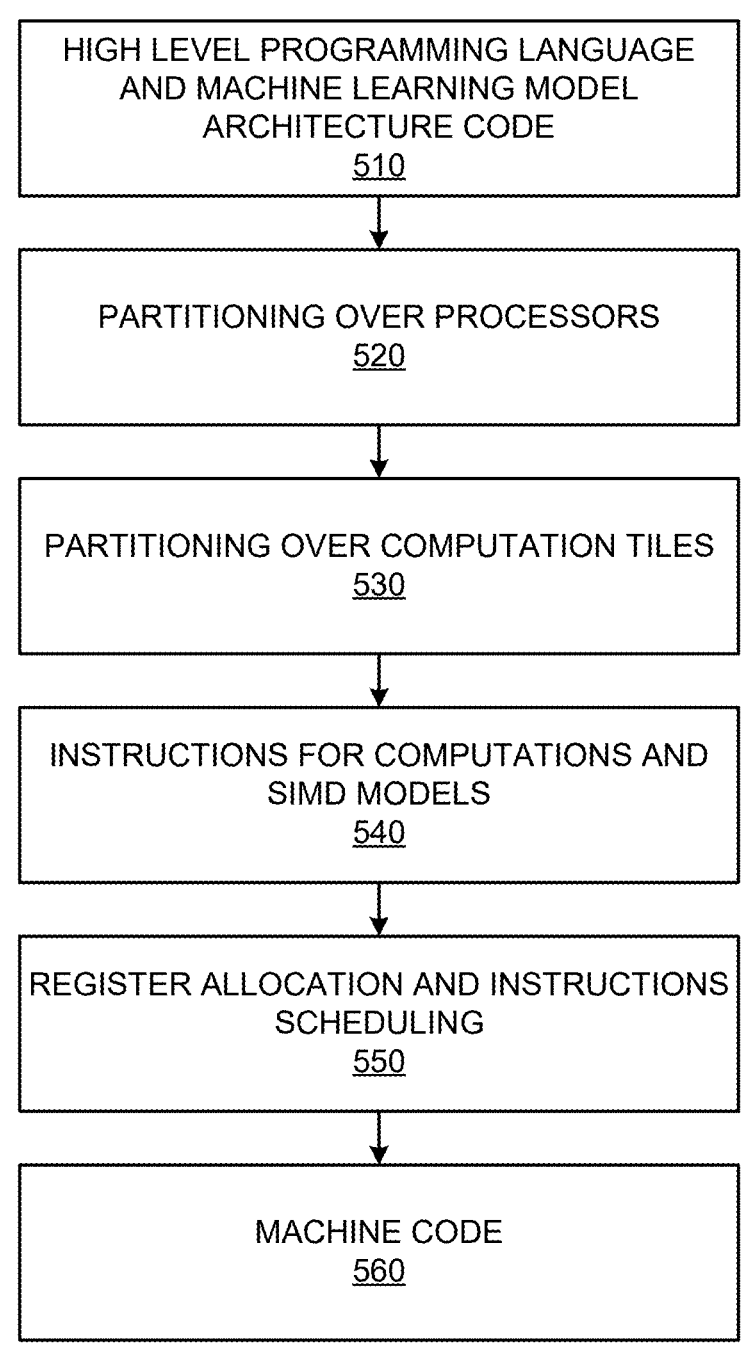
FIG. 5 is a flowchart illustrating an example process to execute one or more AI-accelerating processors, in accordance with some embodiments.

FIG. 5 is a flowchart illustrating an example process 500 to execute one or more AI-accelerating processors 100, in accordance with some embodiments. The process 500 illustrates how software code may be executed and compiled into machine code to be executed by one or more AI-accelerating processors 100. In various embodiments, the process 500 may include different, more, or fewer steps. The steps may also be performed in a different order from that illustrated in FIG. 5. In some embodiments, AI-accelerating processors 100 may be coupled with software that provides flexibility to a software engineer (e.g., a data scientist) to determine how data may be computed in parallel. The software related to AI-accelerating processors 100 may take the form of a library package that allows the software engineer to specify various parameters in controlling partitioning, scheduling, and load balancing of the AI-accelerating processors 100. This offers additional configuration flexibility that is not available in conventional processors and firmware designs.

At step 510, a machine learning model 400 may be coded in a high-level programming language that includes machine learning model architecture code. The high-level programming language may be PYTHON, C++, R, etc. and the machine learning model may be stored as an object that includes parameters specified by common machine learning libraries such as TENSORFLOW, PYTORCH, KERAS, etc. The software engineer may initially define the structures and hyperparameter ranges of the machine learning model. The final trained values of various weights may be determined through training of the machine learning model 400. In some embodiments, the machine learning model 400 may be pre-trained by a third party such as by an LLM provider or being resided in an open-sourced library. The machine learning model 400 may be incorporated in or in communication with an application 330 to make inferences, such as in generating text for the application 330. Whether the machine learning model 400 needs to be trained or is performing inference, one or more AI-accelerating processors 100 may be deployed to accelerate the computations in the machine learning model 400.

The programming language may incorporate a library that is related to the control of one or more AI-accelerating processors 100. At step 520, parameters in partitioning over AI-accelerating processors 100 may be specified. The partitioning over AI-accelerating processors 100 may be used in situations where multiple AI-accelerating processors 100 cooperatively perform computations, such as in a processor rack 350. Depending on the type of compiler used in AI-accelerating processors 100, those parameters in partitioning over AI-accelerating processors 100 may be specified in a high-level programming language or automatically by a compiler. In some embodiments, a large machine learning model 400, such as an LLM, is split and stored in a distributed fashion among multiple AI-accelerating processors 100. How the machine learning model 400 is split may be controlled by the software engineer using software instructions.

In some embodiments, at step 530, parameters in partitioning over computation tiles 112 may be specified. In some embodiments, in large matrix multiplication, a matrix is split into multiple subsets for computations. The computations of the subsets may occur in parallel among computation tiles 112 and/or in series over multiple computation cycles. These options may be specified in a high-level programming language manually or be specified automatically by a compiler. For example, a software engineer may use the imported library to control how a matrix should be split (e.g., in terms of dimensions and sizes) and stored in the computation tiles 112.

In some embodiments, at step 540, instructions for computations and SIMD models may be specified. An AI-accelerating processor 100 may use a series of collective operation instructions to perform a matrix multiplication using the grid of computation tiles 112, as discussed above in the description in association with FIG. 1B. Those collective operation instructions may be specified in a high-level programming language or automatically by a compiler. In some embodiments, a software engineer may use the imported library to control the computation steps and instructions of a matrix multiplication that is going to be performed in the grid of computation tiles 112. Other controls and parallelism instructions may also specified at the software level.

In some embodiments, the high-level software code is converted into intermediate-level code after step 540 and, at step 550, a compiler is used to generate register allocation and instructions scheduling. In some embodiments, the compiler is a low-level compiler that allows software to perform control of various things that are conventionally unavailable to a software engineer. For example, in some embodiments, unless not specified in software, the compiler does not perform determination related to memory allocation, data layout on the AI-accelerating processor 100, or parallelism instructions. Those instructions and parameters may be specified on the software level, thereby offering controls and flexibility to software engineers to determine how computations in a machine learning model 400 should be run in one or more AI-accelerating processors 100. A compiler may receive the parameters and instructions specified in step 510 through step 540 and convert higher-level code into machine code. In turn, the compiler may determine register allocations with the AI-accelerating processor 100 and determine the scheduling of instructions.

At step 560, machine code is generated and used to execute one or more AI-accelerating processors 100. The computations in a machine learning model 400 are thereby accelerated using the combination of specific hardware architecture and techniques described in this disclosure and parameters and instructions specified in the software.

Example Collective Operations

Figure 6A:
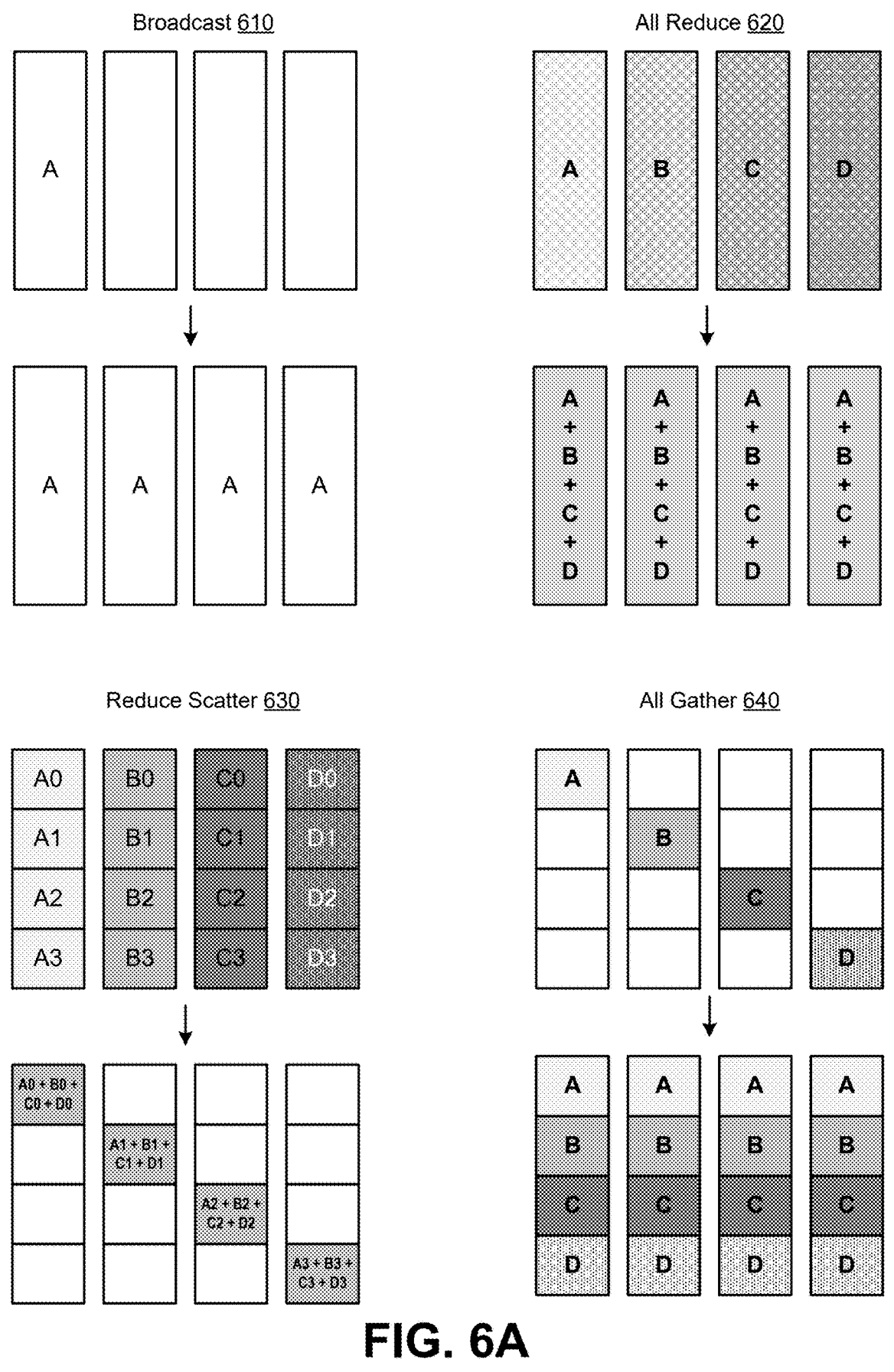

FIG. 6A is a conceptual diagram illustrating various examples of collective operations that may be performed by one or more AI-accelerating processors 100, in accordance with some embodiments. Collective operations specify how data are transmitted and computed in parallel programming. Examples of collective operations include broadcast, scatter, gather, reduce, all-reduce, reduce-scatter, all-gather, all-to-all, and other collective operations. The collective operations may be used as part of machine learning operations that are used by AI-accelerating processors 100 to accelerate the computation of machine learning models. For example, matrix multiplication can be carried out in AI-accelerating processors 100 using a series of collective operations.

The illustration 610 shows a broadcast pattern that distributes data from a source to a set of processing nodes. The same data is distributed to the set of processing nodes. The source can be any suitable source, such as another processing node, a memory address, etc. The broadcast operation may be completed in a single time step or a series of time steps. For example, in one case, each processing node in the destination set may fetch the data from the same memory address so that all of the processing nodes in the set receive the same data at the same time step. In another case, at one time step, the data may be transmitted from a first processing node to a second processing node. At the next time step, the second processing node may continue to pass the data to a third processing node until all processing nodes in the set sequentially receive the data.

The illustration 620 shows an all-reduce pattern that causes all processing nodes to perform reduction operations. Reduction may be used to collect data from different processing nodes and combine the data. Reduction may be any type of associative data aggregation, such as accumulation (summing the data), maximum, minimum, certain statistical reduction, or another suitable associative operation. In an all-reduce operation, each of the processing nodes is performing the same reduction operation to achieve the same result. All-reduce operations are common in machine learning operations. For example, in some cases in training of a machine learning model, gradient data are all-reduced to determine an overall gradient. A value of the resultant matrix in matrix multiplication may also be generated by all-reduce. Typical reduction may include accumulating computation data from various processing nodes. In some embodiments, to improve the efficiency of performing all-reduce, the all-reduce process may be divided into a reduce-scatter operation and an all-gather operation.

The illustration 630 shows a reduce-scatter pattern that causes individual processing nodes to perform their respective reduction operation and store a portion of the computation results. As such, the overall computation result is scattered among the processing nodes. Each processing node contributes to a portion of the overall result. The overall reduction operation is distributed among the processing nodes in a balanced manner. Typically, each processing node at the end receives a result that is a component of the overall result and the component result of each processing node is contributed by all of the processing nodes in the set.

The illustration 640 shows an all-gather pattern that causes processing nodes in a set to gather data that are distributed among other processing nodes. The end result is that all of the processing nodes receive the same data that are gathered from the processing nodes in the set. The data gathering process may be performed in an asynchronized manner (e.g., not every processing node receives the same data at the same time step) until every processing node receives all of the data gathered. The reduce-scatter operation shown in illustration 630 can be combined with the all-gather operation shown in illustration 620 to generate the result of an all-reduce operation shown in illustration 620.

Figure 6B:
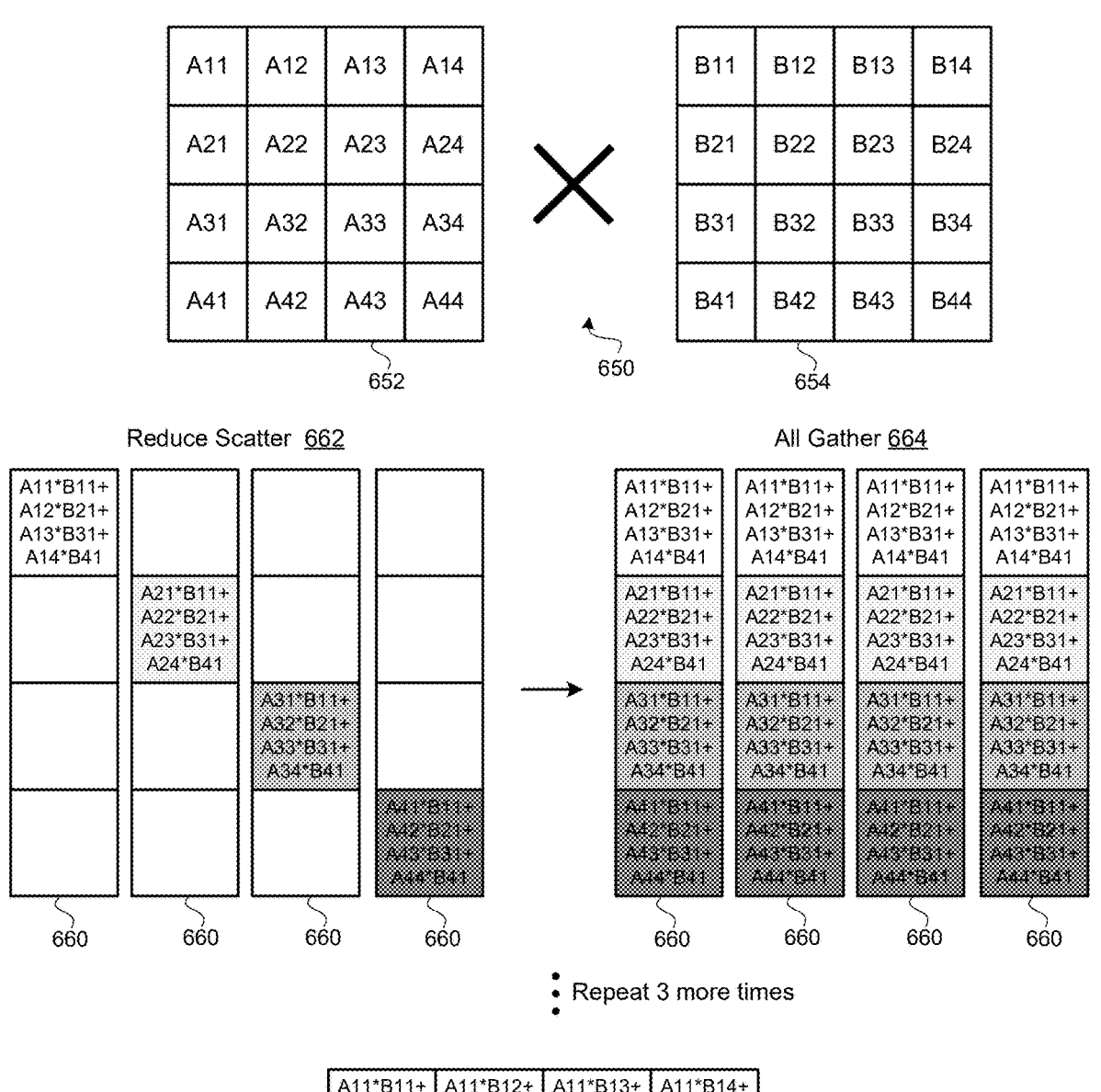
FIG. 6B is a conceptual diagram illustrating how a matrix multiplication may be performed using a series of reduced scatter and all-gather operations in one or more AI-accelerating processors, in accordance with some embodiments.

FIG. 6B is a conceptual diagram illustrating how a matrix multiplication may be performed using a series of alternating reduce-scatter and all-gather operations in one or more AI-accelerating processors 100, in accordance with some embodiments. A matrix multiplication may be part of a machine learning operation that is accelerated by one or more AI-accelerating processors 100. For example, matrix multiplications are common in both training and inference in a transformer model 420, as discussed in FIG. 4B.

The matrix multiplication process 650 may be performed between a left matrix A 652 and a right matrix B 654. While both matrices are illustrated as having the size of 4×4 elements, the matrices can be of different sizes and do not need to be square. The process 650 may be performed by a set of processing nodes 660, such as four processing nodes.

In some embodiments, the matrix multiplication may be performed as a series of reduce-scatter 662 and all-gather 664 operations. In a reduce-scatter operation 662, a column (or a row, depending on how data are arranged) of the right matrix B 654 may be treated as a column vector, and the values in the column may be scattered to the four processing nodes 660 in the set. For example, each processing node 660 may respectively receive one of the values in the first column B11, B21, B31, and B41. The processing nodes 660 may fetch the rows in the left matrix A 652 and perform multiplications between an individual element of left matrix A 652 and an individual element of right matrix B 654. The multiplication results of the individual elements are accumulated (reduced) at each processing node 660. Since each processing node 660 handles the multiplication and accumulation of different individual elements, the partial results of the overall matrix multiplication 650 are scattered among the processing nodes 660, as illustrated in FIG. 6B.

The scattered results are followed by an all-gather operation 664 so that the individual processing node 660 gathers the multiplication results of one of the column vectors of the right matrix B 654. In some embodiments, a scattered result stored in a processing node 660 is transmitted to all other processing nodes 660 in the set. The end result of the all-gather operation 664 is that each processing node includes a column vector of the final matrix C 670. For example, FIG. 6B illustrates that the combination of reduce-scatter 662 and all-gather 664 operation generates the left-most column vector of the final matrix C 670. Additional column vectors of the final matrix C 670 may be generated by repeating the reduce-scatter and all-gather operations for other column vectors of the right matrix B 654.

The processing of different column vectors of the right matrix B 654 may be performed by repeating the reduce-scatter 662 and all-gather 664 operations multiple times using the same set of processing nodes 660. For example, in the next set of operations, a second column vector of the right matrix B 654 that includes the values B12, B22, B32, and B42 may be scattered to the processing nodes 660. The same type of reduce-scatter followed by an all-gather operation is repeated to generate the second column vector of the final matrix C 670. The operations may be repeated for the third column vector of the right matrix B 654 which includes the values B13, B23, B33, and B43, and also for the fourth column vector which includes the values B14, B24, B34, and B44.

The precise operation of matrix multiplication carried out by one or more AI-accelerating processors 100 may depend on implementations and the sizes of the two matrices. For example, in some embodiments, instead of using the same set of processing nodes 660 to generate column vectors of the final matrix C 670 by repeating operations, additional sets of processing nodes 660 may also be used to handle different column vectors of the right matrix B 654 in parallel with other sets of nodes and the resultant column vectors of the final matrix C 670 are combined to form the final matrix C 670. In some embodiments, instead of breaking up the right matrix B 654 into column vectors, an AI-accelerating processor 100 may also break up the left matrix A 652 into row vectors and perform a series of reduce-scatter and all-gather to obtain the same final matrix C 670. In some embodiments, both the left matrix A 652 and the right matrix B 654 may have one or more dimensions that are larger than the size of the set of processing nodes 660. One or both matrices may be broken down into sub-matrices and the reduce-scatter-all-gather operations may be repeated until all of the required computations are performed to generate the final matrix C 670.

Re-Rounding Operation and Processor Architecture

When performing computations on a processor, it can sometimes be useful to convert a number from a high-precision number format (such as float64 or float32) to a lower-precision number format (such as float16, bfloat16, int8, int4, int2, int1, etc.), in order to perform calculations more efficiently, reduce silicon area, and improve power consumption.

This conversion step typically introduces some rounding errors, which can harm the accuracy of the overall computation. The rounding error is particularly pronounced in processors that mainly operate on a low precision level. For example, in some embodiments, an AI-accelerating processor 100 may perform one or more machine learning operations, such as operations involving matrix multiplication, in low-precision formats. In some embodiments, an AI-accelerating processor 100 may operate in 8-bit precision or 4-bit precision in performing machine learning calculations. In a 4-bit precision operation, whether a value is rounded up or rounded down (1 bit flip) contributes to a largely large rounding error because the value has only 4 bits.

In some embodiments, an AI-accelerating processor 100 uses a re-rounding technique and corresponding hardware architecture to reduce the rounding errors. Often one or more machine learning operations performed at an AI-accelerating processor 100 include using the same value multiple times within a computation. For example, in matrix multiplication that is illustrated in FIG. 6B, each value in a matrix 652 or matrix 654 is used at least 4 times in completing the entire multiplication. In actual cases of matrix multiplication for machine learning operations, such as those involved in a transformer model 420, the matrix size may be in the magnitude of thousands by thousands or even bigger. As such, a value in a matrix is used many times. In some embodiments, in bringing down a value from a first precision level to a second precision level, which is lower than the first precision level, instead of rounding the value just once from high precision to low precision, an AI-accelerating processor 100 or corresponding software executing a machine learning model may round the high precision value multiple times and differently among the rounding occasions.

In some embodiments, rounding the same value multiple times in different manners (e.g., sometimes rounding up and sometimes rounding down) is referred to as re-rounding in this disclosure. By using re-rounding, the rounding errors often partially cancel out. This canceling-out effect can improve the overall accuracy of the computation, by reducing the effective overall rounding error. For example, if a value x is used multiple times in a computation, the conventional practice is to make the rounding choice (round up or round down) the same way every time. In some embodiments, instead of the conventional practice, the value may be rounded up or rounded down differently on different occasions. For instance, using a decimal number as illustration, if x=12.3 is used 4 times in a computation, an AI-accelerating processor 100 may round x up one time to the value 13, and round x down to three times the value 12. This induces rounding errors of 0.7, −0.3, −0.3, and −0.3. The average rounding error in this case is (0.7-0.3-0.3-0.3)/4=−0.05, which is much smaller than any of the individual rounding errors 0.7 or −0.3. The same principle also applies to rounding binary numbers, which are performed by the AI-accelerating processor 100. Often, computations are more sensitive to the average rounding error than the individual rounding errors. This approach may improve the accuracy of such computations. The improvement is particularly significant in a low-precision processor, such as a 4-bit or 8-bit processor.

The rounding of the same value multiple times may be performed by parameterizing each occasion of rounding on some other inputs such as a random number, a counter, or an index that may be sequential or shuffled. By parameterizing the occasions of rounding, a value may be rounded up or down in occasions proportional to the least significant bits that are to be rounded. Using the decimal number 12.3 as an example, in some embodiments, the re-rounding may be performed such that 7 out of 10 occasions the value is rounded down, and on the remaining 3 occasions the value is rounded up. The same principle may apply to binary values.

The re-rounding may be applied in one or more machine learning operations performed by an AI-accelerating processor 100, although in various embodiments any type of computations, such as non-machine learning operations, may also use various re-rounding techniques discussed in this disclosure. In various parts of this disclosure, matrix multiplication is used as an example for performing value re-rounding. However, the disclosure should not be construed as being limited to applying the re-rounding techniques in only matrix multiplication. The re-rounding techniques may be used in any computations that involve the use of the same value two or more times.

The pseudocode below illustrates an example matrix multiplication computation, in accordance with some embodiments. The matrix multiplication may be performed between a left matrix X that has the size I*J and a right matrix Y that has the size J*K. The result is in the size of I*K. Small letters i, j, and k denote the indices for various positions of the two matrices. The matrix multiplication computation may be represented by one or more for loops. By way of example,

```
for i in I:
    for j in J:
        for k in K:
            result[i, k] += x[i, j] * y[j, k]
```

In various embodiments, re-rounding may occur at any appropriate level of for-loops. In some embodiments, re-rounding may occur at the lowest level of for-loops. As such, every time a value is used in computation, the value in the first precision level is rounded again. In some embodiments, re-rounding may occur at a higher level of for-loops. For example, re-rounding may occur in groups so that the same value is rounded the same way multiple times within a particular group and then rounded in a different way for another group. Hardware architecture of various ways of performing re-rounding in various manners is further described in FIG. 7 and FIG. 8.

Re-Rounding Systolic Array Architecture

Figure 7:
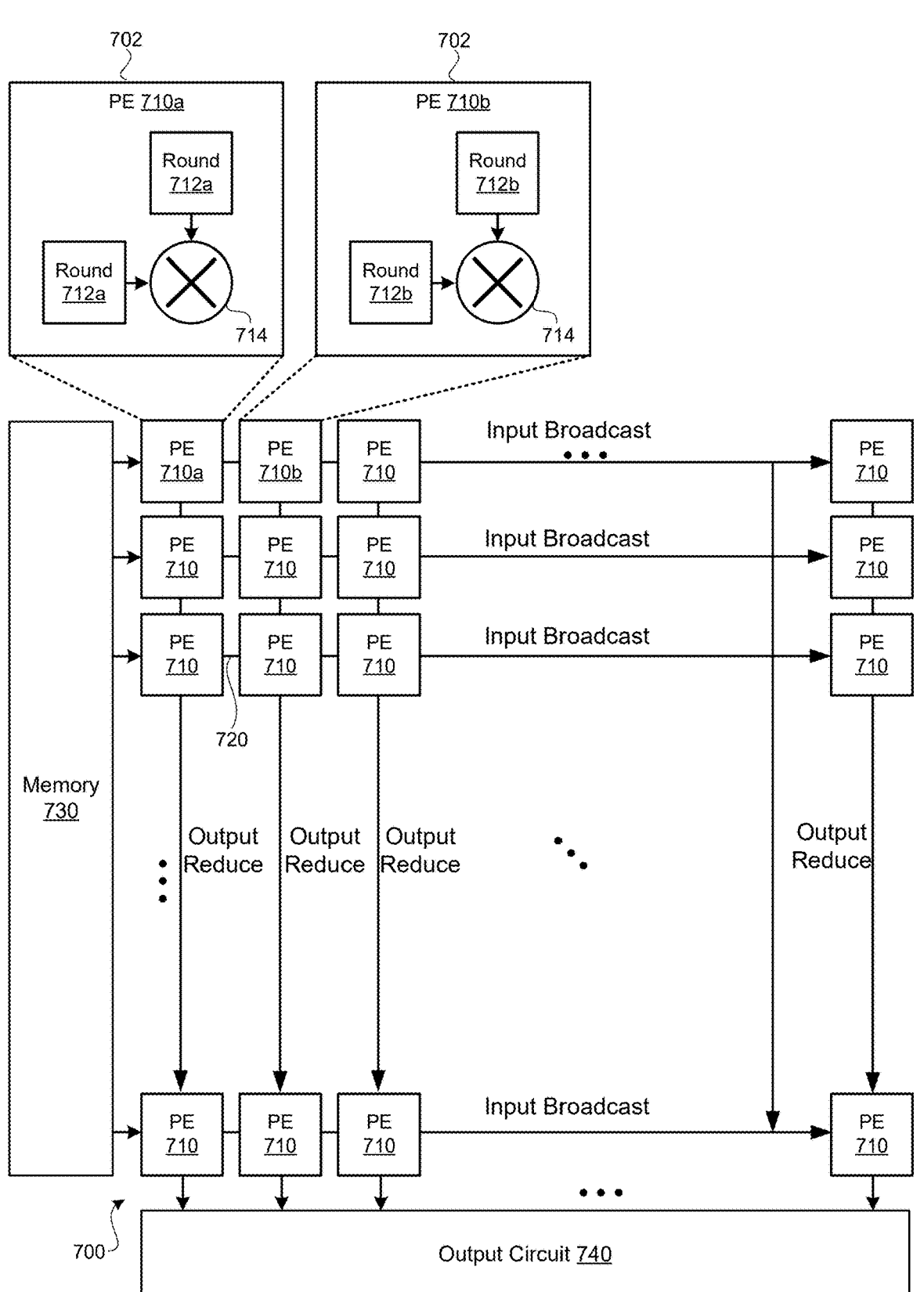
FIG. 7 is a block diagram illustrating an example systolic array, in accordance with some embodiments.

FIG. 7 is a block diagram illustrating an example systolic array 700, in accordance with some embodiments. The systolic array 700 may be an example of computation circuits 110 illustrated in FIGS. 1A and 1B. In some embodiments, a computation tile 112 or a systolic array 210 illustrated in FIG. 2 may also take the form of the systolic array 700 or a similar structure. In some embodiments, systolic array 700 may be a component of an AI-accelerating processor 100.

The systolic array 700 includes a plurality of processing elements (PEs) 710 that are arranged in a grid. Each PE 710 may be connected to neighboring PEs 710 through communication links 720, in both longitudinal and lateral directions. In some embodiments, the communication links 720 are bi-directional. A PE 710 may include various computation and storage circuits, such as arithmetic circuits, logic circuits, and registers. An example of PE 710 is discussed in FIG. 2 in association with the discussion of processing elements 212. The systolic array 700 may include circuitry to accelerate the computations of various machine learning operations, such as matrix multiplication and, in some embodiments, certain non-linear operations such as various types of activation functions discussed in FIGS. 4A and 4B.

In some embodiments, the systolic array 700 is communicatively connected to memory 730, which may be used to store values of different types of datasets used in an AI-accelerating processor 100. For example, a dataset may take the form of a matrix. The matrices stored in memory 730 may include weight matrices, which store the weights of a machine learning model, activation matrices that are calculated in forward propagation, and gradient matrices that can be used to adjust the weights of a machine learning model in backpropagation. In some embodiments, values, such as those in matrices, may be stored in the memory 730 at a first precision level (pre-rounding precision level) that is higher than a second precision level (rounded precision level) that is used in the calculation.

For example, in some embodiments, the values in memory 730 may be at a 32-bit precision level and the PEs 710 in the systolic array 700 perform calculations at a 16-bit precision level. In some embodiments, the values in memory 730 may be at a 16-bit precision level and the PEs 710 in the systolic array 700 perform calculations at an 8-bit precision level. In some embodiments, the values in memory 730 may be at an 8-bit precision level and the PEs 710 in the systolic array 700 perform calculations at a 4-bit precision level. In some embodiments, the values in memory 730 may be at an 8-bit precision level and the PEs 710 in the systolic array 700 perform calculations at a 3-bit precision level. In some embodiments, the values in memory 730 may be at an 8-bit precision level and the PEs 710 in the systolic array 700 perform calculations at a 2-bit precision level. In some embodiments, the values in memory 730 may be at an 8-bit precision level and the PEs 710 in the systolic array 700 perform calculations at a 1-bit precision level.

The memory 730 may take different forms, such as HBM, SRAM, cache, and any suitable on-chip memory that may be presented in an AI-accelerating processor 100. For example, the memory 730 may be an example of memory 120 illustrated in FIGS. 1A and 1B, or matrix cache 215 or internal result cache 220 illustrated in FIG. 2.

In some embodiments, in performing parallel computations, the systolic array 700 may transmit values to be computed in a first direction through one or more collective operations and reduce the locally computed outputs in a second direction. For example, in some embodiments, the systolic array 700 may broadcast one or more inputs in the lateral direction. The individual PEs 710 perform computations using the inputs, such as doing elementwise multiplications. The locally computed outputs are reduced (e.g., accumulated) towards the bottom in the longitudinal direction, as illustrated in FIG. 7. The final outputs may be transmitted out of the systolic array 700 to the output circuit 740. The output circuit 740 may include communication links that are in communication with other systolic arrays 700 in one or more AI-accelerating processors 100. The output circuit 740 may also include memory that may temporarily store the outputs of the systolic array 700.

FIG. 7 illustrates a configuration in which each PE 710 has rounding circuits 712 (712*a* or 712*b*, collectively referred to as rounding circuits 712) that are used to round values that are inputted to the PE 710. As illustrated in any one of insets 702, a PE 710 (710*a* or 710*b*, collectively referred to as PEs 710) may include rounding circuits 712 and an arithmetic circuit 714, which may take the form of a multiplier that performs elementwise multiplication between two rounded values. Each rounding circuit 712 may be used to round a value at the first precision level to a second precision level that is lower than the first precision level. For example, the two round circuits 712 may round a value from a left matrix and a value from a right matrix in matrix multiplication. The two rounded values are passed to the arithmetic circuit 714 to perform computation, such as multiplication between the two rounded values.

FIG. 7 illustrates a systolic array 700 that allows re-rounding every time a value is used in the computation. For example, in some embodiments, each PE 710 includes one or more rounding circuits 712 so that the same value broadcasted to the PEs 710 may be rounded differently. By way of example by focusing on PE 710*a* and PE 710*b*, each of the PE 710*a* and PE 710*b* may include one or more rounding circuits 712. The PE 710*a* may include one or more first rounding circuits 712*a* and the PE 710*b* may include one or more second rounding circuits 712*b*. A value of a matrix may be stored in memory 730 at a first precision level. The same value may be transmitted to both the PE 710*a* and the PE 710*b* in one or more collective operations such as broadcasting. In turn, a first rounding circuit 712*a* in the PE 710*a* and a second rounding circuit 712*b* may round the same value differently to respectively generate a first rounded value and a second rounded value that is different from the first rounded value. Specifically, upon receiving the value, the first rounding circuit 712*a* may round the value up while the second rounding circuit 712*b* may round the same value down, or vice versa. In some embodiments, the value is broadcasted to a plurality of rounding circuits 712 (e.g., rounding circuits 712 in each PE 710 in a row of the systolic array 700), and rounding of the value is performed differently in parallel in the plurality of rounding circuits. The precise manner of how a rounding circuit 712 determines a rounding result is further discussed below in this disclosure.

Figure 8:
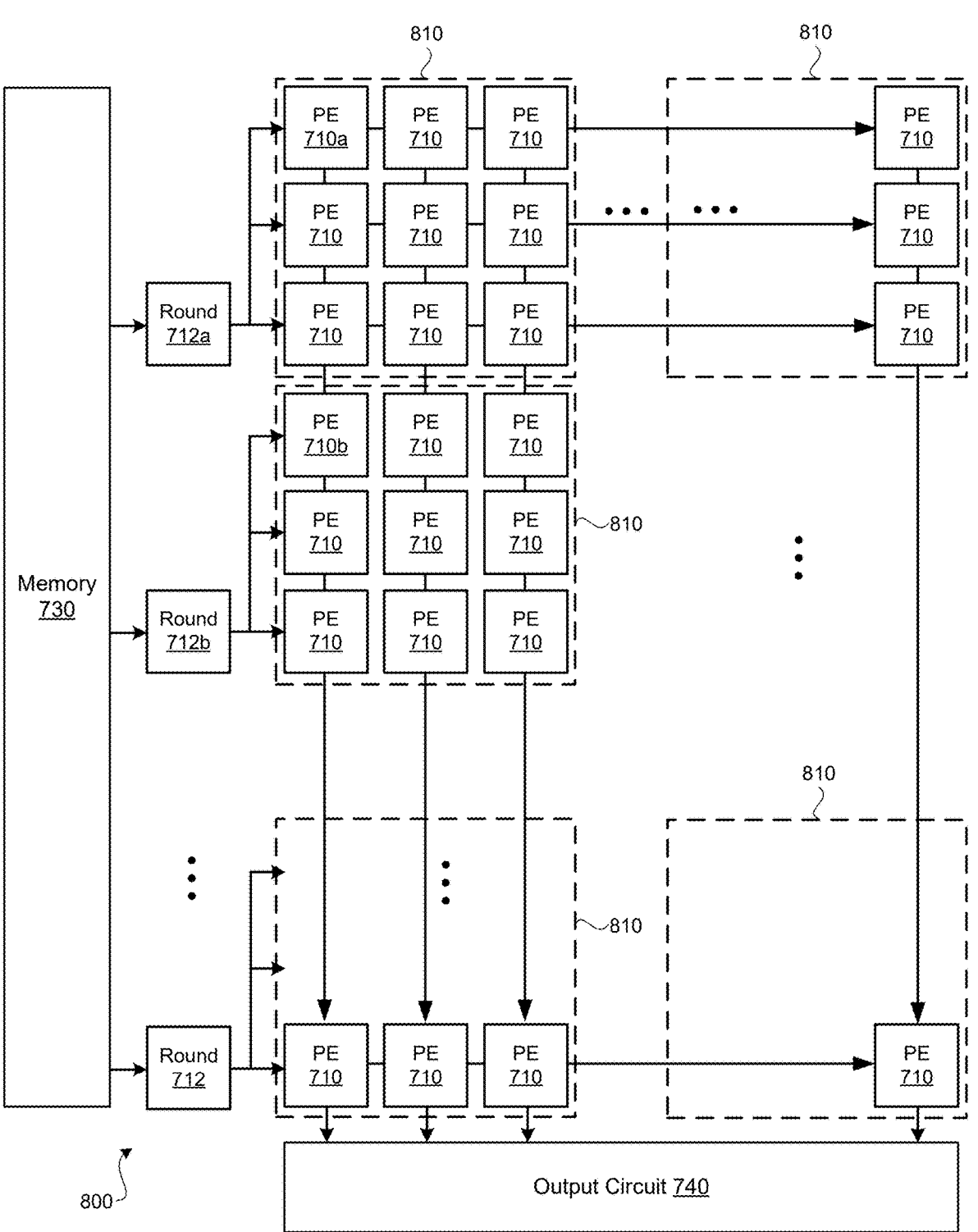
FIG. 8 is a block diagram illustrating an example systolic array, in accordance with some embodiments.

Note that the first PE 710*a* and second PE 710*b* do not need to be neighboring PEs. Likewise, the first rounding circuit 712*a* and the second rounding circuit 712*b* do not need to be neighboring. The locations of the first and second PEs or the first and second rounding circuits 712 in FIG. 7 and FIG. 8 are merely examples for illustration purposes. As such, two PEs neighboring each other may generate the same rounded result.

By generating rounded values individually at each PE 710, the various PEs 710 may perform computations, such as matrix multiplication, involving the value using different rounded values. For example, the PE 710*a* may use the first rounded value to perform computation. The PE 710*b* may use the second rounded value to perform computation.

The precise number of PEs 710 present in the systolic array 700 may vary depending on embodiments. For example, in some embodiments, the systolic array 700 may include over 10×10 PEs 710. In some embodiments, the systolic array 700 may include over 50×50 PEs 710. In some embodiments, the systolic array 700 may include over 100×100 PEs 710. In some embodiments, the systolic array 700 may include over 500×500 PEs 710. In some embodiments, the systolic array 700 may include over 1,000×1,000 PEs 710. In some embodiments, the systolic array 700 may include over 2,000×2,000 PEs 710. In some embodiments, the systolic array 700 may include over 3,000×3,000 PEs 710. In some embodiments, the systolic array 700 may include over 4,000×4,000 PEs 710. In a larger systolic array, the same value may be broadcasted many times to the PEs 710. For example, for a systolic array 700 that has over 1,000×1,000 PEs 710, the same value may be broadcasted at least 1,000 times to PEs 710.

In some embodiments, the PEs 710 in the systolic array 700 may perform computations with a relatively low precision. For example, in some embodiments, the PEs 710 in the systolic array 700 may perform computations in 16-bit precision by rounding higher-precision values to 16-bit rounded values. In some embodiments, the PEs 710 in the systolic array 700 may perform computations in 8-bit precision by rounding higher-precision values to 8-bit rounded values. In some embodiments, the PEs 710 in the systolic array 700 may perform computations in 7-bit precision by rounding higher-precision values to 7-bit rounded values. In some embodiments, the PEs 710 in the systolic array 700 may perform computations in 6-bit precision by rounding higher-precision values to 6-bit rounded values. In some embodiments, the PEs 710 in the systolic array 700 may perform computations in 5-bit precision by rounding higher-precision values to 5-bit rounded values. In some embodiments, the PEs 710 in the systolic array 700 may perform computations in 4-bit precision by rounding higher-precision values to 4-bit rounded values. In some embodiments, the PEs 710 in the systolic array 700 may perform computations in 3-bit precision by rounding higher-precision values to 3-bit rounded values. In some embodiments, the PEs 710 in the systolic array 700 may perform computations in 2-bit precision by rounding more higher-precision values to 2-bit rounded values. In some embodiments, the PEs 710 in the systolic array 700 may perform computations in 1-bit precision by rounding more higher-precision values to 1-bit rounded values.

In some embodiments, the systolic array 700 may combine a large systolic array 700 (with over 1,000×1,000 PEs 710) and low-precision PEs 710 (with a precision level lower than 8 bits, such as PEs 710 that perform computations using 4 bits). By combining a large systolic array 700 with low-precision PEs 710, the computation speed, bandwidth access requirement, and energy consumption of a systolic array 700 can be significantly improved. In some embodiments, since low precision PEs 710 (e.g., 4 bits) are significantly more sensitive to rounding errors, the systolic array 700 uses re-rounding to reduce the errors and improve the accuracy of computation.

FIG. 8 is a block diagram illustrating an example systolic array 800, in accordance with some embodiments. The systolic array 800 may share many characteristics with the systolic array 700. Unless otherwise specified, a systolic array 800 may include any components and characteristics of the systolic array 700 discussed in FIG. 7. Components that are the same or similar to the components in systolic array 700 are not repeatedly discussed in FIG. 8.

FIG. 8 illustrates some embodiments of a systolic array in which the plurality of PEs 710 in the systolic array 800 are grouped in a plurality of blocks 810. Each block 810 includes a subset of PEs 710. Each block 810 is connected to a rounding circuit 712 that is used to generate rounded values for the PEs 710 in the block 810. For example, the same value may be broadcasted to a few blocks 810. Each block 810 may round the same value individually using the corresponding rounding circuit 712. Within a block 810, the PEs 710 receive the same rounded value. Between two blocks 810, the PEs 710 in one block may receive a first rounded value of the original value and the PEs 710 in another block may receive a second rounded value of the original value.

For example, focusing on PE 710a and PE 710b, each of the PE 710a and PE 710b may be respectively in communication with the first rounding circuit 712a and the second rounding circuit 712b. A value of a matrix may be stored in memory 730 at a first precision level. The same value may be transmitted to both the first rounding circuit 712a and the second rounding circuit 712b in one or more collective operations such as broadcasting. In turn, the first rounding circuit 712a and the second rounding circuit 712b may round the same value differently to respectively generate a first rounded value and a second rounded value that is different from the first rounded value. For example, upon receiving the value, the first rounding circuit 712a may round the value up while the second rounding circuit 712b may round the same value down, or vice versa. In turn, the first rounded value is transmitted to the PE 710a and all other PEs 710 in the same block 810 for computation and the second rounded value is transmitted to the PE 710b and all other PEs 710 in the same block 810 for computation.

The grouping of PEs 710 in blocks 810 may reduce the silicon area occupied by the plurality of rounding circuits 712. Compared to the systolic array 700, since each PE 710 includes one or two rounding circuits 712, a large number of rounding circuits 712 may need to be added to the systolic array 700, thereby increasing the silicon area of the systolic array 700. By grouping the PEs 710 into blocks 810, a fewer number of rounding circuits 712 are included in the systolic array 800 compared to the systolic array 700. As such, the silicon area occupied by the rounding circuits 712 is reduced.

In some embodiments, the size of a block 810 may depend on the number of rounding bits and the relative size of the systolic array 800. In some embodiments, the block size may be determined based on the matrix size or the size of the systolic array divided by the number of rounding needed. For example, if a higher-precision value is 8 bit and the rounded value is 4 bit, 4 bits are removed in rounding. The removed 4 bits have 16 possibilities. In some embodiments, if the systolic array 800 is in the size of 1,000 by 1,000, the block size may be approximately 1000/16=about 62 PEs in one dimension. Put differently, in some embodiments, the block size of the plurality of blocks 810 may correspond to a size of systolic array 800 divided by a number of rounding variations. In some embodiments, the block size may be increased or decreased based on the tradeoff between reducing silicon areas occupied by the plurality of rounding circuits 712 and further randomizing the re-rounding to reduce the overall rounding error.

Example Rounding Circuit

Figure 9:
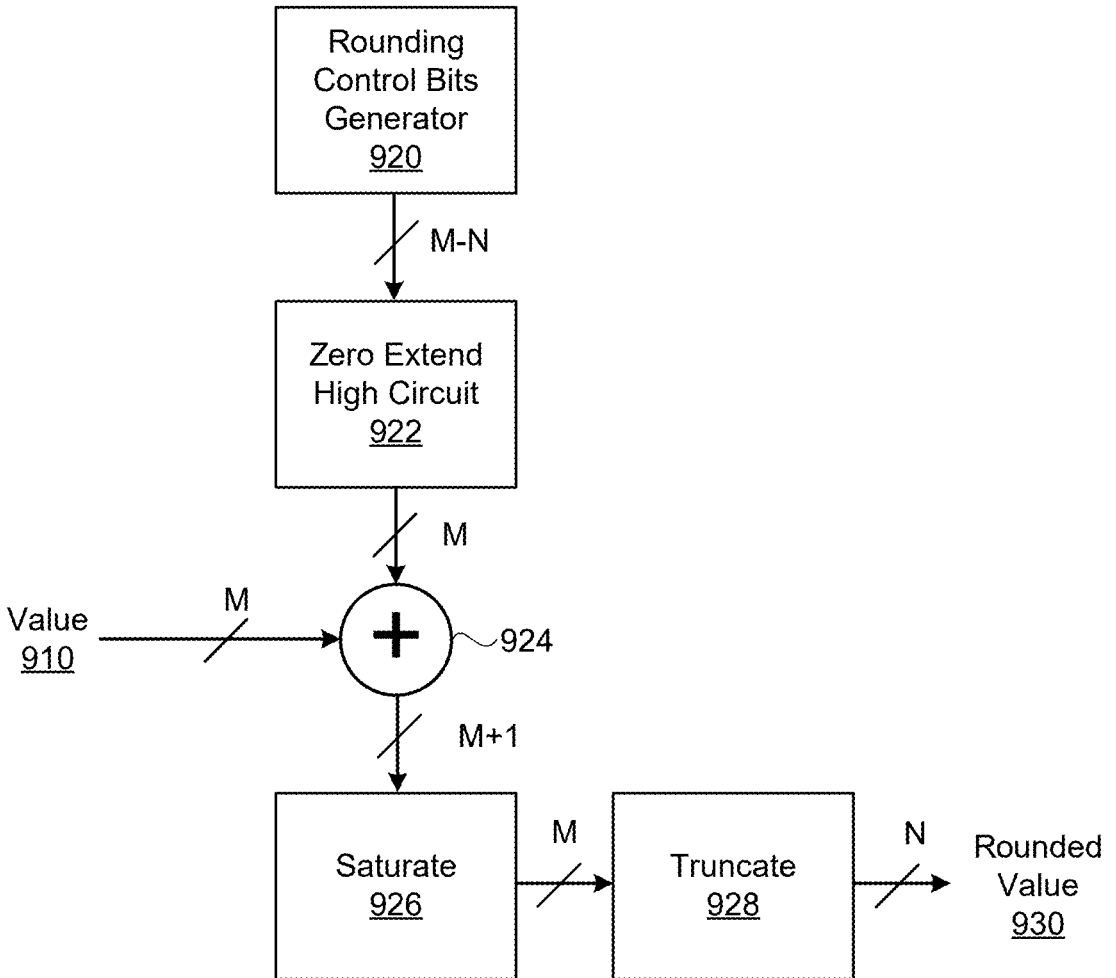
FIG. 9 is a block diagram illustrating components of an example rounding circuit, in accordance with some embodiments.

FIG. 9 is a block diagram illustrating components of an example rounding circuit 712, in accordance with some embodiments. The rounding circuit 712 rounds a value 910 from a first precision level M to a second precision level N. In various embodiments, the prevision levels M and N may take different levels. For example, in some embodiments, M is equal to 32 bits and N is equal to 16 bits. In some embodiments, M is equal to 16 bits and N is equal to 8 bits. In some embodiments, M is equal to 8 bits and N is equal to 6 bits. In some embodiments, M is equal to 8 bits and N is equal to 5 bits. In some embodiments, M is equal to 8 bits and N is equal to 4 bits. In some embodiments, M is equal to 8 bits and N is equal to 3 bits. In some embodiments, M is equal to 8 bits and N is equal to 2 bits. In some embodiments, M is equal to 8 bits and N is equal to 1 bit. In some embodiments, M is equal to 4 bits and N is equal to 2 bits. In some embodiments, M is equal to 4 bits and N is equal to 1 bit. While M being equal to 8 bits and N being equal to 4 bits are used in the discussion as an example, in various embodiments, the PEs in a systolic array may operate in precision levels that are not expressly described.

The rounding circuit 712 illustrated in FIG. 9 may be used as any rounding circuit 712 illustrated in FIG. 7 or FIG. 8.

A value 910 may be fetched from memory and is stored in the memory in a first precision level, M bits, such as 8 bits. The value may be a weight value in a weight matrix of a machine learning model, an activation value in an activation matrix of the machine learning model, a gradient value in a gradient matrix of the machine learning model, or any suitable value that may or may not be related to machine learning.

A rounding control bits generator 920 is circuitry that is used to generate rounding control bits that determine the rounding result. The rounding control bits may be M-N bits long. For example, if the rounding circuit 712 is used to round an 8-bit value to a 4-bit value, the rounding control bits generator 920 may generate rounding control bits of 4 bits. In various embodiments, a rounding control bits generator 920 may generate the rounding control bits in different manners, including methods such as indexed-based rounding, shuffling index, or stochastic rounding. Each of the rounding methods will be discussed in further detail below.

Depending on the type of rounding method used, the rounding control bits generator 920 may include different circuitry. For example, in an index-based approach, the rounding control bits generator 920 may include a bit logic circuit that generates indices sequentially. The indices may correspond to the possible variations of bits in a length of M-N bits. In a shuffling index method, the same type of logic circuit may be used and an additional shuffling circuit may be added to randomly shuffle the generated indices. In a stochastic rounding method, a random number generator such as a linear-feedback shift register (LFSR) may be used.

The zero extend high circuit 922 adds zeros to the bits to the left of the most significant bit of the rounding control bits to extend the length of the rounding control bits to M bits (e.g., 8 bits) so that the rounding control bits are in the same length as the value in the first precision level. The two values are added at the adder 924. To account for overflow, a M+1 bit value (e.g., 9 bits) is generated. In the saturation circuit 926, a binary rounding operation may be performed. For example, the most significant bit of the added 9-bit sum may be inputted to OR logic circuits with other bits, such as the mantissa bits. After saturation, an M-bit value is generated (e.g., 8-bit). This value is provided to a truncate circuit 928 that removes the least significant bits to convert the M-bit value into an N-bit value (e.g., 4-bit). The N-bit value is the rounded value 930, which may be rounded up from the value 910 or rounded down from the original value 910.

In this disclosure, various values in FIG. 9, including the original value 910, the final output rounded value 930, and one or more intermediate values generated in a rounding circuit 712 may be referred to as a version of the value 910.

Example Re-Rounding Methods

In various embodiments, the rounding circuits 712 associated with a systolic array 700 or a systolic array 800 may use different methods of performing re-rounding. Examples of the re-rounding methods include an index-based rounding approach, a shuffled-index-based rounding approach, and an independent randomized (stochastic) rounding approach.

In this disclosure, [x] is denoted for a value x rounded up to the next-larger value in the low-precision level, and [x] for x rounded down. Set q(x)=[x]−[x], i.e. q is the rounding "quantum" or "step size." The distance between the two low-precision numbers closest to x. Define frac x ∈ [0, 1) by (x−[x])/q(x), i.e. frac x specifies how far along the quantum q (x) that x is. If there are n uses of x (e.g., the value x is broadcasted to n PEs 710), the best average rounding error (closest to zero) may be achieved by rounding up approximately $\hat{k}$:=n·frac x times, and round the remaining uses of the value x down.

In general, $\hat{k}$ may not be an integer. In order to round an integer number of uses of x up, a nearby integer k≈$\hat{k}$ may be selected and round approximately k uses of x up, and round the remaining uses down. In some embodiments, an AI-accelerating processor 100 might choose, for example, k to be the floor or the ceiling of $\hat{k}$, or might choose k to be the nearest integer of k. In some embodiments, an AI-accelerating processor 100 may restrict k to be a multiple of some integer N in order to reduce computational costs. Various algorithms and corresponding circuitry may be used to generate rounding control bits that achieve the results.

In various embodiments, there can be different policies for deciding which rounded values $y_i$=round (x) should be rounded up versus rounded down. If there are n uses of x (e.g., the value x is broadcasted to n PEs 710), the output rounded values y; may be tracked from i=0 to i=n−1.

In some embodiments, an index-based rounding approach may be used in a set of rounding circuits 712 that perform re-rounding of a value x. Each time of rounding is denoted as a use of x. For the first k uses, the AI-accelerating processor 100 may round up so that k out of n rounding circuits 712 round the value up. For the remaining uses, the remaining rounding circuits 712 round the value down.

This may be controlled by a set of indices that correspond to the possible bits of the truncated bit length when a value is rounded from a first precision level to a second precision level. For example, in some embodiments, the plurality of rounding circuits are in communication with an index generator that is configured to generate a series of indices that are respectively sent to one of the rounding circuits 712. Each of the rounding circuits 712 is configured to determine, based on an index in the series, whether to round the value to the first rounded value (e.g., the rounded up value) or to the second rounded value (e.g., the rounded down value). The index generator may be an example of the rounding control bits generator 920.

In some embodiments, in an index-based rounding approach, for the policy k=$\lfloor \hat{k} \rfloor$, this approach can be implemented by setting $$y_i = \left\lceil x - q(x) \cdot \frac{i}{n} \right\rceil,$$

which is equivalent to rounding up if $$\frac{i}{n} \leq frac\ x.$$

In some embodiments, in an index-based rounding approach, for the policy k=$\lceil \hat{k} \rceil$, this approach can be implemented by setting $$y_i = \left\lceil x - q(x) \cdot \frac{i+1}{n} \right\rceil,$$

which is equivalent to rounding up if $$\frac{i+1}{n} \leq frac\ x.$$

In some embodiments, in an index-based rounding approach, for the policy k=[$\hat{k}$] (k is the nearest integer to $\hat{k}$), this approach can be implemented by setting $$y_i = \left\lceil x - q(x) \cdot \frac{2i+1}{2n} \right\rceil,$$

which is equivalent to rounding up if $$\frac{i+0.5}{n} \leq frac\ x.$$

In some embodiments, in an index-based rounding approach, the number k of values to round up is not chosen in advance, but may be chosen by individual rounding decisions per use. For example, one policy first picks a rounding policy that rounds frac x to a multiple of 1/n (call it r/n for some integer r), and then rounds up to $\lceil x \rceil$ if i<r. This two-stage rounding admits a completely different rounding strategy in the first stage, such as stochastic rounding.

In some embodiments, in an index-based rounding approach, for policies where k is constrained to a multiple of some integer N, we can apply any of the previous three policies, but to a modified index i'=$\lfloor i/N \rfloor$.

In some embodiments, a set of rounding circuits 712 in an AI-accelerating processor 100 may use a shuffled-index-based rounding approach. The index-based rounding discussed above introduces a consistent preference in rounding: earlier uses of x result in rounding up more frequently than later uses of x do. For some applications (especially those such as gradient calculations in gradient descent or neural networks) where statistically unbiased estimators are desired, this preference may be undesirable. By shuffling the indices i used in index-based rounding, an AI-accelerating processor 100 can remove this consistent preference.

Figure 10:
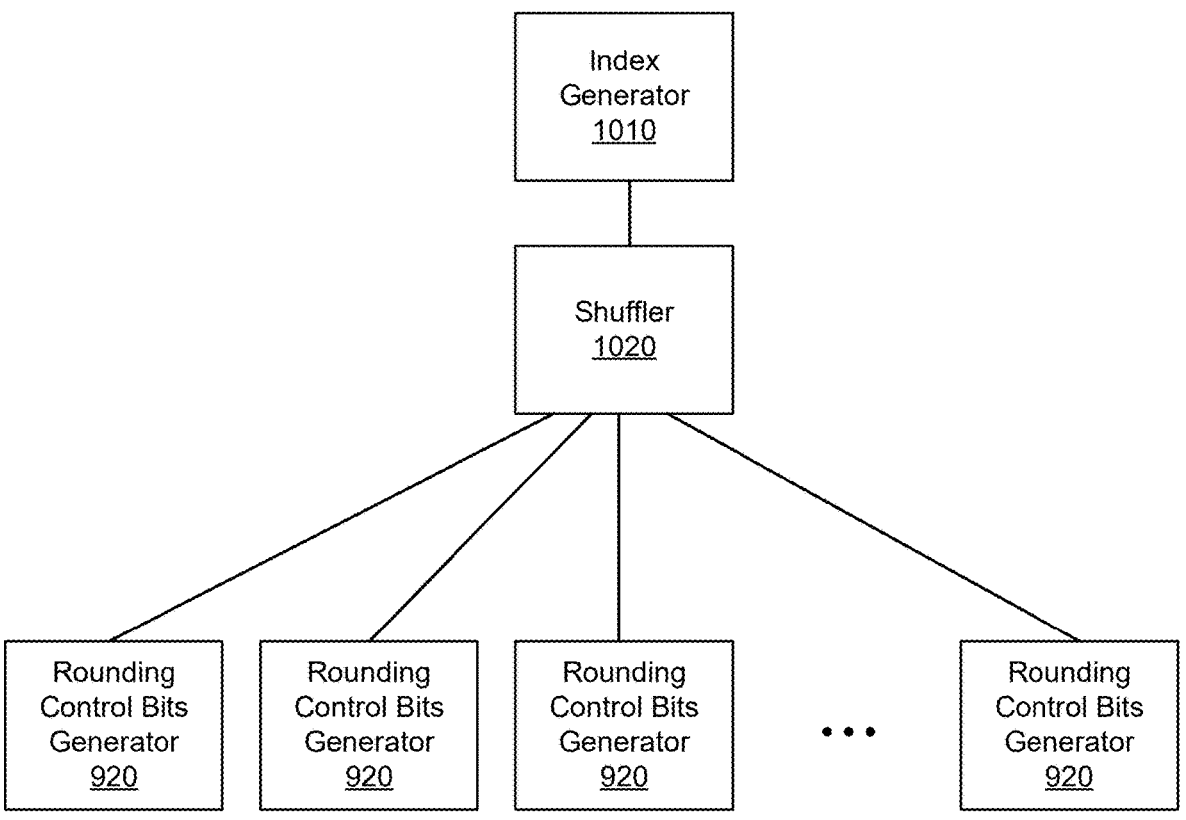
FIG. 10 is a block diagram illustrating an example component system that may be used to conduct the shuffled-index-based rounding approach, in accordance with some embodiments.

FIG. 10 is a block diagram illustrating an example component system that may be used to conduct the shuffled-index-based rounding approach, in accordance with some embodiments. Each rounding control bits generator 920 is part of a rounding circuit 712. The plurality of rounding circuits 712 (illustrated by only the part that includes the rounding control bits generator 920) are in communication with an index generator 1010, which includes logic circuitry to generate indices. The index generator 1010 sends a different index to each of the rounding circuits 712 in a shuffled manner, such as through a shuffler 1020. The shuffler 1020 may implement any suitable shuffling circuit that executes a shuffling algorithm. For example, the shuffling may be performed using an algebraic shuffle algorithm or a randomized shuffle algorithm. Each of the rounding circuits 712 may determine, based on the different index, whether to round the value to the first rounded value (e.g., the rounded-up value) or to the second rounded value (e.g., the rounded-down value). The rounding circuits 712 may be any of the rounding circuits illustrated in the systolic array 700 or the systolic array 800.

In some embodiments, the shuffled-index-based rounding approach includes applying any of the index-based rounding policies discussed above. However, instead of using the index i, the shuffled-index-based rounding approach uses a different index, $f(i)$, computed by a shuffling function $f$. In some embodiments, every time re-rounding is run, a different shuffling function $f$ might be selected, so as to eliminate consistent preferences in rounding.

In some embodiments, the shuffled-index-based rounding approach uses algebraic shuffles: $f(i)=n-1-i$, which reverses the indices, the functions which rearrange the bits of i, or any function $f_{p,t}(i)=(p*i+t)$ mod n where p is coprime to n and t is any integer.

In some embodiments, the shuffled-index-based rounding approach uses randomized shuffles of indices. Any shuffling of the indices $0, \ldots, n-1$ could be selected by a random shuffling algorithm such as Fisher-Yates. Then the index $f(i)$ is found by reading position i from the shuffled array of indices.

In some embodiments, a set of rounding circuits 712 in an AI-accelerating processor 100 may use an independent randomized (stochastic) rounding approach. Each rounding circuit may stochastically round the value x, using a new set of random rounding control bits (e.g., generated by a random number generator) for each use (or each group of N uses for some integer N, to reduce the amount of random sampling required). Unlike conventional stochastic rounding (which rounds x just once), an AI-accelerating processor 100 may sample new randomness for every use (or group of uses) of x, as illustrated in the systolic array 700 or the systolic array 800. Stochastic rounding can be performed with various distributions. In some embodiments, the distribution may be a uniform distribution. For each use i, we sample a random number $r_i\sim U[0, 1]$ from the uniform distribution on [0, 1], and then set $y_i=\lfloor x+r_i \rfloor$. Thus, although the precise number k of uses of x that round up is not decided in advance, in expectation there are exactly $k^\wedge$ uses of x that round up, i.e. $E[k]=k^\wedge$.

By way of example, each rounding circuit 712 in a set of plurality of rounding circuits 712 may include a random number generator. The rounding circuit 712 generates a rounded value by comparing one or more least significant bits of the value to a random number generated by the random number generator. The random number generator may be an example of the rounding control bits generator 920 shown in FIG. 9.

Various re-rounding techniques may be applied to matrix multiplication, such as in the systolic array 700 or systolic array 800, or any suitable computing circuits of an AI-accelerating processor 100. Let A be an a×b matrix, and let B be a b×c matrix. A systolic array 700 or a systolic array 800 may perform the computation of a matrix multiplication with at least one of A and B in the multiplication being computed in a low-precision number format. For example, the multiplication of individual values may be performed in 4-bit precision while the original values are stored in memory in a higher precision such as 8 bits. The matrix product AB may be expressed elementwise as the following, which shows that each value in the matrix is used multiple times. The same value being used multiple times may be achieved in parallel processing, such as by one or more collective operations illustrated in FIG. 6A through FIG. 8.

$$(AB)_{df} = \sum_e A_{de} B_{ef}$$

As shown in the equation above, each element $A_{de}$ is used $f$ times in total, corresponding to each of the different Bes elements it is multiplied by. Likewise, each element $B_{ef}$ is used d times in total, corresponding to each of the different $A_{de}$ elements it is multiplied. Thus, any of the above algorithms may be used to compute many unique roundings of either $A_{de}$ or $B_{ef}$ (or both). In some embodiments, an example of applying independent randomized rounding to both A and B is represented in the equation below. The matrix multiplication may be computed using low-precision numbers as:

$$(AB)_{DF} = \sum_e \lfloor A_{de} + r_{def} \rfloor \lfloor B_{ef} + s_{def} \rfloor$$

In this example, each of the values $r_{def}$ and $s_{def}$ may take the form of random numbers sampled uniformly from U [0, 1]. An example of the hardware architecture that may be used to perform the individual re-rounding approach is further discussed in FIG. 7.

For some applications, the above matrix multiplication may be too expensive because of the quantity of random numbers being sampled. If so, an alternative may be used, in which re-rounding is performed on matrix blocks rather than on individual matrix elements. For example, consider splitting up the matrices A and B into blocks of size Z×Z. The blocks are denoted by $A_{DE}$ and $B_{EF}$, and output blocks by $(AB)_{DF}$, where each of these blocks is itself a Z×Z matrix. In this case, the matrix multiplication may be computed using low-precision numbers as:

$$(AB)_{DF} = \sum_e \lfloor A_{DE} + r_{DEF} \rfloor \lfloor B_{EF} + s_{DEF} \rfloor$$

In the above equation, the $\lfloor \cdot \rfloor$ operation is extended to be performed on matrix blocks, by applying to matrix elements individually.

By performing this re-rounding approach in blocks (referred to as the blocked rounding approach), the quantity of random numbers to be sampled is decreased. An AI-accelerating processor 100 needs only sample $d\times e\times f/(Z^3)$ many random matrices $r_{DEF}$, and each such random matrix is of shape $Z^2$. Hence, in total only $d\times e\times f/Z$ many random numbers are sampled for $r_{DEF}$, and similarly for $s_{DEF}$. Compared to the non-blocked matrix multiplication, the blocked rounding approach reduces the number of random numbers to be sampled by a factor of Z. An example of the hardware architecture that may be used to perform the blocked rounding approach is further discussed in FIG. 8.

Re-rounding may be applied to the matrix multiplications in neural networks, such as in the computation of AI-accelerating processors, both in the forward pass (training and inference) and in the backward pass of training. By using the re-rounding technique, the overall rounding errors may be reduced. This in turn may allow a user to implement a neural network with even lower precision arithmetic than the user otherwise would, because the quality impact of using low precision arithmetic is further reduced than otherwise. For example, 4-bit precision may be used in machine learning operations. Using lower precision arithmetic in this way can help run the neural network using fewer resources: either by taking less time, less memory, less total hardware requirements, or less energy.

Example Re-Rounding Process

FIG. 11 is a flowchart depicting an example process 1100 for operating an AI-accelerating processor system, in accordance with some embodiments. The process 1300 may be performed by an AI-accelerating processor 100, which may be an example of an AI-accelerating processor system. An AI-accelerating processor system may also include multiple processors. In various embodiments, the process 1100 may include additional, fewer, or different steps. An AI-accelerating processor 100 may include a systolic array 700 or a systolic array 800. A systolic array includes a plurality of rounding circuit 712 and a plurality of PEs 710, as illustrated in FIG. 7 and FIG. 8.

In some embodiments, an AI-accelerating processor 100 may store 1110 a value of a matrix in memory. The value may be stored in the memory at a first precision level. In some embodiments that involve multiplications, there are multiple values involved. For example, there are at least a first value of a first matrix and a second value of a second matrix. As discussed in the subsequent steps, both the first value and the second value are rounded multiple times (re-rounding) by rounding circuits. Each value may be treated similarly in the re-rounding process and only one value is discussed in the rest of the process 1100.

In some embodiments, the AI-accelerating processor 100 may round 1120, at a first rounding circuit of a plurality of rounding circuits, the value to a first rounded value. The value at the first precision level is rounded to a second precision level that is lower than the first precision level. For example, an 8-bit value may be rounded to a 4-bit value.

In some embodiments, the AI-accelerating processor 100 may round 1130, at a second rounding circuit of the plurality of rounding circuits, the same value to a second rounded value different from the first rounded value. For example, the first rounding circuit may round the value up and the second rounding circuit may round the value down. While only two rounding circuits are discussed in the process 1100, the same value may be re-used multiple times in many rounding circuits and is rounded differently. For example, in a very large matrix multiplication, the same value is broadcasted at least 1,000 times to the PEs 710 in the systolic array. The plurality of rounding circuits, which include the first rounding circuit, the second rounding circuit, and additional rounding circuits, may perform re-rounding according to one of the approaches discussed above, such as the index-based rounding approach, the shuffled-index-based rounding approach, or the independent randomized (stochastic) rounding approach.

In some embodiments, the AI-accelerating processor 100 may receive 1140, at various PEs 710, a version of the value in one or more collective operations. Note that the receipt of a version of the value in step 1140 may occur before or after the rounding steps 1120 and 1130. For example, in the systolic array 700, a rounding circuit 712 may be located within a PE 710. As such, the rounding occurs after the receipt of the value by a PE 710. In this arrangement, the version of the value received by the PE 710 is the original value in high precision. In the systolic array 800, a rounding circuit 712 is located upstream of a block 810 of PEs 710 and controls the rounding of the PEs in the 810. As such, the rounding occurs before the receipt of the value by a PE 710. In this arrangement, the version of the value received by the PE 710 is a rounded value in low precision. The rounded value received at the PEs 710 in a given block 810 is the same while the rounded values of different blocks 810 may be different.

In some embodiments, the AI-accelerating processor 100 may perform 1150, by a first PE of the systolic array, computations of the matrix multiplication involving the value by using the first rounded value. The first rounded value may be a rounded-up value while the second rounded value may be a rounded-down value, or vice versa. In some embodiments, the AI-accelerating processor 100 may perform 1160, by a second PE of the systolic array, computations of the matrix multiplication involving the value by using the second rounded value.

Quantized Computation

Figure 12:
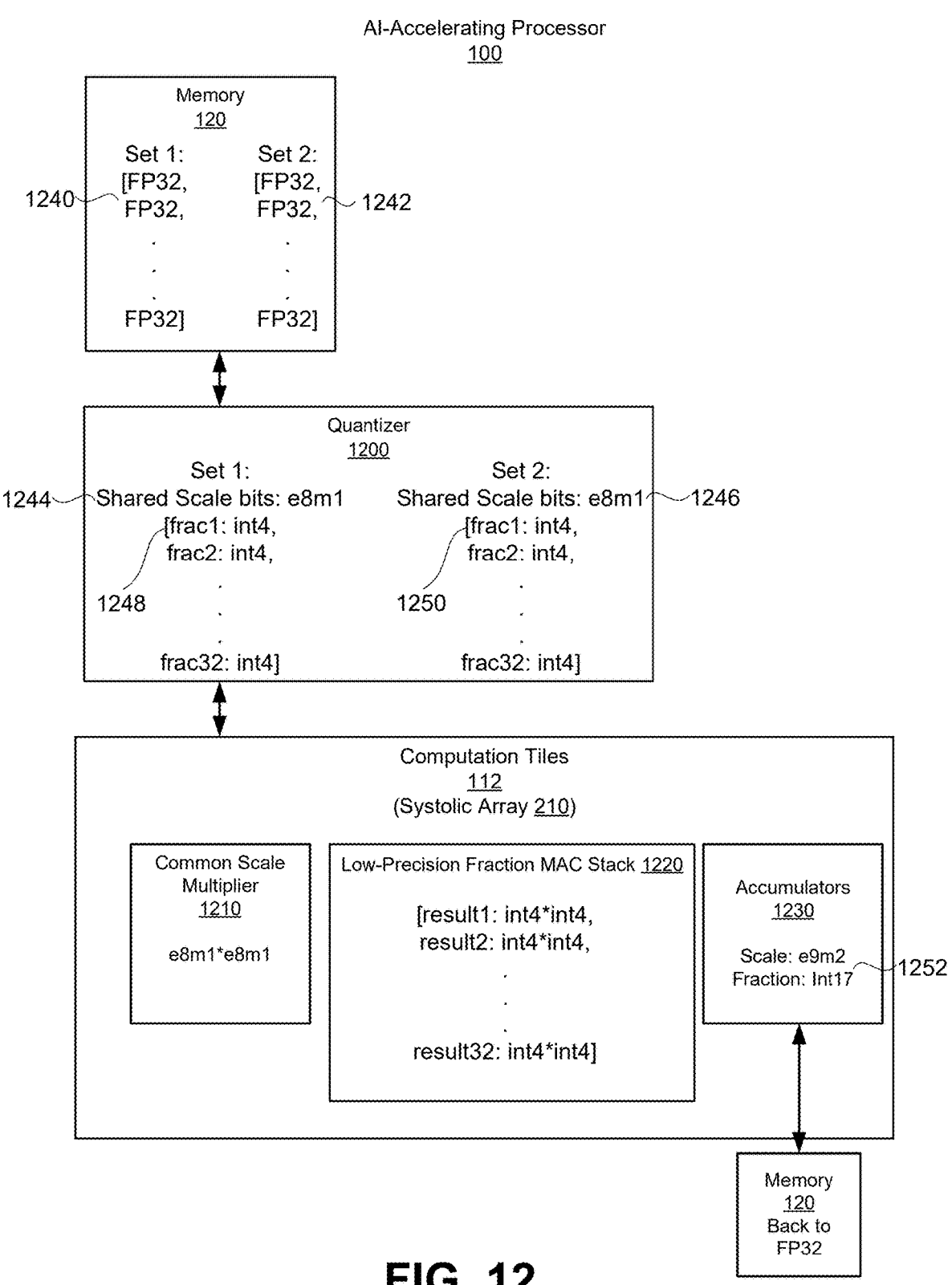
FIG. 12 is a conceptual diagram illustrating a quantized computation performed by an AI-accelerating processor in a low precision and accelerated manner, in accordance with some embodiments.

FIG. 12 is a conceptual diagram illustrating a quantized computation performed by an AI-accelerating processor 100 in a low precision and accelerated manner, in accordance with some embodiments. The blocks in FIG. 12 are for conceptual illustration only and do not reflect the actual scale and positions of components in the architecture. Also, various components that are illustrated in other figures are skipped in FIG. 12. The AI-accelerating processor 100 includes memory 120, a quantizer 1200, and computation tiles 112 for performing quantized computation in an accelerated manner. In some embodiments, the quantizer 1200 may be implemented as a hardware component, such as the one shown in FIG. 13, a software module, or a combination of hardware and software.

In some embodiments, the memory 120 is processor memory (e.g., HBM), which may take the form of on-chip memory but outside of the systolic array 210. The memory 120 illustrated in FIG. 1B and the memory 730 illustrated in FIG. 7 are examples of the memory 120 illustrated in FIG. 12. The first memory 120 may be located lateral to the systolic array 210 (e.g., left of the systolic array 210) and a second memory 120 may be located longitudinal to the systolic array 210 (e.g., bottom of the systolic array 210), but the actual physical location of the memory 120 is not illustrated in FIG. 12. In some embodiments, the first memory 120 and the second memory 120 are the same memory. For example, inputs of the systolic array 210 are fetched from a memory 120, processed by the systolic array 210, then outputted back to the same memory 120. In some embodiments, the first memory 120 and the second memory 120 are different memory. For example, the second memory 120 may be part of the output circuit 740 illustrated in FIG. 7.

The memory 120 may store values in two or more types of formats. In some embodiments, the memory 120 may store values that are from a computing device (e.g., values of a machine learning model as stored in a hard drive and in the RAM of a computer). Those values are stored in a high-precision format. Common high precision format includes FP32 and FP16. This type of high-precision format that is stored in memory 120 is illustrated by two sets of values 1240 and 1242. The memory 120 may also store quantized values whose precision format is mainly used in the systolic array 210. This type of low-precision format is not illustrated as being the memory 120 in FIG. 12, but it is shown in the quantizer 1200. However, the memory 120 may also store values in the second type of low-precision format.

The systolic array 210 may mainly operate at a significantly lower precision level. In some embodiments, the systolic array 210 may operate in a block floating format or an integer format. For example, in some embodiments, the systolic array 210 may operate in an integer format that is 8-bit, 6-bit, 4-bit, 2-bit, or 1-bit.

In some embodiments, the systolic array 210 uses a block floating format. The values in the systolic array 210 are grouped in sets. A set may correspond to part of a column or a row of a matrix, or part of a vector. The values in each set may have fraction bits that are in an integer format. The values in each set also share scale bits that are in another format, which may be an integer format or a floating-point format. For example, the fraction bits may be in the precision level of 8-bit, 6-bit, 4-bit, 2-bit, or 1-bit. Each value in a set has different fraction bits. A set of multiple values (e.g., 32 values) share the same scale bits. The scale bits may be in a special floating-point format, such as e8m1, e8m2, or e8m3, e4m1, e4m2, or e4m3, etc. In some embodiments, the scale bits may also be integers, such as 8-bit integers with no mantissa. For a format that uses floating-point for the scale bits, the quantization format may be referred to as a block floating format.

It is noted that, unlike conventional floating-point notation in which the scale bits are integer, the shared scale bits in this special block floating format are in floating-point format. The shared scale bits have exponent bits, such as 8 exponent bits in e8, and mantissa bits, such as 1 mantissa bit in m1, or 2 mantissa bits in m2. Using e8m1 and a set size of 32 integer values as an example, a set of 32 values have their individual fraction bits (in 4-bit integer) and shared floating-point scale bits.

The data structure used in the systolic array 210 may be expressed as the following:

```
Struct Block {
                scale:e8m1,
                elements: int4[32]
                }
```

It is unconventional that scale bits of a binary numerical format are in a special floating point e8m1 or e8m2. It is noted that "mantissa" here is used specifically to refer to the mantissa in the scale bits. In the usual floating format, a number is represented by fraction bits multiplied by exponent bits. In this conventional situation, both the fraction bits and the exponent bits are integers. In this conventional situation, the fraction bits are also called mantissa bits. In this disclosure, however, in a block floating format, there are three types of bits. The fraction bits are integers. The scales bits have exponent bits and mantissa bits. As such, in this disclosure, to avoid confusion, the bits that determine the decimals are referred to as fraction bits and will not be referred to as mantissa bits. The mantissa bits refer to the m1, m2, or m3 in the scale bits.

The quantizer 1200 can be part of an integrated circuit that includes sub-circuit blocks to quantize values from a high-precision level to a lower-precision level that is used in the systolic array 210. Values stored in memory 120 may be in a high-precision format such as FP32 or FP16. Examples of those values may correspond to weights, activation values, training data values, and gradient values in a machine learning model such as a transformer model. The quantizer 1200 quantizes those values in a lower precision format, such as the block floating format discussed above, to be used in the systolic array 210. Because the systolic array 210 operates at a much lower precision level, the computation of machine learning operations can be significantly accelerated at a lower power consumption level.

The quantizer 1200 may perform the quantization process according to a quantization scheme. Examples of various quantization schemes are further discussed below. In some embodiments, the quantization scheme achieves a high computation performance by compressing values into a significantly lower precision while still maintaining a high accuracy in performing the computations. For example, in some embodiments, the memory 120 stores values in a high-precision format such as FP32 or FP16. The quantizer 1200 quantizes those values into 4-bit integer fractions with shared scaling bits. As such, the systolic array 210 can perform matrix multiplications, dot products, and other machine learning operations in 4-bit levels, which significantly accelerates the computation process compared to FP32 or FP16.

Various round circuits, such as rounding circuits 712 shown in FIG. 7 and FIG. 8, are examples of part of the quantizer 1200. A further detailed example of the circuit blocks of the quantizer 1200 is further discussed in FIG. 13.

In some embodiments, the quantization process involves both the memory 120 and the quantizer 1200. For example, in some embodiments, the quantization process involves a gained quantization that increases every quantized by a gain factor. The memory 120 stores one or more reverse gain factors and restores all of the scaled quantized values back to normal ungained values. In another example, certain block quantization operations may include one or more transpose operations and multiple rounds of quantization. The quantizer 1200 may perform a first round of block quantization, send quantized values back to the memory 120 to perform a transpose operation, and receive the transposed values to perform a second round of block quantization. This type of quantization operation that includes transpose operations is more common in the backpropagation process of a machine learning operation in which gradients of various matrices are determined.

A grid of computation tiles 112 forms a large systolic array 210 while each computation tile 112 itself may include a smaller systolic array 210, such as a smaller set of systolic array 210. As such, in this discussion, the terms computation tile 112 and the systolic array 210 may be used interchangeably in this context. A computation tile 112 and a systolic array 210 may both include a repeated set of multiply-accumulate units (MAC) that are used for performing dot product operations, matrix multiplication operations, and other operations used in machine learning operations. For simplicity, the term systolic array 210 is used in this discussion. Various structures shown in different figures, such as the computation circuits 110 shown in FIG. 1B, the systolic array 700 shown in FIG. 7, and the systolic array 800 shown in FIG. 8, are examples of the systolic array 210 shown in FIG. 12.

A systolic array 210 may perform multiplications for machine learning operations in a low-precision format. For example, a majority of multiplication circuits in the systolic array 210 restrict the input precision level to a particular limit. In some embodiments, the limit is 6-bit. In some embodiments, the limit is 5-bit. In some embodiments, the limit is 4-bit. In some embodiments, the limit is 3-bit. In some embodiments, the limit is 2-bit. In some embodiments, the limit is 1-bit. In some embodiments, over 60% of the multiplication circuits in the systolic array 210 restrict the input precision level to the limit. In some embodiments, over 70% of the multiplication circuits in the systolic array 210 restrict the input precision level to the limit. In some embodiments, over 80% of the multiplication circuits in the systolic array 210 restrict the input precision level to the limit. In some embodiments, over 90% of the multiplication circuits in the systolic array 210 restrict the input precision level to the limit. In some embodiments, over 95% of the multiplication circuits in the systolic array 210 restrict the input precision level to the limit. In some embodiments, over 99% of the multiplication circuits in the systolic array 210 restrict the input precision level to the limit. In some embodiments, 100% of the multiplication circuits in the systolic array 210 restrict the input precision level to the limit. For example, in one embodiment, over 90% of the multiplication circuits in the systolic array 210 restrict the input precision levels to 4-bit. In other words, at least the vast majority of multiplier circuits take two 4-bit inputs to perform multiplication.

By performing the majority or vast majority of multiplications in low precision, the systolic array 210 may conserve silicon space because per-multiplier space is significantly smaller than a high-precision multiplier. In some embodiments, the systolic array 210 can accommodate a large number of multiply-accumulate circuits (MACs). In some embodiments, the systolic array 210, in total, includes more than 500×500 multiply-accumulate circuits. In some embodiments, the systolic array 210, in total, includes more than 1000×1000 multiply-accumulate circuits. In some embodiments, the systolic array 210 includes more than 2000×2000 multiply-accumulate circuits. In some embodiments, systolic array 210 includes more than 3000×3000 multiply-accumulate circuits. In some embodiments, the systolic array 210 includes more than 4000×4000 multiply-accumulate circuits. In some embodiments, the systolic array 210 includes more than 5000×5000 multiply-accumulate circuits. In some embodiments, the systolic array 210 includes more than 8000×8000 multiply-accumulate circuits. In some embodiments, the systolic array 210 includes more than 10,000×10,000 multiply-accumulate circuits. In various embodiments, the shape of the systolic array 210 may vary and does not need to be square. In other words, in some embodiments, the number of multiply-accumulate circuits in the lateral direction may be different from the number of multiply-accumulate circuits in the longitudinal direction. Hence, a systolic array 210 that has over N×N multiply-accumulate circuits does not imply that the systolic array 210 is square. It could include N×M multiply-accumulate circuits.

A large systolic array 210 reduces the relative energy consumption of the memory 120. A low-precision systolic array 210 reduces the power consumption of the systolic array 210 compared to a high-precision systolic array. Relatively, the power consumption of the memory 120 becomes significantly larger because the number of read and write operations remains largely the same with different precision levels. In some embodiments, the memory 120 is positioned at the periphery of the systolic array 210, such as in the configuration shown in FIG. 1B and FIG. 7. A large systolic array 210 that has thousands of MACs by thousands of MACs occupies a large area. Since memory 120 is presented at the periphery, the relative size of the memory 120 is smaller compared to the large systolic array 210. As such, the relative power consumption of the memory 120 is also reduced compared to using a low-precision systolic array that has a smaller number of MACs. A conventional systolic array is often a high-precision array with only a small number (e.g., 10×10) of MACs.

FIG. 12 illustrates a systolic array 210 that performs low-precision multiplication for values that are stored in a block floating format. In this type of embodiment, a set of quantized values are stored in low-precision fractions (e.g., 4-bit integer) and the values in the set share the same floating-point scale bits. In performing an elementwise multiplication within a matrix multiplication or dot product operation, the two input values have different fractions bits and different floating-point scale bits. The fraction bits of the two input values may be multiplied. Separately, the floating-point scale bits are also multiplied. Since the scale bits are shared, the number of multiplications for the scale bits is significantly reduced. The outputs of the multiplication include multiplied fraction bits and multiplied scale bits.

A systolic array 210 includes a common scale multiplier 1210, a low-precision fraction MAC (multiply-accumulate circuit) stack 1220, and accumulators 1230. Note that because in some embodiments a systolic array 210 may include in total over 1,000×1,000 MACs, the systolic array 210 may include many sets of common scale multiplier 1210, low-precision fraction MAC stack 1220, and accumulators 1230. Each set of those circuits may handle the multiplication of a set of values.

Each set of values may include N values, such as 32 values. For example, in a dot product or a matrix multiplication (which may be broken down into a series of dot products), a first set of values sharing first scaling bits are multiplied elementwise with a second set of values sharing second scaling bits, then all of the multiplied values are accumulated by accumulators 1230. Because the first scaling bits in the first set are the same for every value in the first set and the second scaling bits in the second set are the same for every value in the second set, the multiplication between the first scaling bits and the second scaling bits only needs to be performed once. The multiplication of the scaling bits may be performed by the common scale multiplier 1210.

The multiplication of the fraction bits (e.g., 4-bit integer multiplied by 4-bit integer) may be performed by the low-precision fraction MAC stack 1220. Since there are N elementwise multiplications of the fraction bits (e.g., 32 pairs of values need to be multiplied), a systolic array 210 includes a stack of low-precision value multipliers. After multiplication, the fraction values are accumulated through a series of accumulators 1230 and the final result is an accumulated value of a series of MACs.

In some embodiments, depending on the format of the scale bits, the common scale multiplier 1210 may be part of the low-precision fraction MAC stack 1220. In other words, one of the multipliers in the low-precision fraction MAC stack 1220 may also be used to perform the multiplication of the scale bits. For example, in a block floating format e8m1, e8m2, or e8m3, the multiplication of two sets of the scale bits (e.g., e8m2*e8m2) involves addition between the two sets of e8 exponent bits and the multiplication of two sets of mantissa bits. Hence, the multiplication only involves 2 bits multiplied by 2 bits in e8m2*e8m2 or even 1 bit multiplied by 1 bit in e8 m1*e8m1, which may be performed by a logic gate. While the low-precision fraction MAC stack 1220 performs multiplication in low precision, the low precision can be at the level of 4 bits by 4 bits. As such, one of the multipliers in the low-precision fraction MAC stack 1220 can handle the multiplication of the scaling bits. In other embodiments, if the precision of the low-precision fraction MAC stack 1220 is further lowered, such as in situations where the multipliers in the low-precision fraction MAC stack 1220 handle 1-bit by 1-bit inputs or 2-bit by 2-bit inputs, scale bit formats such as e8m3 or e8m2 may require a separate common scale multiplier 1210.

FIG. 12 illustrates a flow of the quantized computation operation performed by the AI-accelerating processor 100, in accordance with some embodiments. The computation operations may be any suitable machine learning operations, such as dot products or matrix multiplications. Those machine learning operations include attention computation discussed in FIG. 4B, inference operations, and gradient operations that are discussed in FIG. 4A.

The first set 1240 of values (e.g., a row of a left matrix) are multiplied with the second set 1242 of values (e.g., a column of a right matrix). Both the first set 1240 and the second set 1242 of values may be stored in memory 120 in a high-precision format, such as FP32. The quantizer 1200 quantizes those values to a low-precision format. For example, the values in both sets may be quantized into integers such as int-8 or int-4 (this type of integer only quantization level is not illustrated in FIG. 12). In another example, the values are quantized into a block floating format (illustrated in FIG. 12). The first set of values are quantized into fraction bits 1248 with first shared scale bits 1244. The second set of values are quantized into fraction bits 1250 with second shared scale bits 1246. After quantization, the systolic array 210 performs computations (e.g., multiply-accumulation) in an accelerated manner, thanks to low precision. The multiplications mainly involve element-wise multiplication of fraction bits. The multiplied results are accumulated through the accumulators 1230. Since typically each set of values includes N values (e.g., 32 values), the carry-over bits in the accumulation become large relative to the low-precision fraction bits. For example, for multiply-accumulation of 32 times of fraction bits of multiplication between a 4-bit integer and another 4-bit integer, the accumulated value can be a 17-bit integer due to the carryover bits. The scale bits of e8 m1*e8 m1 may be e9m2, which occupies 11 bits. In total, the accumulated result 1252 may be a 28-bit (17+11) value. The accumulated result may be outputted from the systolic array 210 and transmitted to the memory 120. The 28-bit value may be converted back to the high precision format such as FP32. As a result, a quantized computation cycle is completed, and another cycle may begin from FP32 values again.

In some embodiments, for reasons that will be discussed further below, the conversation of the value back to FP32 may also include the multiplication of one or more reverse gain factors to restore all of the scaled quantized values back to normal unscaled values. The reverse gain operation may be performed after the systolic array computation, such as the matrix multiplication.

Quantizer Architecture and Quantization Scheme

Figure 13:
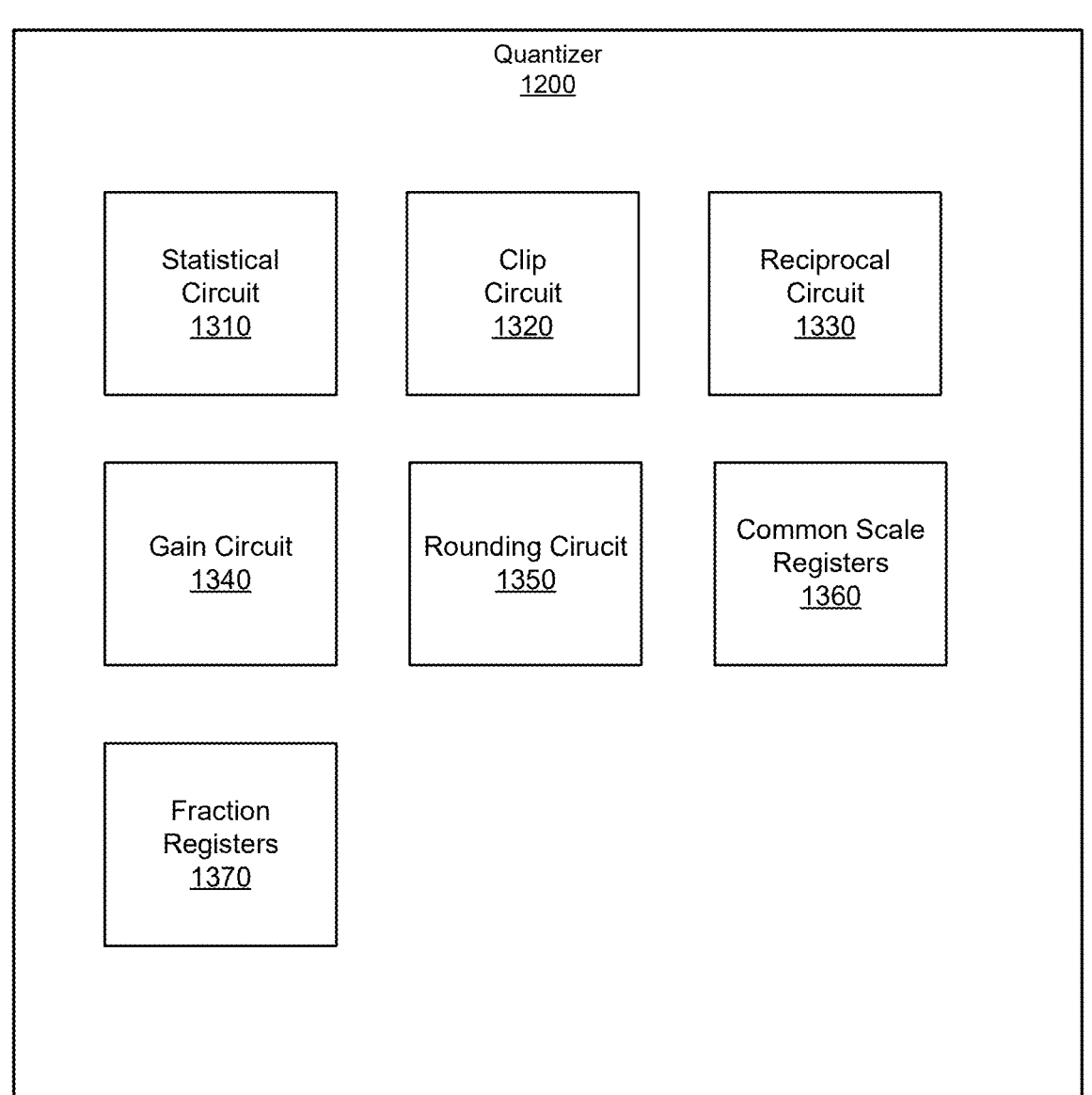
FIG. 13 is a block diagram illustrating a quantizer that performs quantization processes according to a quantization scheme, in accordance with some embodiments.

FIG. 13 is a block diagram illustrating a quantizer 1200 that performs quantization processes according to a quantization scheme, in accordance with some embodiments. The quantizer 1200 is part of an integrated circuit that includes various circuit components, including a statistical circuit 1310, a clip circuit 1320, a reciprocal circuit 1330, a gain circuit 1340, a rounding circuit 1350, common scale registers 1360, and fraction registers 1370. In various embodiments, the quantizer 1200 may include additional, fewer, or other components.

A quantization scheme used by the quantizer 1200 may include one or more steps that are going to be discussed in this paragraph and the next few paragraphs. In some embodiments, the quantization scheme may be used for performing block quantization, in which a set of values are quantized into fraction bits with a shared set of scale bits. The scale bits may be in integers or in floating points. If the scale bits are in floating points, the block quantization scheme may be referred to as a block floating quantization.

In a block quantization, where the values in a set need to share the same scale bits, the determination of the scale bits is often dominated by the largest value in the block. For illustration, most of the numbers are explained in decimal but it should be noted that the integrated circuit of quantizer 1200 operates in binary. For example, in a set of decimal values [1, 2, 1, 5], the ideal quantized scale is decimal 5. However, since the quantization scheme is used in hardware integrated circuit that uses binary for computations, the decimal 5 cannot be represented by a binary scale. As such, a scale of 2, 4, or 8 needs to be chosen. However, all of those candidate scales result in large rounding errors in quantization. Using the scale of 2, 1 is rounded to 0 (rounding error of 1), 2 is rounded to 2 (rounding error of 0), 1 is rounded to 0 (rounding error of 1), and 5 is rounded to 6 because the fraction bit of 6 is 0011 (rounding error of 1). This results in a large total rounding error of 3.

To address the inflexibility of scaling bits that are in binary, the scaling bits in a quantization scheme according to some embodiments are in floating number that increases the flexibility of the scales. In some embodiments, the scale bits of the quantization scheme are in the floating format of e8m1, meaning the scale bits have 9 bits, of which 8 of them are exponent bits and 1 of them is a mantissa bit. The use of e8 m1 allows the scaling bits to be represented as either $1*2^{\wedge}(\text{exponent bits})$ in the case where the mantissa bit is 0, or $1.5*2^{\wedge}(\text{exponent bits})$ in the case where the mantissa bit is 1. Note that the 1.5 value here is in decimal for illustration purposes. In other embodiments, the floating format of e8m2 or e8m3 further increases the precision of the scale bits. Whether e8 m1 or higher precision such as e8m2 is used may depend on the tradeoff between reducing rounding errors and reducing silicon space to record and compute higher-precision scale bits.

Using the same example of a set of decimal values [1, 2, 1, 5], the ideal quantized scale is still the decimal 5 in the case where e8 m1 is used for the format of scale bits. However, the mantissa bit can be chosen as 1 to reduce the overall rounding errors. Choosing the exponent value of 0 (i.e., 00000000) and the mantissa bit of 1, the scale bits mean the scaling in decimal $1.5*2^{\wedge}(00000000)$, which is $1.5*2^{\wedge}0$. As such, the decimal value 1 is represented as $1*1.5*2^{\wedge}0$. In other words, 1 is rounded to 1.5. The decimal value 2 is also represented as $1.5*2^{\wedge}0$. The value 2 is also rounded to 1.5. The decimal value 5 is represented as fraction bits in binary 0011, which is 3 in decimal. The entire representation of 5 becomes $2*1.5*2^{\wedge}0$. This means 5 is rounded to 4.5. Compared to the previous example, individual rounding errors are reduced from 1 to 0.5. The total rounding error in this example is 2 while the total rounding error in the previous example is 3.

In performing rounding, a reciprocal technique is used in place of division to accelerate the integrated circuit computation. Normally, a division needs to be performed to decide fraction bits. For example, the exact value is rounded to fraction*scale. As such, after the scale bits are determined and fixed, each value needs to be rounded by dividing the original value by the scale. However, such division is expensive to perform in an integrated circuit. Instead, in some embodiments, instead of dividing each value by the scale, a reciprocal value of the scale is first determined. In a block quantization, since all of the numbers share the same scale, the determination of reciprocal value only requires one division operation. In turn, the reciprocal value is multiplied by each value to find the fraction values before rounding. The fraction values are rounded by the rounding techniques, such as re-rounding techniques, which are discussed in detail in FIG. 7 through FIG. 11.

In some embodiments, to further reduce errors in quantization, the block floating quantization scheme uses a gain factor to scale the quantized values. The gain process involves multiplying the quantized values in the set by the same gain factor. For example, every value in a set is multiplied by 1.5 (gain factor in decimal). This is a scaling process. However, to avoid confusion between the term "scale" in the scale bits in the quantization scheme, and the scaling factor in this gain process, the term "gain" or the phrase "gain factor" is used specifically to refer to the special process of multiplication every value in the set by a gain factor. Likewise, the term "scale" refers to the concept of scale bits. The gain process is used to address errors in using the e8 m1 format for the scale bits. In determining the fraction values before rounding, the actual value is multiplied by the reciprocal of the scale bits. Because of the m1 format, the scale bits can be multiples of 1.5 (in the case where m1 equals 1), and the reciprocal of 1.5 is ⅔. However, ⅔ has no finite representation in binary, in FP32 the number is represented as a series of alternating 1 and 0, such as 0.101010101010101010101010 . . . . However, in the quantization operation, the reciprocal value of ⅔ is represented in a much lower precision level, the value could be something such as 0.1010, which results in a relatively large error. To address the error, every value in the set is multiplied by a gain factor, such as 1.5. As such, the effective reciprocal value becomes ⅔*1.5, which is 1. In such a case, the reciprocal values have finite representations, and the rounding errors are reduced.

If a gain factor is adopted, since every value in a set is gained, the overall multiplication result is also increased by the gain factor. If both sets of values in a dot product are both gained by their respective gain factors, the overall multiply-accumulation results are increased by the multiplication of both gain factors. In memory 120, one or more reverse gain factors are stored to reverse the gain. Note that the reverse gain factors often have no finite representation. For example, the reverse gain factors are often in the decimal value such as ⅔. However, since the memory 120 stores values in high precision, such as in FP32, those reverse gain factors are still very precise and typically do not contribute to notable errors in the quantization scheme.

In some embodiments, the quantization scheme may also include clipping one or more values based on a ceiling. Since the determination of quantization scale bits is often dominated by the largest value, in some cases when one or more values are significantly (by order of magnitude) larger than other values, the scale bits need to be selected to be very large compared to the rest of the values in the set. As a result, round errors are large for the rest of the values. To reduce the impact on unusually large values, a statistical operation may be performed before the determination of scale bits to determine statistics of the set of values, such as the standard deviation, average, or variance. In turn, values that are larger than a threshold number of standard deviation or a threshold number of absolute value of average may be clipped and set to the ceiling value allowed.

FIG. 13 reflects one or more integrated circuit components used for the quantizer 1200 to perform the abovementioned quantization scheme. In some embodiments, one or more steps in the quantization scheme may be skipped, depending on the type of low-precision format used in an AI-accelerating processor 100. For example, if the scale bits are only integers instead of e8m1, gain factor and reciprocal operations may not be needed. Also, one or more steps in the quantization scheme may also be performed in software or in other processors (e.g., CPUs) before values are inputted to the AI-accelerating processor 100. As such, one or more components shown in FIG. 13 may be skipped.

The statistical circuit 1310 is part of an integrated circuit that includes computation circuits for performing statistics of a set of values. For example, the statistical circuit 1310 may include adder trees in accumulators for determining an average value in a set. In some embodiments, the statistical circuit 1310 may also include multiplication circuits and other circuits for determining standard deviation. In some embodiments, since standard deviation is expensive to compute, the statistical circuit 1310 may include circuitry to perform average instead.

The clip circuit 1320 is part of an integrated circuit that truncates or reduces values in the set that are above a certain threshold that is determined by the statistical circuit 1310. For example, the threshold may be 2 or 2.5 of the absolute value of the average. The clip circuit 1320 may include registers that save the maximum ceiling value determined by the statistical circuit 1310. The clip circuit 1320 may include a comparator circuit to compare values against the maximum ceiling value and replace those values that are larger than the threshold with the maximum ceiling value.

The reciprocal circuit 1330 and gain circuit 1340 are part of an integrated circuit that respectively includes division circuits that determine the reciprocal of scale bits and multipliers for applying a gain factor to the values in a set. The gain circuit 1340 may be in communication with a memory 120 to keep track of various gain factors and reverse gain factors. The reciprocal circuit 1330 may also include logic circuits to determine the scale bits appropriate for a particular set. In some embodiments, the determination of the scale bits may also be performed in the statistical circuit 1310.

The rounding circuit 1350 is part of an integrated circuit that performs rounding of fraction values. Examples of the rounding circuit 1350 are illustrated in FIG. 7 through FIG. 11. For example, the rounding circuit 712 is an example of the rounding circuit 1350. Various rounding techniques, such as re-rounding, are also discussed in FIG. 7 through FIG. 11. For example, for each set of quantized values, the set may be broadcasted to different processing elements in a systolic array 210. The quantized fractions for even the same original value may be rounded up or down differently for each broadcasted location. In other words, a set of block-quantized values is broadcasted to different locations of the systolic array 210. The fraction bits in the set are rounded differently and sometimes randomly in different broadcasted locations.

In block floating quantization, a set of values are quantized to fraction bits and a set of shared scale bits. The quantizer 1200 may include common scale registers 1360 to store the set of shared scale bits. The quantizer 1200 may also include fraction registers 1370 to store the fraction bits for each value in the set.

In some embodiments, the quantizer 1200 may be connected to a systolic array 210 and perform all of the quantization before values go into the systolic array 210. In some embodiments, an AI-accelerating processor 100 includes multiple quantizers 1200 located at various locations before or within the systolic array 210. The locations of rounding circuits 712 illustrated in FIG. 7 and FIG. 8 may also be the location of various quantizers 1200. The reasoning of having more than one quantizer 1200 is explained in FIG. 8.

In some embodiments, the quantization of a set of values may include the operation between the quantizer 1200 and a memory 120, particularly for any operations that involve the transpose of a matrix or a vector. In a block quantization, the shared scale bits are with respect to a particular row or a particular column. After a transpose operation, values in a transposed set do not share the same scale bits. Transpose operations are common in machine learning operations such as in backpropagation to determine certain gradient matrices. In coordinate descent, gradient matrices are back-propagated to weight matrices and activation matrices. For example, the determination of a weight gradient matrix often involves the multiplication of a back-propagated gradient matrix with a transpose of the weight matrix in the previous iteration of training. The quantized block of weight values in a weight matrix with respect to a direction (e.g., a column) is stored either in registers of the quantizer 1200 or the memory 120. The quantized block of weight values are values quantized before the computation of the systolic array 210 in a previous forward propagation pass. In the back-propagation pass, the memory 120 may retrieve multiple quantized blocks that are from the previous forward propagation pass, form the matrix, perform transpose of the matrix, and then send the matrix in subsets to one or more quantizers 1200. The values in the matrix are in block floating format because the values come from quantized blocks. The one or more quantizers 1200 perform another quantization process to re-adjust the shared scale bits among each of the new transposed blocks.

Low Precision Systolic Array Architecture

Figure 14:
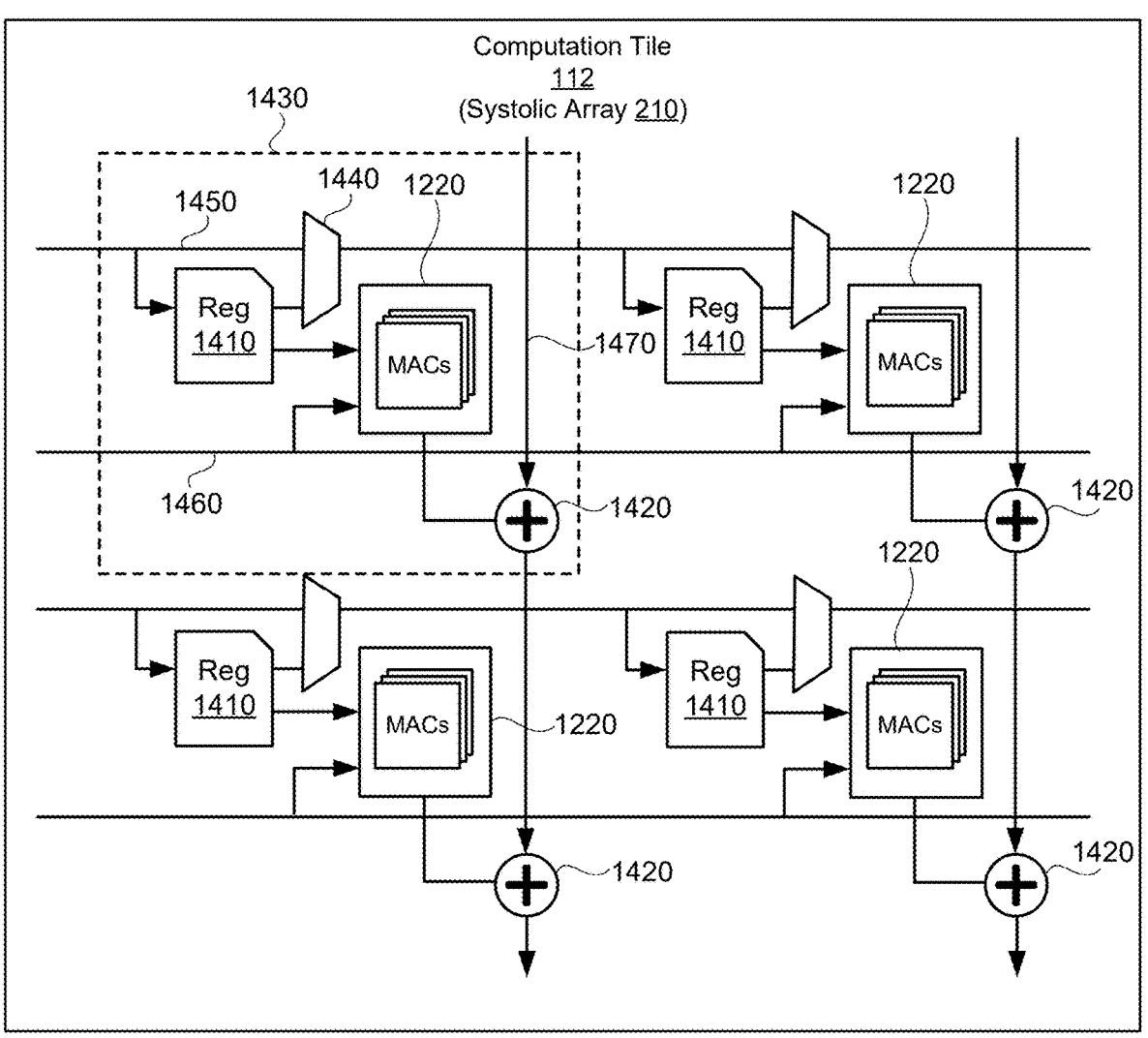
FIG. 14 is a block diagram illustrating the architecture of a portion of a large systolic array that is used to perform accelerated computations of quantized values, in accordance with some embodiments.

FIG. 14 is a block diagram illustrating the architecture of a portion of a large systolic array 210 that is used to perform accelerated computations of quantized values, in accordance with some embodiments. The architecture may be used for computations, such as multiply-accumulate operations, of quantized values that are in a block quantization format. In some embodiments, the block quantization format is a block floating quantization format in which a set of N values (e.g., 32 values) have 4-bit integer fraction bits. The values in the set share floating point e8 m1 scale bits. The illustration in FIG. 14 shows 4 repeating processing elements 1430, each of which is configured to perform MAC operations between a first set of N values and a second set of N values. As such, the architecture shown in FIG. 14 can handle MAC operations in parallel, such as 4 dot products in parallel. In some embodiments, a large systolic array 210 includes many more of the repeated processing elements 1430 shown in FIG. 14. In various embodiments, the systolic array 210 may include fewer, additional, or different components.

Referring to one of the processing elements 1430, such as the top left processing element 1430, a processing element 1430 may include a register 1410, a low-precision fraction MAC stack 1220, an accumulator 1420, a multiplexer 1440, a top lateral wire 1450, a bottom lateral wire 1460, and a longitudinal wire 1470 that passes through accumulates longitudinally among multiple processing elements 1430.

The register 1410 is part of an integrated circuit that is used to store a pre-fetched first set of quantized values. In matrix multiplications such as those that occur in machine learning operations, often the first set of quantized values may be weight values. The processing elements 1430 in different columns typically store different sets of weight values. Those values are sent through the top lateral wire 1450. The multiplexer 1440 selects what values of sent to subsequent columns. For each register 1410, it may store a set of N quantized values that are in block floating format.

The bottom lateral wire 1460 broadcasts a second set of quantized values laterally to different processing elements 1430 for computation operations. In matrix multiplications such as those occurring in machine learning operations, often the first set of activation values may be activation values. The same second set of quantized values are broadcasted to processing elements 1430 in a row. Various rounding techniques, such as re-rounding, are discussed in FIG. 7 through FIG. 11 and may affect the rounding of fraction bits of the broadcasted sets. For example, for each set of quantized values, the set may be broadcasted laterally along the wire 1460 to different processing elements in a systolic array 210. The quantized fractions for even the same original value may be rounded up or down differently for each broadcasted location. In other words, a set of block-quantized values is broadcasted laterally to different processing elements 1430 of the systolic array 210. The fraction bits corresponding to the same original value in the set are rounded differently and sometimes randomly in different broadcasted processing elements 1430. For example, the AI-accelerating processor 100 includes a plurality of quantizers 1200 that round the same set of values differently, based on the techniques described in FIG. 7 through FIG. 11.

The low-precision fraction MAC stack 1220 performs a multiply-accumulate operation of multiplication between two sets of N quantized values. For example, the low-precision fraction MAC stack 1220 may include N multiplier circuits and N accumulators (detailed not shown in FIG. 14 but shown in FIG. 15). The fraction bits in the two sets of N values are multiplied elementwise and accumulated through the accumulators. In some embodiments, the multiplications performed are in very low precision such as the maximum of 4-bit multiplications. For example, the fraction bits of the N values in the two sets may be in 4-bit integer format. The multiplication of the shared scale bits involves the multiplication of mantissa bits, which are also in low precision such as m1, m2, or m3. The low-precision fraction MAC stack 1220 can be limited to very low-precision computation. As such, the systolic array 210 can operate at an extremely high speed with low power consumption.

The shared scale bits of the two sets are also multiplied and are tracked differently. In some embodiments, the scale bits are in the format of e8m1. No multiplier needs to be used in determining the multiplication because m1*m1 can be performed by a logic gate. The exponent bits are added and can be performed by any adder such as an adder in an accumulator.

In some embodiments, at least a majority of the multipliers in a systolic array 210 are limited to 4-bit or lower multiplications. In some embodiments, at least 60% of the multipliers in a systolic array 210 are limited to 4-bit or lower multiplications. In some embodiments, at least 70% of the multipliers in a systolic array 210 are limited to 4-bit or lower multiplications. In some embodiments, at least 80% of the multipliers in a systolic array 210 are limited to 4-bit or lower multiplications. In some embodiments, at least 90% of the multipliers in a systolic array 210 are limited to 4-bit or lower multiplications. In some embodiments, at least 95% of the multipliers in a systolic array 210 are limited to 4-bit or lower multiplications. In some embodiments, at least 99% of the multipliers in a systolic array 210 are limited to 4-bit or lower multiplications. In some embodiments, 100% of the multipliers in a systolic array 210 are limited to 4-bit or lower multiplications.

In some embodiments, the systolic array 210 accounts for most of the computation silicon in the AI-accelerating processor 100. For example, the systolic array 210 may occupy at least a majority of the silicon space of the AI-accelerating processor 100. In some embodiments, the systolic array 210 may occupy 60% of the silicon space of the AI-accelerating processor 100. In some embodiments, the systolic array 210 may occupy 70% of the silicon space of the AI-accelerating processor 100. In some embodiments, the systolic array 210 may occupy 80% of the silicon space of the AI-accelerating processor 100. In some embodiments, the systolic array 210 may occupy 90% of the silicon space of the AI-accelerating processor 100.

Since the systolic array 210 may occupy at least a majority of the silicon space of the AI-accelerating processor 100, in some embodiments, at least a majority of the multipliers in an AI-accelerating processor 100 are limited to 4-bit or lower multiplications. In some embodiments, at least 60% of the multipliers in an AI-accelerating processor 100 are limited to 4-bit or lower multiplications. In some embodiments, at least 70% of the multipliers in an AI-accelerating processor 100 are limited to 4-bit or lower multiplications. In some embodiments, at least 80% of the multipliers in an AI-accelerating processor 100 are limited to 4-bit or lower multiplications. In some embodiments, at least 90% of the multipliers in an AI-accelerating processor 100 are limited to 4-bit or lower multiplications. In some embodiments, at least 95% of the multipliers in an AI-accelerating processor 100 are limited to 4-bit or lower multiplications. In some embodiments, at least 99% of the multipliers in an AI-accelerating processor 100 are limited to 4-bit or lower multiplications. In some embodiments, 100% of the multipliers in an AI-accelerating processor 100 are limited to 4-bit or lower multiplications.

The overall accumulated results after the low-precision fraction MAC stack 1220 are transmitted to the accumulator 1420. The accumulator 1420 may be outside of the low-precision fraction MAC stack 1220 and may be different from the accumulators in the low-precision fraction MAC stack 1220. The overall accumulated results for each low-precision fraction MAC stack 1220 may include two values. The first value is the overall accumulated result of the N multiplied values. Since N 4-bit multiplication values are accumulated, this first value is higher than 4 bits. For example, the first value may be in the format of a 17-bit integer. The overall accumulated results may also include a second value which is the multiplied scale bits, which may be in the format of e9m2 format. The first value and the second value are tracked differently in an accumulator 1420, which may include appropriate registers for the accumulated fraction bits and the registers for the multiplied scale bits. The overall accumulated results continually accumulated longitudinally downward through a series of accumulators 1420 in different processing elements 1430. As such, the multiply-accumulate operation may be performed for very large matrices, by dividing the matrices into blocks and quantizing each block with shared scaled bits.

The architecture of the systolic array 210 allows computation of multiplication between two large matrices in a highly accelerated manner without generating unacceptable rounding errors. The systolic array 210 can support multiplication of 1000×1000 matrices with each value in the matrix being FP32 precision level. The quantization and re-rounding techniques described in this disclosure allow the multiplication to be performed at a 4-bit level, which is only ⅛ of the number of bits of the original 32-bit precision level, yet the architecture and techniques described in this disclosure maintain a low quantization error level that allows successfully training and making inference of modern frontier machine learning models, such as large attention-based models such as transformer models. In some embodiments, the multiplication is performed at a low-precision level that is only less than 25% of the number of bits of the original precision level. In some embodiments, a large model trained by or used by the AI-accelerating processor 100 for inference includes a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

In some embodiments, a multiplication between two large matrices whose values are in high precision (e.g., FP32) may be performed in an accelerated manner using the systolic array 210 and the quantizer 1200. A large matrix may be divided into subsets. Each subset may be referred to as a block. The block of values may be quantized using the block quantization scheme so that the fraction bits of values can be reduced into a very low precision (e.g., 4-bit) and the values share the same scale bits to preserve additional precision. The fraction bits may be multiplied in an elementwise fraction by the low-precision fraction MAC stack 1220. While the shared scale bits may be in a higher precision (e.g., 4-bit), only one multiplication is carried out per N values in the block. The systolic array 210 includes multiple processing elements 1430. Each processing element 1430 performs MAC operations for a block of values, which corresponds to a subset of the large matrix. In turn, the computation results of multiple processing elements 1430 are accumulated longitudinally along a series of accumulators 1420. As such, large matrix multiplication can be performed in a low-precision multiplication manner by first dividing the large matrix into blocks, quantizing values in each block at a shared scaling, performing multiplication of values in each block in low precision, accumulating the values within each block, and accumulating the values among the blocks to achieve the overall matrix multiplication in low precision. The overall accumulated results can in turn be converted back to a high precision level.

In some embodiments, in a matrix multiplication of two large matrices, each having a size of over 500 values by 500 values, by using the systolic array 210 and the quantization scheme discussed in this disclosure, the multiplications can be performed in low precision (e.g., 4-bit integer) while the values are originally stored in a high precision (e.g., FP32). In some embodiments, in a matrix multiplication of two large matrices, by using the systolic array 210, at least a majority of the multiplications in the AI-accelerating processor 100 are performed in 4-bit precision or lower. In some embodiments, in a matrix multiplication of two large matrices, by using the systolic array 210, at least 60% of the multiplications in the AI-accelerating processor 100 are performed in 4-bit precision or lower. In some embodiments, in a matrix multiplication of two large matrices, by using the systolic array 210, at least 70% of the multiplications in the AI-accelerating processor 100 are performed in 4-bit precision or lower. In some embodiments, in a matrix multiplication of two large matrices, by using the systolic array 210, at least 80% of the multiplications in the AI-accelerating processor 100 are performed in 4-bit precision or lower. In some embodiments, in a matrix multiplication of two large matrices, by using the systolic array 210, at least 90% of the multiplications in the AI-accelerating processor 100 are performed in 4-bit precision or lower. In some embodiments, in a matrix multiplication of two large matrices, by using the systolic array 210, at least 95% of the multiplications in the AI-accelerating processor 100 are performed in 4-bit precision or lower. In some embodiments, in a matrix multiplication of two large matrices, by using the systolic array 210, at least 99% of the multiplications in the AI-accelerating processor 100 are performed in 4-bit precision or lower. In some embodiments, in a matrix multiplication of two large matrices, by using the systolic array 210, 100% of the multiplications in the AI-accelerating processor 100 are performed in 4-bit precision or lower.

Individual MAC Architecture

Figure 15:
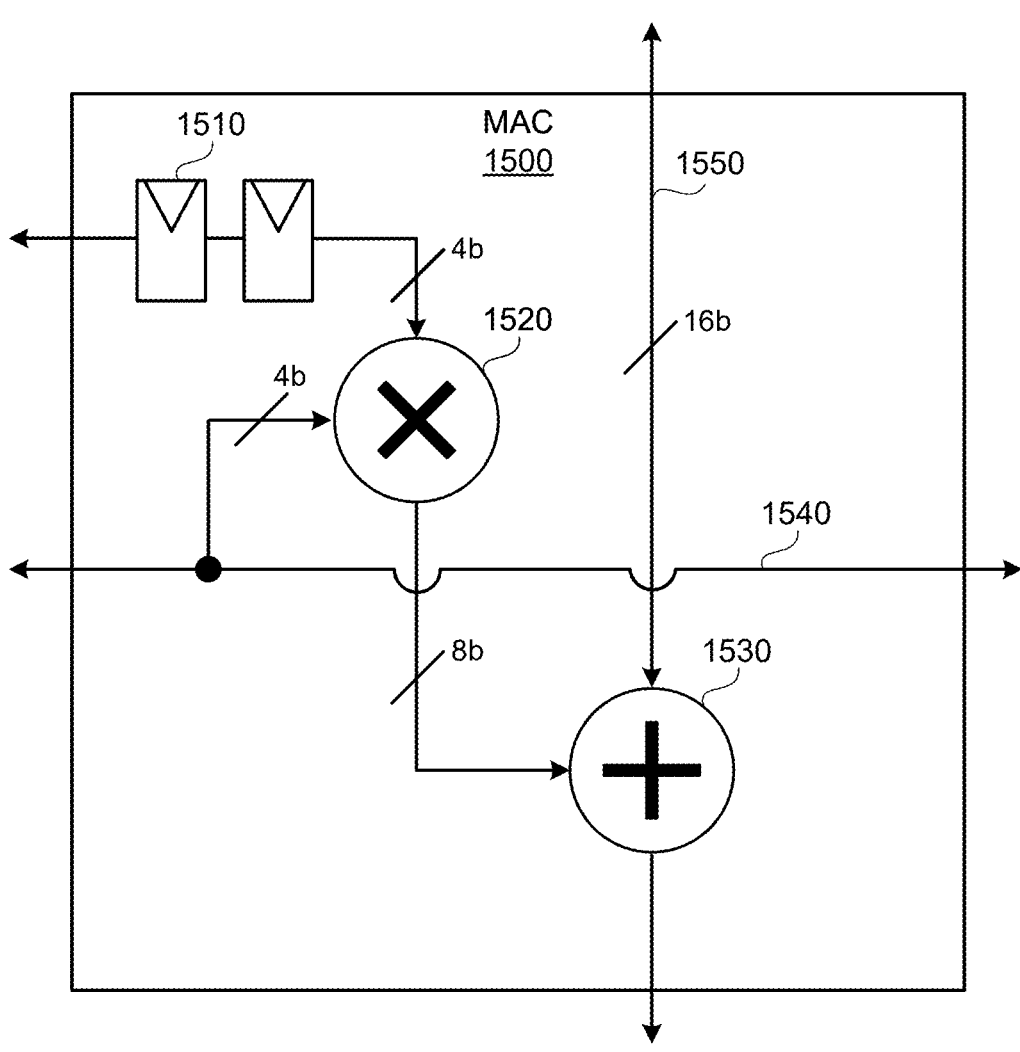
FIG. 15 is a block diagram illustrating the architecture of an individual multiply-accumulate circuit (MAC), in accordance with some embodiments.

FIG. 15 is a block diagram illustrating the architecture of an individual multiply-accumulate circuit (MAC) 1500, in accordance with some embodiments. A MAC 1500 may be one of the MACs in a low-precision fraction MAC stack 1220. The MAC 1500 may include one or more registers 1510, a 4-bit multiplier 1520, an accumulator 1530, a lateral wire 1540, and a longitudinal wire 1550. In various embodiments, the MAC 1500 may include additional, fewer, or different components. Note that the MAC 1500 is not to be confused with a processing element 1430 illustrated in FIG. 14. The MAC 1500 is used to perform elementwise multiplication for a pair of int-4 values. A processing element 1430 can be used to perform multiply-accumulate operations, such as a dot product, of two sets of N values. Likewise, the accumulator 1530 is not to be confused with an accumulator 1420 illustrated in FIG. 14. The accumulator 1530 is with respect to a single MAC 1500 and the accumulator 1420 handles accumulated results of a low-precision fraction MAC stack 1220.

The 4-bit multiplier 1520 is a multiplier circuit that performs multiplication between two 4-bit integer values. The first 4-bit integer value may be the fraction bits that belong to a first set of block-quantized values and may be stored in one or more registers 1510. The second 4-bit integer value may be the fraction bits that belong to a second set of block-quantized values and may be broadcasted laterally through the lateral wire 1540. Note that a 4-bit multiplier 1520 refers to that the inputs of the two values are limited to 4 bits or below. However, because of the carryover bits in multiplication, the output of the 4-bit multiplier 1520 is 8 bits.

In a typical low-precision fraction MAC stack 1220, the low-precision fraction MAC stack 1220 includes a stack of N (e.g., 32) MACs 1500. The elementwise multiplied values are accumulated in a series of accumulators 1530 through the longitudinal wire 1550. Since N values of multiplied values (which are in 8 bits) are accumulated, the longitudinal wire 1550 and the accumulator 1530 are in 16 bits or 17 bits. The overall accumulated value is transmitted in accumulator 1420, as shown in FIG. 14.

In some embodiments, the 4-bit multipliers 1520 are presented in stacks, groups of processing elements 1430, in rows, and in columns. In some embodiments, the systolic array 210 includes a large number of 4-bit multipliers 1520. For example, in some embodiments, the systolic array 210, in total, includes more than 500×500 MACs 1500. In some embodiments, the systolic array 210, in total, includes more than 1000×1000 MACs 1500. In some embodiments, the systolic array 210 includes more than 2000×2000 MACs 1500. In some embodiments, systolic array 210 includes more than 3000×3000 MACs 1500. In some embodiments, the systolic array 210 includes more than 4000×4000 MACs 1500. In some embodiments, the systolic array 210 includes more than 5000×5000 MACs 1500. In some embodiments, the systolic array 210 includes more than 8000×8000 MACs 1500. In some embodiments, the systolic array 210 includes more than 10,000×10,000 MACs 1500.

Put differently, in some embodiments, the systolic array 210, in total, includes more than 500×500 4-bit multipliers 1520. In some embodiments, the systolic array 210, in total, includes more than 1000×1000 4-bit multipliers 1520. In some embodiments, the systolic array 210 includes more than 2000×2000 4-bit multipliers 1520. In some embodiments, systolic array 210 includes more than 3000×3000 4-bit multipliers 1520. In some embodiments, the systolic array 210 includes more than 4000×4000 4-bit multipliers 1520. In some embodiments, the systolic array 210 includes more than 5000×5000 4-bit multipliers 1520. In some embodiments, the systolic array 210 includes more than 8000×8000 4-bit multipliers 1520. In some embodiments, the systolic array 210 includes more than 10,000×10,000 4-bit multipliers 1520.

While in this disclosure numbers for precision levels are presented as examples, in various embodiments different numbers may be used for performing a low-precision computation or a block quantization. For example, in some embodiments, 4-bit integer fraction bits and multiplication, with shared scale bits of e8m1, are used as examples for illustration. However, in other embodiments, different combinations of precision levels and formats may be used, and the disclosure is not limited to the example used in the illustration.

Example Quantization Process

FIG. 16 is a flowchart depicting an example process 1600 for operating a quantization process associated with an AI-accelerating processor system, in accordance with some embodiments. While the quantization process discussed so far is disclosed with various hardware components in the preceding figures, the steps in the process 1600 may be performed with software, hardware, or a combination of software and hardware. For example, in some embodiments, the process 1600 is performed by the hardware components of an AI-accelerating processor 100, such as the quantizer 1200. In some embodiments, the process 1600 may be performed entirely by software and be executed outside of the AI-accelerating processor 100, such as by a CPU before those quantized values are transmitted to the AI-accelerating processor 100. In some embodiments, the process 1600 may be performed with a combination of software and hardware components discussed in this disclosure. In various embodiments, the process 1600 may include additional, fewer, or different steps.

The process 1600 may include defining 1610 a set of values that are stored in a high precision level. For example, depending on the type of operation, a column or a row may be selected as a set of values. The values before quantization may be stored in a high precision level, such as FP32 or FP16. The process 1600 may include determining 1620 a shared scale of the set of values. In determining the shared scale, a processor may identify the largest value(s) in the set and also perform statistics of the set, such as standard deviation or average. The processor may determine whether to clip one or more values in the set. The shared scale may be represented in a scale floating point format, such as e8m1. The shared scale bits are shared among the values in the set.

The process 1600 may include determining 1630 a reciprocal of the shared scale bits. The reciprocal value is used to be multiplied with each original value to determine the fractions before rounding. In some cases, the reciprocal value may not have a finite representation in binary. The process 1600 may include gaining 1640 values in the set by a gain factor. This way the reciprocal value is represented by a finite representation in binary and in a low precision level. The process 1600 may include storing 1650 a reverse gain factor in memory for future reverse operation to remove the gain factor.

The process 1600 may include determining 1660, for each value in the set, fractions of the value before rounding. The determination 1660 may include multiplying the original values to a reciprocal value (or a gained reciprocal value). The process 1600 may include rounding 1670 the fractions into a low precision format, such as 4-bit integers. The rounding operation is further discussed in FIG. 7 through FIG. 11 and the rounding process may correspond to the process 1100.

The process 1600 may include generating 1680 a set of quantized values in a block quantization format. In the block quantization format, the quantized values in the set each include its own fraction bits (e.g., 4-bit integers) and share the shared scale bits. The scale bits can be in a floating-point format (e.g., in e8 m1 format), making the quantization scheme a block floating format, or in another format, such as an 8-bit integer.

Example Computation Process Using Accelerated Block Quantization

Figure 17:
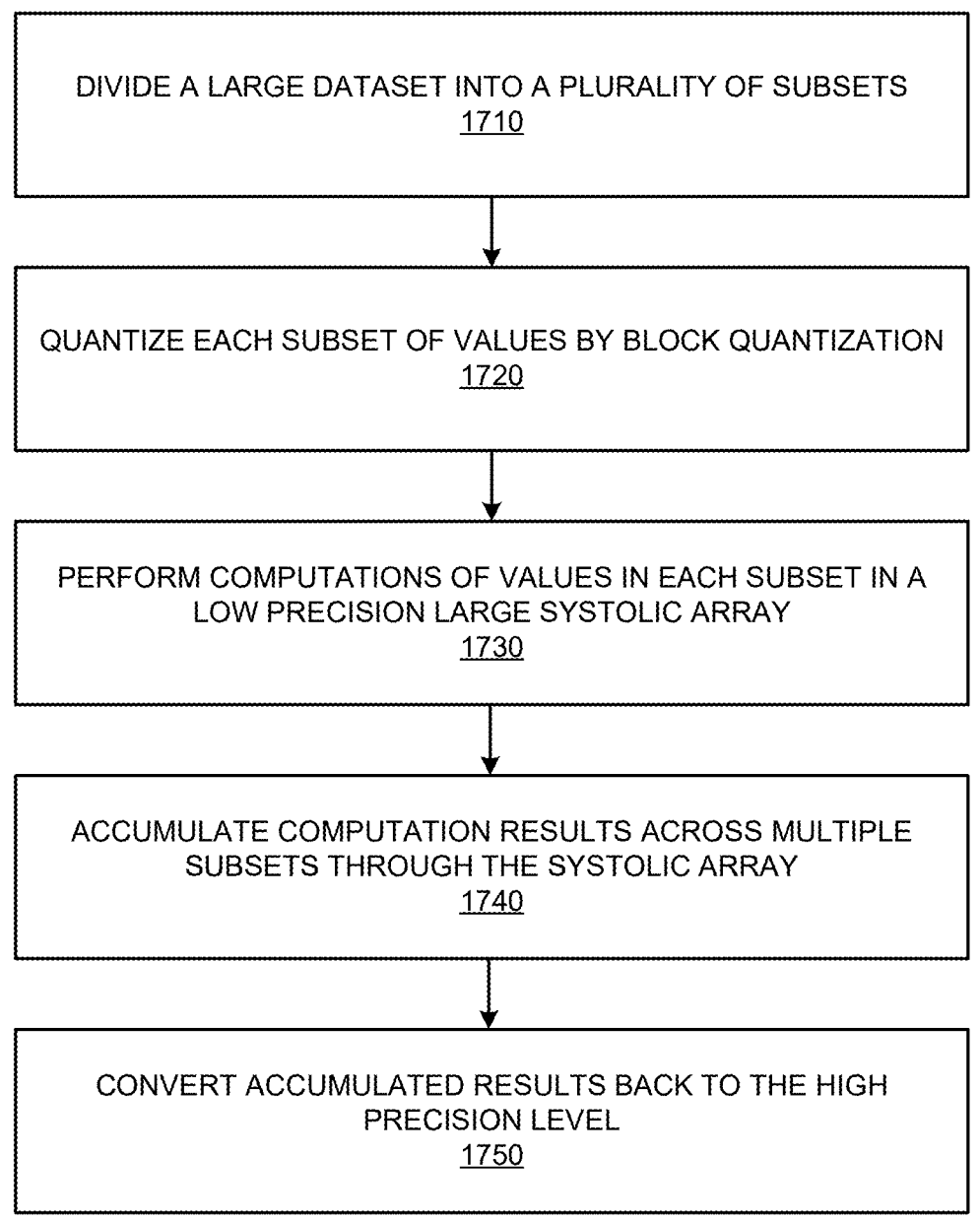
FIG. 17 is a flowchart depicting an example process for performing accelerated computations with an AI-accelerating processor system using a block quantization scheme, in accordance with some embodiments.

FIG. 17 is a flowchart depicting an example process 1700 for performing accelerated computations with an AI-accelerating processor system using a block quantization scheme, in accordance with some embodiments. While the computation process discussed so far is disclosed with various hardware components in the preceding figures, the steps in process 1700 may be performed with hardware or a combination of software and hardware. For example, in some embodiments, the process 1700 is performed by the hardware components of an AI-accelerating processor 100, such as the quantizer 1200 and the systolic array 210. In some embodiments, some of the quantization steps may be performed by software and executed outside of the AI-accelerating processor 100, such as by a CPU before those quantized values are transmitted to the AI-accelerating processor 100. In various embodiments, the process 1700 may include additional, fewer, or different steps.

The process 1700 may include dividing 1710 a large dataset into a plurality of subsets. For example, if the computation is a large matrix multiplication, a matrix may be divided into subsets. Each subset may be a column or a row. In some embodiments, even a column or a row may be further divided into subsets. The values in the dataset may be stored in a high-precision format, such as FP32 or FP16.

The process 1700 may include quantizing 1720 each subset of values by block quantization. For the plurality of subsets, a plurality of blocks of quantized values are generated. The quantized values in each block include their own fraction bits in a low precision (e.g., 4-bit integers) and share a set of scale bits. The quantization process may correspond to the process 1600.

The process 1700 may include performing 1730 computations of values in each subset in a low-precision large systolic array 210. The detail of the computation is described in FIG. 14 and FIG. 15. In some embodiments, the computations may include performing multiplications in a low precision, such as 4-bit multiplication. The computations may also include separately performing multiplications of shared scale bits.

The process 1700 may include accumulating 1740 computation results across multiple subsets through the systolic array 210. The accumulated results include fraction bits that in higher number of bits of individual quantized values. The accumulated results also include accumulated shared scale bits. The accumulated results are computation results contributed by a plurality of subsets with respect to the large dataset, such as the large matrix.

The process 1700 may include converting 1750 accumulated results back to the high precision level. In some embodiments, the process 1700 may be repeated for additional rounds to complete the entire operation, which may correspond to one round of forward or backpropagation pass in machine learning operations.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, device, processor, or storage medium, as well. The dependencies or references in the attached claims are chosen for formal reasons only. However, any subject matter resulting from a deliberate reference back to any previous sections in the specification or claims (in particular multiple dependencies) can be claimed as well, so that any combination of claims, sections in the specifications, and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware circuitry or software, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

For one or more components that are configured to perform certain tasks, the components may be parallel components (e.g., one or more processing nodes) and the components may perform the task individually, cooperatively, or in a distributed manner. For example, if one or more processing nodes are to perform a series of steps, unless further specified, the disclosure covers the possibility that one node performs all of the steps, one node performs one step and another node performs another step, or all of the nodes performs all of the steps.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. An integrated circuit for an artificial-intelligence-accelerating (AI-accelerating) processor, the integrated circuit comprising:
   a systolic array for performing machine learning operations, wherein at least 90% of multipliers in the systolic array are limited to 4-bit or lower input precision; and
   a quantizer configured to quantize a set of values from a first precision format to a block quantization format, wherein quantized values in the block quantization format include fraction bits that are in a second precision format and shared scale bits that are shared among the quantized values in the set, wherein the second precision format is lower than the first precision format, wherein the second precision format of the fraction bits has a number of bits that is fewer than 50% of a number of bits in the first precision format.

2. The integrated circuit for the AI-accelerating processor of claim 1, wherein the systolic array comprises 1000×1000 multipliers that are limited to 4-bit or lower input precision.

3. The integrated circuit for the AI-accelerating processor of claim 1, wherein at least 99% of the multipliers in the systolic array are limited to 4-bit or lower input precision.

4. The integrated circuit for the AI-accelerating processor of claim 1, wherein the systolic array comprises memory for storing a set of quantized values in a block quantization format, the quantized values include fraction bits that are 4-bit or lower and shared scale bits that are shared among the quantized values in the set.

5. The integrated circuit for the AI-accelerating processor of claim 4, wherein the multipliers that are limited to 4-bit or lower input precision are configured to perform multiplications of the fraction bits that are 4-bit or lower.

6. The integrated circuit for the AI-accelerating processor of claim 4, wherein the shared scale bits are in a floating-point format.

7. The integrated circuit for the AI-accelerating processor of claim 6, wherein the floating-point format is e8m1.

8. The integrated circuit for the AI-accelerating processor of claim 1, wherein systolic array comprises:
   a plurality of multiply-accumulate circuits (MACs) configured to perform multiply-accumulate operations for quantized values that include fraction bits and shared scale bits, wherein the plurality of MACs comprise the multipliers that are limited to 4-bit or lower input precision; and
   a plurality of accumulators, wherein the accumulators comprise registers for separately tracking the fraction bits and the shared scale bits.

9. The integrated circuit for the AI-accelerating processor of claim 1, wherein the second precision format of the fraction bits has a number of bits that is fewer than 25% of a number of bits in the first precision format.

10. The integrated circuit for the AI-accelerating processor of claim 1, wherein the quantizer comprises a clip circuit to reduce a value in the set to a ceiling value before quantization is performed.

11. The integrated circuit for the AI-accelerating processor of claim 1, wherein the quantizer is configured to determine the shared scaling bits of the set, and the quantizer further comprises a reciprocal circuit configured to determine a reciprocal of the shared scaling bits.

12. The integrated circuit for the AI-accelerating processor of claim 11, wherein quantizer further comprises a gain circuit that is configured to multiply the reciprocal with a gain factor and store a reverse gain factor in memory for a subsequent reverse gain operation, the subsequent reverse gain operation being subsequent to computations of the systolic array.

13. The integrated circuit for the AI-accelerating processor of claim 1, further comprising a plurality of quantizers that are configured to quantize a same set of values differently by a re-rounding process.

14. The integrated circuit for the AI-accelerating processor of claim 1, further comprising:
   memory configured to store a set of values in a first precision format; and
   a quantizer configured to quantize the set of values to a second precision format that is lower than the first precision format, wherein the systolic array is configured to perform computations of quantized values in the second precision format in 4-bit or lower input precision, and wherein computed results are converted back to the first precision format and are stored in the memory.

15. The integrated circuit for the AI-accelerating processor of claim 1, further comprising memory configured to store values of part of a large machine learning model that has over 1 billion parameters, wherein the values are stored in a precision format higher than FP16.

16. A method for performing a machine learning operation using an integrated circuit, the method comprising:

retrieving a set of values in a first precision format, the set of values associated with a machine learning model;

quantizing the set of values to quantize a set of values from a first precision format to a block quantization format, wherein quantized values in the block quantization format include fraction bits that are in a second precision format and shared scale bits that are shared among the quantized values in the set, wherein the second precision format is lower than the first precision format, wherein the second precision format of the fraction bits has a number of bits that is fewer than 50% of a number of bits in the first precision format; and performing computations of the set of quantized values using a systolic array of an artificial-intelligence-accelerating (AI-accelerating) processor, wherein at least 90% of multipliers in the systolic array are limited to 4-bit or lower input precision.

17. The method of claim 16, wherein the systolic array comprises 1000×1000 multipliers that are limited to 4-bit or lower input precision.

18. A system comprising:

memory for storing values of a machine learning model in a first precision format that is in FP16 or higher;

a systolic array for performing machine learning operations, wherein at least 90% of multipliers in the systolic array are limited to 4-bit or lower input precision; and a quantizer configured to quantize a set of values from a first precision format to a block quantization format, wherein quantized values in the block quantization format include fraction bits that are in a second precision format and shared scale bits that are shared among the quantized values in the set, wherein the second precision format is lower than the first precision format, wherein the second precision format of the fraction bits has a number of bits that is fewer than 50% of a number of bits in the first precision format.

19. The system of claim 18, wherein the systolic array comprises 1000×1000 multipliers that are limited to 4-bit or lower input precision.

20. The system of claim 18, wherein at least 90% of the multipliers in the systolic array are limited to 4-bit or lower input precision.

* * * * *